(12) United States Patent
Deng et al.

(10) Patent No.: US 11,751,160 B2
(45) Date of Patent: Sep. 5, 2023

(54) METHOD AND APPARATUS FOR MOBILITY REGISTRATION

(71) Applicant: Huawei Technologies Co., Ltd., Shenzhen (CN)

(72) Inventors: Juan Deng, Hangzhou (CN); Bo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 17/512,276

(22) Filed: Oct. 27, 2021

(65) Prior Publication Data
US 2022/0053445 A1 Feb. 17, 2022

Related U.S. Application Data

(63) Continuation of application No. PCT/CN2020/085943, filed on Apr. 21, 2020.

(30) Foreign Application Priority Data

Apr. 29, 2019 (CN) .............................. 201910356880
Jun. 14, 2019 (CN) .............................. 201910517920
(Continued)

(51) Int. Cl.
*H04W 60/00* (2009.01)
*H04W 12/041* (2021.01)
(Continued)

(52) U.S. Cl.
CPC ......... *H04W 60/00* (2013.01); *H04W 12/041* (2021.01); *H04W 36/0038* (2013.01); *H04W 12/03* (2021.01); *H04W 12/106* (2021.01)

(58) Field of Classification Search
CPC ............... H04W 60/00; H04W 12/041; H04W 36/0038; H04W 12/03; H04W 12/106;
(Continued)

(56) References Cited

U.S. PATENT DOCUMENTS

2012/0047367 A1 2/2012 Han et al.
2017/0201937 A1 7/2017 Zhang et al.
(Continued)

FOREIGN PATENT DOCUMENTS

CN 101925050 A 12/2010
CN 108696872 A 10/2018
(Continued)

OTHER PUBLICATIONS

ZTE, "eNS IDLE mobility," 3GPP TSG-SA WG2 Meeting #132, S2-1903791, Apr. 8-12, 2019, Xi''an, China, 9 pages.
(Continued)

*Primary Examiner* — Mazda Sabouri
(74) *Attorney, Agent, or Firm* — Conley Rose, P.C.

(57) ABSTRACT

A method includes after receiving a first non-access stratum (NAS) security mode command (SMC) message sent by an initial access and mobility management function (AMF), a user equipment (UE) stores a first NAS security context; the UE receives a second NAS SMC message sent by a second AMF, where the message carries indication information used to indicate the UE to use the first NAS security context; and the UE uses the first NAS security context as a current NAS security context based on the indication information. According to the method for mobility registration provided in this application, when receiving the second NAS SMC message sent by the second AMF, the UE uses the first NAS security context as the current NAS security context, and then processes the second NAS SMC message, so that the NAS security contexts on the UE and the second AMF are consistent.

20 Claims, 33 Drawing Sheets

(30) Foreign Application Priority Data

Aug. 19, 2019 (CN) .............................. 201910766175
Nov. 11, 2019 (CN) .............................. 201911094122

(51) Int. Cl.
*H04W 36/00* (2009.01)
*H04W 12/106* (2021.01)
*H04W 12/03* (2021.01)

(58) Field of Classification Search
CPC ..... H04W 8/065; H04W 60/04; H04W 12/04; H04W 36/0033; H04L 9/321; H04L 2209/80; H04L 9/0861; H04L 9/14
See application file for complete search history.

(56) References Cited

U.S. PATENT DOCUMENTS

| | | | |
|---|---|---|---|
| 2018/0227873 A1* | 8/2018 | Vrzic | H04W 28/26 |
| 2018/0310170 A1 | 10/2018 | He | |
| 2019/0104447 A1 | 4/2019 | Horn et al. | |
| 2019/0268753 A1 | 8/2019 | Chen et al. | |
| 2020/0163009 A1* | 5/2020 | Chen | H04W 48/18 |
| 2020/0186526 A1 | 6/2020 | Li | |
| 2021/0007027 A1* | 1/2021 | Yang | H04W 60/00 |
| 2021/0289351 A1* | 9/2021 | Ferdi | H04W 12/041 |
| 2022/0070157 A1* | 3/2022 | Ben Henda | H04L 63/20 |

FOREIGN PATENT DOCUMENTS

| | | |
|---|---|---|
| CN | 109413646 A | 3/2019 |
| CN | 109587685 A | 4/2019 |
| CN | 109587688 A | 4/2019 |
| WO | 2016129238 A1 | 8/2016 |
| WO | 2018141269 A1 | 8/2018 |
| WO | 2018201398 A1 | 11/2018 |

OTHER PUBLICATIONS

Samsung ., "Registration procedure using the temporary User ID," SA WG2 Meeting #120, S2-171911, Mar. 27-31, 2017, Busan, South Korea, 11 pages.

3GPP TS 23.502 V16.0.2, Apr. 2019, "3rd Generation Partnership Project; Technical Specification Group Services and System Aspects; Procedures for the 5G System; Stage 2 (Release 16)," 419 pages.

ZTE Corporation, "Handling of AMF redirection", 3GPP TSG-SA WG3 Meeting #94, S3-190153, Kochi (India), Jan. 28-Feb. 1, 2019, 3 pages.

Huawei, et al., "Solving registration failure in initial registration procedure with AMF reallocation," 3GPP TSG-SA WG3 Meeting #95, S3-191412, Reno (US). May 6-10, 2019, 4 pages.

Huawei et al., "Registration failures in registration procedure with AMF reallocation," 3GPP TSG-SA WG3 Meeting #95Bis, S3-192159, Sapporo (Japan), Jun. 24-26, 2019, 7 pages.

Huawei et al., "Solving registration failure in registration procedure with AMF reallocation," 3GPP TSG-SA WG3 Meeting #98e, S3-200202, e-meeting, Mar. 2-6, 2020, 5 pages.

* cited by examiner

METHOD AND APPARATUS FOR MOBILITY REGISTRATION

CROSS-REFERENCE TO RELATED APPLICATIONS

This is a continuation of International Patent Application No. PCT/CN2020/085943 filed on Apr. 21, 2020, which claims priorities to Chinese Patent Application No. 201910356880.9 filed on Apr. 29, 2019, Chinese Patent Application No. 201910517920.3 filed on Jun. 14, 2019, Chinese Patent Application No. 201910766175.6 filed on Aug. 19, 2019, and Chinese Patent Application No. 201911094122.0 filed on Nov. 11, 2019. All of the aforementioned patent applications are hereby incorporated by reference in their entireties.

TECHNICAL FIELD

This application relates to the communication field, and in particular, to a method and an apparatus for mobility registration.

BACKGROUND

The 5th generation (5G) communication protocol defines an access and mobility management function (AMF) redirection procedure of user equipment in a registration procedure. In the registration procedure, first, the user equipment sends, to a (radio) access network ((R)AN), a registration request message that carries a 5G globally unique temporary user equipment identity (5G-GUTI) of the user equipment. Then, after receiving the registration request message of the user equipment, the (R)AN chooses to send the registration request message to an initial AMF, and the initial AMF finds, based on the 5G-GUTI, a first AMF (old AMF) that serves the user equipment last time, and obtains a context of the user equipment from the first AMF, where the context of the user equipment includes a security context of the user equipment. Finally, the initial AMF initiates AMF redirection based on some trigger conditions to redirect to a second AMF, and the second AMF (target AMF) still obtains the context of the user equipment from the old AMF.

In other approaches AMF redirection procedure, a case in which a user equipment key on the user equipment is different from a user equipment key on the second AMF exists, which may cause a registration failure of the user equipment.

SUMMARY

This application provides a method and an apparatus for mobility registration. When receiving indication information that is sent by a second AMF and that is used to indicate user equipment to use a first non-access stratum (NAS) security context, the user equipment (UE) uses the first NAS security context as a current NAS security context based on the indication information, so that the NAS security contexts on the user equipment and the second AMF are consistent.

According to a first aspect, a method for mobility registration is provided. The method is applied to a case of AMF redirection AMF, and includes a UE receives a first NAS security mode command (SMC) message sent by an initial AMF, the UE stores a first NAS security context based on the first NAS SMC message, where the first NAS security context is a NAS security context set up between the UE and a first AMF, the UE receives indication information sent by a second AMF, where the indication information is used to indicate the UE to use the first NAS security context, and the UE uses the first NAS security context as a current NAS security context based on the indication information, where the first AMF is an AMF accessed by the UE last time, and the second AMF is an AMF that is selected to serve the UE when the AMF redirection is performed.

With reference to the first aspect, in some implementations of the first aspect, the indication information includes a NAS message received by the user equipment from the second AMF, where the NAS message is used to notify the user equipment that the AMF redirection occurs on a network side, or an eighth indication carried in a NAS message received by the user equipment from the second AMF. The NAS message is a newly added NAS message. The eighth indication is a newly added information element (IE), and is carried in an existing NAS message. The existing NAS message carrying the indication is not limited in this embodiment of this application. Possible options of the NAS message include a configuration update command message, a security mode command message, an authentication request message, a downlink NAS transport message, a 5G system mobility management (5GMM) status message, and the like.

According to the method for mobility registration provided in this embodiment of this application, the user equipment stores the first NAS security context based on the received first NAS SMC message, and immediately resumes using, after receiving the indication information sent by the second AMF, the stored first NAS security context based on the indication information. In this way, when the NAS SMC message sent by the second AMF is processed, the current NAS security context on the user equipment is the first NAS security context.

It should be understood that "first" and "second" in this application are merely used for differentiation, and should not be construed as any limitation on this application. The first AMF and the second AMF are distinguished as different AMFs. The first AMF may also be referred to as an old AMF, and the second AMF may also be referred to as a target AMF. The first NAS security context and a second NAS security context are distinguished as different NAS security contexts, and the first NAS security context may also be referred to as an old NAS security context.

It should be further understood that in this embodiment of this application, the first NAS security context may be referred to as the NAS security context set up between the UE and the first AMF, the first NAS security context may be a NAS security context on the UE that is used before the UE sends a registration request, the first NAS security context may be a NAS context on the UE that is used after the UE sends the registration request, or the first NAS security context may be a NAS security context currently used when the UE receives the first NAS SMC message.

It should be further understood that the first NAS security context stored by the UE based on the first NAS SMC message is the current NAS security context used when the UE receives the first NAS SMC message but the UE has not processed the NAS SMC message.

It should be further understood that this embodiment of this application imposes no limitation on a process of how to process, after the UE uses the first NAS security context as the current NAS security context, a NAS message carrying the indication information, provided that the process is based on a NAS SMC message processing process specified in an existing protocol.

In a possible implementation, when the UE includes the first NAS security context and generates a new second NAS security context, flag bits may be set to distinguish the first NAS security context and the second NAS security context. For example, a flag bit or a bit whose bit value is 0 is set to identify the first NAS security context.

It should be further understood that to distinguish signaling exchanged between different AMFs, a first indication sent by the initial AMF to the first AMF is used to notify that the AMF redirection occurs on a network side and/or to indicate the first AMF to restore the first NAS security context, a second indication sent by the first AMF to the second AMF is used to notify that the AMF redirection occurs on the network side and/or to indicate the second AMF to send the indication information to the UE, and the indication information sent by the second AMF to the UE is used to notify the UE that the AMF redirection occurs on the network side, to indicate the UE to use the first NAS security context, to indicate the UE to activate the first NAS security context, to indicate the UE to use the first NAS security context as the current NAS security context, to indicate the UE to delete a new NAS security context, and/or to indicate the UE to resume using the first NAS security context. A function of the indication information sent by the second AMF to the UE is applicable to the entire present disclosure, and details are not further described.

Based on the indication information sent by the second AMF to the UE, the UE uses the first NAS security context, activates the first NAS security context, uses the first NAS security context as the current NAS security context, deletes the new NAS security context, and/or resumes using the first NAS security context.

It should be further understood that a name of a piece of information is not limited in this application, but a function of the piece of information requires attention. In other words, the first indication, the second indication, and the like described above are merely used to distinguish signaling between different network elements, and there may be other names. Examples are not provided for description herein one by one. With reference to the first aspect, in some implementations of the first aspect, the first NAS SMC message includes a fourth indication. That the UE stores a first NAS security context based on the first NAS SMC message includes that the UE stores the first NAS security context based on the fourth indication.

According to the method for mobility registration provided in this embodiment of this application, after receiving the first NAS SMC message, the user equipment may determine, based on the fourth indication carried in the first NAS SMC message, to store the first NAS security context, or the user equipment may determine, based on the received first NAS SMC message, to store the first NAS security context. This provides a flexible selection solution.

According to a second aspect, a method for mobility registration is provided. The method is applied to a case of AMF redirection AMF, and includes that an initial AMF sends a first NAS SMC message to user equipment (UE), where the first NAS SMC message is used to indicate the UE to store a first NAS security context, and the initial AMF sends a first indication to a first AMF, where the first indication is used to indicate the first AMF to restore the first NAS security context and/or the first indication is used to notify the first AMF that the AMF redirection occurs, the first NAS security context is a NAS security context set up between the UE and the first AMF, and the first AMF is an AMF accessed by the UE last time.

According to the method for mobility registration provided in this embodiment of this application, the initial AMF sends the first NAS SMC message to the user equipment (UE), and the user equipment may first store the first NAS security context based on the received first NAS SMC message, and then process the first NAS SMC message.

With reference to the second aspect, in some implementations of the second aspect, the first NAS SMC message includes a fourth indication, and the fourth indication is used to indicate the UE to store the first NAS security context.

According to the method for mobility registration provided in this embodiment of this application, after receiving the first NAS SMC message, the user equipment may determine, based on the fourth indication carried in the first NAS SMC message, to store the first NAS security context, or the user equipment may determine, based on the received first NAS SMC message, to store the first NAS security context. This provides a flexible selection solution.

According to a third aspect, a method for mobility registration is provided. The method is applied to a case of AMF redirection AMF, and includes that a second AMF receives a second indication, where the second indication is used to indicate the second AMF to send indication information to UE, notify the second AMF that the AMF redirection occurs, indicate, to the second AMF, that a first AMF uses an old security context, that is, a first security context, indicate, to the second AMF, that the UE uses the old security context, that is, the first security context, indicate, to the second AMF, that the UE and the first AMF use the old security context, that is, the first security context, and the second AMF sends, to the UE, the indication information used to indicate the UE to use a first NAS security context. The indication information may be a newly added NAS message sent by the second AMF, or the indication information is an indication carried in a NAS message sent by the second AMF to the UE. The present disclosure imposes no limitation on the NAS message that carries the indication information. For example, the NAS message may be a NAS SMC message or a configuration update command message. The first NAS security context is a NAS security context set up between the UE and the first AMF, the first AMF is an AMF accessed by the UE last time, and the second AMF is an AMF that is selected to serve the UE when the AMF redirection is performed.

According to the method for mobility registration provided in this embodiment of this application, the second AMF sends, to the UE, the indication information used to indicate the UE to use the first NAS security context, and the UE immediately resumes using the stored first NAS security context based on the indication information, so that a NAS security context on the user equipment is the first NAS security context.

With reference to the third aspect, in some implementations of the third aspect, that a second AMF receives a second indication includes that the second AMF receives the second indication from the first AMF, or the second AMF receives the second indication from an initial AMF.

It should be understood that, that the second AMF receives the second indication from an initial AMF means that the initial AMF sends the second indication information to the second AMF by using a (R)AN. In a possible implementation, the initial AMF sends the second indication to the (R)AN, and the (R)AN forwards the second indication to the second AMF. In another possible implementation, the initial AMF sends a complete registration request message to the (R)AN, the (R)AN forwards the complete registration request message to the second AMF, and the second AMF can determine, based on the complete registration request message, to send the indication information to the UE, and/or that the AMF redirection occurs, that is, the complete registration request message may also be referred to as the second indication information.

According to the method for mobility registration provided in this embodiment of this application, the second AMF may receive the second indication from the first AMF, or may receive the second indication from the initial AMF side, determine that the AMF redirection occurs on the network side, and send the indication information to the UE, to notify the UE that the AMF redirection occurs.

In a possible implementation, the indication information may not only indicate the UE to start using the first NAS security context but also notify the UE that the AMF redirection occurs on the network side.

According to a fourth aspect, a method for mobility registration is provided. The method is applied to a case of AMF redirection AMF, and includes that a first AMF receives a first indication sent by an initial AMF, the first AMF restores a first NAS security context based on the first indication, and/or the first AMF learns, based on the first indication, that the AMF redirection occurs, the first AMF receives a UE context transmission request from a second AMF, and the first AMF sends a second indication to the second AMF based on the first indication, where the second indication is used to indicate the second AMF to send indication information to UE, and/or the second indication is used to notify the second AMF that the AMF redirection occurs, where the first NAS security context is a NAS security context set up between the UE and the first AMF, the first AMF is an AMF accessed by the UE last time, and the second AMF is an AMF that is selected to serve the UE when the AMF redirection is performed.

According to the method for mobility registration provided in this embodiment of this application, after receiving the first indication sent by the initial AMF, the first AMF may determine, based on the first indication, that the AMF redirection occurs on a network side, and send the second indication to the second AMF, to notify the second AMF that the AMF redirection occurs on the network side.

According to a fifth aspect, a method for mobility registration is provided. The method is applied to a case of AMF redirection AMF, and includes that a UE receives a first NAS SMC message sent by an initial AMF, the user equipment stores a first NAS security context based on the first NAS SMC message, and the user equipment receives a third indication sent by the initial AMF, and based on the third indication, the UE uses the first NAS security context as a current NAS security context, uses the first NAS security context, resumes using the first NAS security context set up by the UE and a first AMF, uses an old NAS security context set up by the UE and the first AMF, uses the old security context set up by the UE and the first AMF as the current NAS security context, discards a new NAS security context set up by the UE and the initial AMF, and/or discards a current NAS security context set up by the UE and the initial AMF. The first AMF is an AMF accessed by the UE last time, and a second AMF is an AMF that is selected to serve the UE when the AMF redirection is performed. The third indication is used to notify that the AMF redirection occurs on a network side, indicate the UE to use the first NAS security context, indicate the UE to activate the first NAS security context, indicate the UE to use the first NAS security context as the current NAS security context, discard the new NAS security context set up by the UE and the initial AMF, discard the current security context set up by the UE and the initial AMF, indicate the UE to resume using the first NAS security context set up by the UE and the first AMF, indicate the UE to use the old NAS security context set up by the UE and the first AMF, indicate the UE to use the first NAS security context as the current NAS security context, indicate the UE to use the old security context set up by the UE and the first AMF as the current NAS security context, indicate the UE to discard the new NAS security context set up by the UE and the initial AMF, and/or indicate the UE to discard the current NAS security context set up by the UE and the initial AMF.

The initial AMF may send the third indication after the initial AMF determines to perform the AMF redirection via a (R)AN and before the initial AMF sends a NAS reroute message to the (R)AN.

According to the method for mobility registration provided in this embodiment of this application, the user equipment stores the first NAS security context based on the received first NAS SMC message, and resumes using the stored first NAS security context after receiving the third indication, so that before a NAS message sent by the second AMF is received, a NAS security context on the user equipment is the first NAS security context.

With reference to the fifth aspect, in some implementations of the fifth aspect, the third indication includes an eighth NAS message, or referred to as a redirection notification message, received by the user equipment from the initial AMF, where the eighth NAS message is also referred to as the redirection notification message, or a NAS message that carries an eighth indication (or referred to as a redirection indication) and that is received by the user equipment from the initial AMF. The eighth NAS message, or referred to as the redirection notification message, is a newly added NAS message. The eighth indication, or referred to as the redirection indication, is a newly added IE and is carried in an existing NAS message. This embodiment of this application imposes no limitation on the existing NAS message that carries the eighth indication. Possible options of the NAS message include a configuration update command message, a downlink NAS transport message, a 5GMM status message, a registration reject message, and the like.

With reference to the fifth aspect, in some implementations of the fifth aspect, the method includes that after the UE receives the first NAS SMC message sent by the initial AMF, the user equipment needs to store the old NAS security context, that is, the first NAS security context, if any, set up between the UE and the first AMF. After the initial AMF determines to perform the AMF redirection via the (R)AN, the initial AMF needs to send, to the UE, a NAS message that carries the eighth indication. Based on the eighth indication, the UE needs to discard the NAS security context that is newly set up, and resume using the old NAS security context, that is, the first NAS security context. The new NAS security context is a security context set up by the UE and the initial AMF by using a NAS security mode control procedure.

According to the method for mobility registration provided in this embodiment of this application, the user equipment may use, based on a plurality of possible solutions, the first NAS security context as the current NAS security context when receiving the third indication. If the third indication is the eighth indication, or referred to as the redirection indication, carried in the NAS message received by the user equipment from the initial AMF, the user equipment first uses the first NAS security context as the current NAS security context based on the eighth indication, and then processes the NAS message.

With reference to the fifth aspect, in some implementations of the fifth aspect, the first NAS SMC message includes a fourth indication, and the fourth indication is used to indicate the user equipment to store the first NAS security context.

According to the method for mobility registration provided in this embodiment of this application, after receiving the first NAS SMC message, the user equipment may store the first NAS security context based on the fourth indication carried in the first NAS SMC message, or may determine, based on the received first NAS SMC message, to store the first NAS security context. This provides a flexible selection solution.

According to a sixth aspect, a method for mobility registration is provided. The method is applied to a case of AMF redirection AMF, and includes that an initial AMF sends a first NAS SMC message to user equipment, and the initial AMF sends a third indication to the user equipment after the initial AMF determines to perform redirection and before the initial AMF sends a NAS reroute message to a (R)AN. The third indication is used to notify the UE that the AMF redirection occurs, indicate the UE to use a first NAS security context, indicate the UE to activate the first NAS security context, indicate the UE to use the first NAS security context as a current NAS security context, indicate the UE to discard a new NAS security context set up by the UE and the initial AMF, indicate the UE to discard a current security context set up by the UE and the initial AMF, indicate the UE to resume using the first NAS security context set up by the UE and a first AMF, indicate the UE to use an old NAS security context set up by the UE and the first AMF, indicate the UE to use the first NAS security context as the current NAS security context, indicate the UE to use the old security context set up by the UE and the first AMF as the current NAS security context, indicate the UE to discard the new NAS security context set up by the UE and the initial AMF, and/or indicate the UE to discard the current NAS security context set up by the UE and the initial AMF.

According to the method for mobility registration provided in this embodiment of this application, the initial AMF sends the first NAS SMC message to the user equipment, and the user equipment stores the first NAS security context based on the first NAS SMC, and resumes using the stored first NAS security context after receiving the third instruction, so that before a NAS message sent by a second AMF is received, a NAS security context on the user equipment is the first NAS security context.

With reference to the sixth aspect, in some implementations of the sixth aspect, the first NAS SMC message includes a fourth indication, and the fourth indication is used to indicate the user equipment to store the first NAS security context.

According to the method for mobility registration provided in this embodiment of this application, after receiving the first NAS SMC message, the user equipment may store the first NAS security context based on the fourth indication carried in the first NAS SMC message, or may determine, based on the received first NAS SMC message, to store the first NAS security context. This provides a flexible selection solution.

With reference to the sixth aspect, in some implementations of the sixth aspect, the third indication sent by the initial AMF to the user equipment includes an eighth NAS message, or referred to as a redirection notification message, sent by the initial AMF to the user equipment, where the eighth NAS message is also referred to as the redirection notification message, or a NAS message that carries an eighth indication (or referred to as a redirection indication) and that is sent by the initial AMF to the user equipment. The eighth NAS message, for example, the redirection notification message, is a newly added NAS message. The eighth indication, or referred to as the redirection indication, is a newly added IE and is carried in an existing NAS message. This embodiment of this application imposes no limitation on the existing NAS message that carries the eighth indication, or referred to as the redirection indication. Possible options of the NAS message include a configuration update command message, a downlink NAS transport message, a 5GMM status message, a registration reject message, and the like.

According to the method for mobility registration provided in this embodiment of this application, when receiving the NAS message sent by the second AMF, the user equipment may process the NAS message by using the first NAS security context based on a plurality of possible solutions.

According to a seventh aspect, a method for mobility registration is provided. The method is applied to a case of AMF redirection AMF, and includes that an initial AMF determines first key information, where the first key information includes a current NAS security context of the initial AMF, and the current NAS security context includes a key used by the initial AMF and NAS counts, and the initial AMF sends the first key information to a first AMF, where the first AMF is an AMF accessed by UE last time.

According to the method for mobility registration provided in this embodiment of this application, the initial AMF may send, to the first AMF, the first key information carrying related information about the AMF key used by the initial AMF, so that the first AMF can learn of a status of the AMF key currently used by the initial AMF.

With reference to the seventh aspect, in some implementations of the seventh aspect, the initial AMF performs primary authentication to generate a second key and a second key identifier corresponding to the second key, where the first key information includes the second key and the second key identifier, or the initial AMF performs primary authentication to generate a second key and a second key identifier corresponding to the second key, and performs key derivation on the second key to obtain a third key, where the first key information includes the third key, the second key identifier, and first indication information, and the first indication information is used to indicate that the third key is a key obtained after the initial AMF performs derivation.

According to the method for mobility registration provided in this embodiment of this application, when the initial AMF performs primary authentication to generate a new AMF key and a new AMF key identifier (the second key and the second key identifier), the initial AMF needs to notify the first AMF of the first key information carrying the newly generated AMF key and the new AMF key identifier. Alternatively, the initial AMF not only performs primary authentication to generate a new AMF key and a new AMF key identifier but also performs key derivation to obtain the second key based on the new AMF key. In this case, the initial AMF needs to notify the first AMF of the first key information carrying the third key, the second key identifier, and the first indication information used to indicate key derivation.

With reference to the seventh aspect, in some implementations of the seventh aspect, the initial AMF obtains a fourth key from the first AMF, where the fourth key is a key derived from a first key, the first key is an AMF key created by the user equipment and the first AMF, and a first key identifier is a next-generation key set identifier corresponding to the first key.

The first key information includes the fourth key or second indication information, where the second indication information is used to indicate that the key used by the initial AMF is the fourth key, or the second indication information is used to indicate that the first AMF performs key derivation, or the first key information includes a fifth key obtained by performing, by the initial AMF, key derivation on the fourth key, and the first indication information used to indicate key derivation.

According to the method for mobility registration provided in this embodiment of this application, when the initial AMF does not perform primary authentication and uses the fourth key that is obtained from the first AMF through key derivation, the initial AMF needs to notify the first AMF of the first key information carrying the fourth key or the second indication information, where the second indication information is used to indicate that the key used by the initial AMF is the fourth key. Alternatively, after obtaining the fourth key from the first AMF, the initial AMF further performs key derivation, and obtains the fifth key through derivation based on the fourth key. In this case, the initial AMF needs to notify the first AMF of the first key information carrying the fifth key and the first indication information, where the first indication information is used to indicate key derivation.

With reference to the seventh aspect, in some implementations of the seventh aspect, the first key information further includes the first key identifier corresponding to the first key.

According to the method for mobility registration provided in this embodiment of this application, because a key identifier corresponding to a key derived from the first key is the same as the first key identifier corresponding to the first key, when the first AMF knows the first key identifier, the initial AMF may include or may not include the first key identifier in the first key information. This is not limited in this application.

According to an eighth aspect, a method for mobility registration is provided. The method is applied to a case of AMF redirection AMF, and includes that a first AMF receives first key information sent by an initial AMF, where the first key information includes a key used by the initial AMF and NAS counts, and the first AMF is an AMF accessed by UE last time, and the first AMF stores the first key information.

If the first key information includes second indication information used to indicate key derivation or used to indicate that the key used by the initial AMF is a fourth key, the first AMF first performs derivation based on a first key created with the UE, to obtain the fourth key, and stores the fourth key by including the fourth key in the first key information.

The first AMF receives a UE context request message sent by a target AMF, and verifies, based on a security context set up with the UE, integrity of a registration request message carried in the UE context request message. The first AMF includes second key information in a UE context request response and sends the response to a second AMF. The second key includes the first key. The second AMF is an AMF that is selected to serve the user equipment when the first AMF redirection is performed.

If the first key information received by the first AMF includes first indication information, the first AMF includes, in the second key information, fourth indication information used to indicate key derivation.

According to the method for mobility registration provided in this embodiment of this application, the initial AMF may send, to the first AMF, the first key information carrying related information about the AMF key used by the initial AMF, so that the first AMF can learn of a status of the AMF key currently used by the initial AMF, and stores the first key information.

With reference to the eighth aspect, in some implementations of the eighth aspect, the first key information includes a second key and a second key identifier, where the second key and the second key identifier are generated by the initial AMF by performing primary authentication, or a third key, the second key identifier, and the first indication information, where the third key is obtained by performing key derivation on the second key, and the first indication information is used to indicate key derivation.

According to the method for mobility registration provided in this embodiment of this application, when the initial AMF performs primary authentication to generate a new AMF key and a new AMF key identifier (the second key and the second key identifier), the initial AMF needs to notify the first AMF of the first key information carrying the newly generated AMF key and the new AMF key identifier. Alternatively, the initial AMF not only performs primary authentication to generate a new AMF key and a new AMF key identifier but also performs key derivation to obtain the second key. In this case, the initial AMF needs to notify the first AMF of the first key information carrying the third key, the second key identifier, and the first indication information, where the first indication information is used to indicate key derivation.

With reference to the eighth aspect, in some implementations of the eighth aspect, the first key information includes the fourth key or the second indication information, where the second indication information is used to indicate that the key used by the initial AMF is the fourth key, or a fifth key and the first indication information, where the fifth key is obtained by performing key derivation on the fourth key, and the first indication information is used to indicate that the fifth key is a key obtained after the initial AMF performs derivation.

According to the method for mobility registration provided in this embodiment of this application, when the initial AMF does not perform primary authentication and uses the fourth key that is obtained from the first AMF through key derivation, the initial AMF needs to notify the first AMF of the first key information carrying the fourth key or the second indication information, where the second indication information is used to indicate that the key used by the initial AMF is the fourth key, or the second indication information is used to indicate the initial AMF to perform key derivation. Alternatively, after obtaining the fourth key from the first AMF, the initial AMF further performs key derivation, and obtains the fifth key through derivation based on the fourth key. In this case, the initial AMF needs to notify the first AMF of the first key information carrying the fifth key and the first indication information, where the first indication information is used to indicate key derivation.

With reference to the eighth aspect, in some implementations of the eighth aspect, the first key information further includes a first key identifier corresponding to the first key.

According to the method for mobility registration provided in this embodiment of this application, because a key identifier corresponding to a key derived from the first key is the same as the first key identifier corresponding to the first key, when the first AMF knows the first key identifier, the initial AMF may include or may not include the first key identifier in the first key information. This is not limited in this application.

With reference to the eighth aspect, in some implementations of the eighth aspect, the method further includes that the first AMF sends the second key information to the second AMF, where the second key information includes third indication information and a key that is generated through derivation from the key in the first key information, and the third indication information is used to indicate key derivation.

According to the method for mobility registration provided in this embodiment of this application, the first AMF may notify the second AMF of the first key information obtained from the initial AMF. Alternatively, after obtaining the first key information, the first AMF performs key derivation. In this case, the first AMF notifies the second AMF of the key obtained after the derivation and the third indication information that is used to indicate key derivation.

According to a ninth aspect, a method for mobility registration is provided. The method is applied to a case of AMF redirection AMF, and includes that a second AMF receives second key information from a first AMF, where the second key information includes one of the following key information first key information, where the first key information includes a key used by an initial AMF and NAS counts, or a key derived from a key included in the first key information, third indication information indicating the key derivation, and the NAS counts.

If the second key information received by the second AMF includes the third indication information used to indicate key derivation and/or fourth indication information used to indicate key derivation, the second AMF sends a second NAS SMC message to user equipment, where the second NAS SMC message includes derivation indication information and/or fifth indication information. The derivation indication information is used to indicate that a key included in the second key information is a key obtained after derivation, and the fifth indication information is used to indicate that the key included in the first key information is a key obtained after derivation. The second AMF activates or uses the key in the received second key information to protect a subsequent NAS message.

With reference to the ninth aspect, in some implementations of the ninth aspect, the second key information includes a second key and a second key identifier, where the second key and the second key identifier are generated by the initial AMF by performing primary authentication, a third key, the second key identifier, and the third indication information indicating the key derivation, where the third key is obtained by performing key derivation on the first key, the third key, the second key identifier, and the fourth indication information indicating the key derivation, where the third key is obtained by performing key derivation on the second key, a seventh key, the second key identifier, the fourth indication information indicating the key derivation, and the third indication information indicating the key derivation, a fourth key and a first key identifier, a fifth key derived from the fourth key, the first key identifier, and the third indication information indicating the key derivation, the fifth key derived from the fourth key, the first key identifier, and the fourth indication information indicating the key derivation, or a sixth key derived from the fifth key, the first key identifier, the fourth indication information indicating the key derivation, and the third indication information indicating the key derivation.

With reference to the ninth aspect, in some implementations of the ninth aspect, the first key information further includes the first key identifier corresponding to the first key.

According to the method for mobility registration provided in this embodiment of this application, when the initial AMF notifies the first AMF of the first key information carrying a key derived from the first key, because a key identifier corresponding to the key derived from the first key is the same as the first key identifier corresponding to the first key, when the first AMF knows the first key identifier, the initial AMF may include or may not include the first key identifier in the first key information. This is not limited in this application.

According to a tenth aspect, a method for mobility registration is provided. The method is applied to a case of AMF redirection AMF, and includes that a UE receives a second NAS SMC message sent by a second AMF, where the second NAS SMC message includes derivation indication information and/or fifth indication information, the derivation indication information is used to indicate that a key included in second key information is a key obtained after derivation, and the fifth indication information is used to indicate that a key included in first key information is a key obtained after derivation, and the first key information includes a NAS security context used by an initial AMF, and the NAS security context includes a key used by the initial AMF, the user equipment performs key derivation based on the derivation indication information, and the user equipment performs key derivation based on the fifth indication information.

The second key information includes one of the following key information: the first key information, a key derived from the key included in the first key information, and the derivation indication information.

The second AMF is an AMF that is selected to serve the user equipment when the AMF redirection is performed.

With reference to the tenth aspect, in some implementations of the tenth aspect, the first key information includes a second key and a second key identifier, where the second key and the second key identifier are generated by the initial AMF by performing primary authentication, or a third key, the second key identifier, and the first indication information, where the third key is obtained by performing key derivation on the second key, and the first indication information is used to indicate that the second key is a key obtained after the initial AMF performs derivation.

According to the method for mobility registration provided in this embodiment of this application, when the initial AMF performs primary authentication to generate a new AMF key and a new AMF key identifier (the second key and the second key identifier), the initial AMF needs to notify the first AMF of the first key information carrying the newly generated AMF key and the new AMF key identifier. Alternatively, the initial AMF not only performs primary authentication to generate a new AMF key and a new AMF key identifier but also performs key derivation to obtain the second key. In this case, the initial AMF needs to notify the first AMF of the first key information carrying the second key, the first key identifier, and the first indication information, where the first indication information is used to indicate that the second key is a key obtained after the initial AMF performs derivation.

With reference to the tenth aspect, in some implementations of the tenth aspect, the first key information includes a fourth key or second indication information, where the second indication information is used to indicate that the key used by the initial AMF is the fourth key, or a fifth key and the first indication information used to indicate key derivation, where the fifth key is obtained by performing key derivation on the fourth key.

According to the method for mobility registration provided in this embodiment of this application, when the initial AMF does not perform primary authentication and uses the fourth key that is obtained from the first AMF through key derivation, the initial AMF needs to notify the first AMF of the first key information carrying the fourth key or the second indication information, where the second indication information is used to indicate that the key used by the initial AMF is the fourth key, or the second indication information is used to indicate the initial AMF to perform key derivation. Alternatively, after obtaining the fourth key from the first AMF, the initial AMF further performs key derivation, and obtains the fifth key through derivation based on the fourth key. In this case, the initial AMF needs to notify the first AMF of the first key information carrying the fifth key and the first indication information, where the first indication information is used to indicate that the fifth key is a key obtained after the initial AMF performs derivation.

With reference to the tenth aspect, in some implementations of the tenth aspect, the first key information further includes the first key identifier corresponding to the first key.

According to the method for mobility registration provided in this embodiment of this application, when the initial AMF notifies the first AMF of the first key information carrying a key derived from the first key, because a key identifier corresponding to the key derived from the first key is the same as the first key identifier corresponding to the first key, when the first AMF knows the first key identifier, the initial AMF may include or may not include the first key identifier in the first key information. This is not limited in this application.

According to an eleventh aspect, a method for mobility registration is provided. The method is applied to a case of AMF redirection AMF, and includes that an initial AMF determines whether to initiate a NAS security mode control procedure, and if the initial AMF determines to perform AMF redirection, the initial AMF directly performs an AMF redirection procedure without initiating the NAS security mode control procedure.

According to the method for mobility registration provided in this embodiment of this application, the other approaches mobility registration procedure is changed, so that when the initial AMF determines that AMF redirection needs to be performed, the initial AMF does not initiate the NAS security mode control procedure. In this case, a NAS security mode control procedure only needs to be performed between UE and a second AMF, to ensure that NAS security contexts on the UE and the second AMF are consistent.

According to a twelfth aspect, a method for mobility registration is provided. The method is applied to a case of AMF redirection AMF, and includes that an initial AMF receives a first NAS SMC complete message sent by UE, where the first NAS SMC complete message carries a complete registration request message, and the initial AMF decrypts the first NAS SMC complete message, to obtain the complete registration request message, the initial AMF determines to initiate AMF redirection, and the initial AMF sends a second indication to a second AMF, to notify that the AMF redirection occurs on a network side, and/or to indicate the second AMF to send indication information to the UE.

Further, that the initial AMF sends a second indication to a target AMF includes that the initial AMF sends a NAS reroute message carrying the second indication to a (radio) access network, and the (R)AN sends the second indication to the target AMF by including the second indication in an initial UE message.

With reference to the twelfth aspect, in a possible implementation, the second indication is the complete registration request message.

With reference to the twelfth aspect, in a possible implementation, the second indication is an indication indicating the second AMF to send indication information to the UE, and/or indicating the second AMF to notify that the AMF redirection occurs on the network side.

According to the method for mobility registration provided in this embodiment of this application, the NAS reroute message sent by the initial AMF to the (radio) access network carries the complete registration request message.

According to a thirteenth aspect, a method for mobility registration is provided. The method is applied to a case of AMF redirection AMF, and includes that a second AMF receives an initial user equipment message sent by a (radio) access network, where the initial user equipment message carries a complete registration request message, and the second AMF determines, based on the complete registration request message, that the AMF redirection occurs.

According to a fourteenth aspect, a method for mobility registration is provided. The method is applied to a case of AMF redirection AMF, and includes that a (radio) access network receives a NAS reroute message sent by an initial AMF, where the NAS reroute message carries a second indication used to notify that the AMF redirection occurs and/or used to indicate a second AMF to send indication information to UE, the (radio) access network sends an initial UE message to the second AMF, where the initial user equipment message carries the second indication, and the second AMF determines, based on the second indication, that the AMF redirection occurs.

According to the method for mobility registration provided in this embodiment of this application, the initial user equipment message received by the second AMF carries a complete registration request message.

It should be understood that the solutions provided in the twelfth aspect to the fourteenth aspect may be combined with the solutions provided in the first aspect to the eleventh aspect, and details will be provided in the following embodiments.

According to a fifteenth aspect, a method for mobility registration is provided. The method is applied to a case of AMF redirection AMF, and includes that after sending a registration request message, UE stores a first NAS security context, where the first NAS security context is a current NAS security context of the UE, or the first NAS security context is a NAS security context set up between the UE and a first AMF, the UE receives indication information sent by a second AMF, where the indication information is used to indicate the UE to use the first NAS security context, and the UE uses the first NAS security context as the current NAS security context based on the indication information, where the first AMF is an AMF accessed by the UE last time, and the second AMF is an AMF that is selected to serve the UE when the AMF redirection is performed.

With reference to the fifteenth aspect, in some implementations of the fifteenth aspect, the indication information includes a NAS message, for example, a redirection notification message, received by the user equipment from the second AMF, where the NAS message, for example, the redirection notification message, is used to notify the user equipment that the AMF redirection occurs on a network side, or an indication, or referred to as a redirection indication, carried in the NAS message received by the user equipment from the second AMF. The NAS message, for example, the redirection notification message, is a newly added NAS message. The indication, or referred to as the redirection indication, is a newly added IE and is carried in an existing NAS message. The existing NAS message carrying the indication is not limited in this embodiment of this application. Possible options of the NAS message include a configuration update command message, a security mode command message, an authentication request message, a downlink NAS transport message, a 5GMM status message, and the like.

According to the method for mobility registration provided in this embodiment of this application, the user equipment may use, based on a plurality of possible solutions, the first NAS security context as the current NAS security context when receiving a third indication. If the third indication is an indication, or referred to as a redirection indication, carried in a NAS message received by the user equipment from an initial AMF, the user equipment first uses the first NAS security context as the current NAS security context based on the indication, or referred to as the redirection indication, and then processes the NAS message.

According to a sixteenth aspect, a method for mobility registration is provided. The method is applied to a case of AMF redirection AMF, and includes that after sending a registration request message, UE stores a first NAS security context, where the first NAS security context is a current NAS security context of the UE, or the first NAS security context is a NAS security context set up between the UE and a first AMF, and the user equipment receives a third indication sent by an initial AMF, where the UE uses, based on the third indication, the first NAS security context as the current NAS security context. The first AMF is an AMF accessed by the UE last time, and a second AMF is an AMF that is selected to serve the UE when the AMF redirection is performed. The third indication is used to notify that the AMF redirection occurs on a network side, indicate the UE to use the first NAS security context, indicate the UE to activate the first NAS security context, and/or indicate the UE to use the first NAS security context as the current NAS security context.

According to the method for mobility registration provided in this embodiment of this application, the user equipment stores the first NAS security context after sending the registration message, and resumes using the stored first NAS security context after receiving the indication, or referred to as the redirection indication, from the AMF, so that before a NAS message sent by the second AMF is received, a NAS security context on the user equipment is the first NAS security context.

With reference to the sixteenth aspect, in some implementations of the sixteenth aspect, the third indication includes a NAS message, for example, a redirection notification message, received by the user equipment from the initial AMF, where the NAS message, for example, the redirection notification message, is used to notify the user equipment that the AMF redirection occurs on the network side, or an indication, or referred to as a redirection indication, carried in the NAS message received by the user equipment from the initial AMF. The NAS message, for example, the redirection notification message, is a newly added NAS message. The indication, or referred to as the redirection indication, is a newly added IE and is carried in an existing NAS message. This embodiment of this application imposes no limitation on the existing NAS message that carries the indication. Possible options of the NAS message include a configuration update command message, a downlink NAS transport message, a 5GMM status message, a registration reject message, and the like.

According to the method for mobility registration provided in this embodiment of this application, the user equipment may use, based on a plurality of possible solutions, the first NAS security context as the current NAS security context when receiving a third indication. If the third indication is an indication, or referred to as a redirection indication, carried in a NAS message received by the user equipment from an initial AMF, the user equipment first uses the first NAS security context as the current NAS security context based on the indication, or referred to as the redirection indication, and then processes the NAS message.

According to a seventeenth aspect, an apparatus for mobility registration is provided. The apparatus may be configured to perform operations performed by the user equipment in any one of the first aspect, the fifth aspect, the tenth aspect, and the possible implementations of the first aspect, the fifth aspect, and the tenth aspect. Further, the apparatus for mobility registration includes corresponding components (means) configured to perform the steps or the functions described in any one of the first aspect, the fifth aspect, the tenth aspect, and the possible implementations of the first aspect, the fifth aspect, and the twelfth aspect, and may be the user equipment in the first aspect, the fifth aspect, and the tenth aspect or a chip or a function module of the user equipment. The steps or the functions may be implemented by using software, hardware, or a combination of hardware and software.

According to an eighteenth aspect, an apparatus for mobility registration is provided. The apparatus may be configured to perform operations performed by the initial AMF in any one of the second aspect, the sixth aspect, the seventh aspect, the eleventh aspect, and the possible implementations of the second aspect, the sixth aspect, the seventh aspect, and the eleventh aspect. Further, the apparatus for mobility registration may include corresponding components (means) configured to perform the steps or the functions described in any one of the second aspect, the sixth aspect, the seventh aspect, the eleventh aspect, and the possible implementations of the second aspect, the sixth aspect, the seventh aspect, and the eleventh aspect, and may be the initial AMF in the second aspect, the sixth aspect, the seventh aspect, and the eleventh aspect or a chip or a function module of the initial AMF. The steps or the functions may be implemented by using software, hardware, or a combination of hardware and software.

According to a nineteenth aspect, an apparatus for mobility registration is provided. The apparatus may be configured to perform operations performed by the second AMF in any one of the third aspect, the tenth aspect, and the possible implementations of the third aspect and the tenth aspect. Further, the apparatus for mobility registration may include corresponding components (means) configured to perform the steps or the functions in any one of the third aspect, the tenth aspect, and the possible implementations of the third aspect and the tenth aspect, and may be the second AMF in the third aspect and the tenth aspect or a chip or a function module of the second AMF. The steps or the functions may be implemented by using software, hardware, or a combination of hardware and software.

According to a twentieth aspect, an apparatus for mobility registration is provided. The apparatus may be configured to perform operations performed by the first AMF in any one of the fourth aspect, the eighth aspect, and the possible implementations of the fourth aspect and the eighth aspect.

Further, the apparatus for mobility registration may include corresponding components (means) configured to perform the steps or the functions described in any one of the fourth aspect, the eighth aspect, and the possible implementations of the fourth aspect and the eighth aspect, and may be the first AMF in the fourth aspect and the eighth aspect or a chip or a function module of the first AMF. The steps or the functions may be implemented by using software, hardware, or a combination of hardware and software.

According to a twenty-first aspect, an apparatus for mobility registration is provided. The apparatus may be configured to perform the operations performed by the (radio) access network in any one of the fourteenth aspect or the possible implementations of the fourteenth aspect. Further, the apparatus for mobility registration may include corresponding components (means) configured to perform the steps or the functions described in any one of the fourteenth aspect or the possible implementations of the fourteenth aspect, and may be the (radio) access network in the fourteenth aspect or a chip or a function module of the (radio) access network. The steps or the functions may be implemented by using software, hardware, or a combination of hardware and software.

According to a twenty-second aspect, a communication device is provided. The communication device includes a processor, a transceiver, and a memory. The memory is configured to store a computer program. The transceiver is configured to perform the receiving and sending steps in the method for mobility registration in any one of the possible implementations of the first aspect to the sixteenth aspect. The processor is configured to invoke the computer program from the memory and run the computer program, to enable the communication device to perform the method for mobility registration in any one of the possible implementations of the first aspect to the sixteenth aspect.

Optionally, there are one or more processors and one or more memories.

Optionally, the memory may be integrated with the processor, or the memory and the processor may be separately disposed.

Optionally, the transceiver includes a transmitter and a receiver.

According to a twenty-third aspect, a system is provided, and the system includes the apparatus for mobility registration provided in the fifteenth aspect to the nineteenth aspect.

According to a twenty-fourth aspect, a computer program product is provided. The computer program product includes a computer program (which may also be referred to as code or instructions). When the computer program is run, a computer is enabled to perform the method in any one of the possible implementations of the first aspect to the sixteenth aspect.

According to a twenty-fifth aspect, a computer-readable medium is provided. The computer-readable medium stores a computer program (which may also be referred to as code or instructions). When the computer program is run on a computer, the computer is enabled to perform the method in any one of the possible implementations of the first aspect to the sixteenth aspect.

According to a twenty-sixth aspect, a chip system is provided, and includes a memory and a processor. The memory is configured to store a computer program. The processor is configured to invoke the computer program from the memory and run the computer program, so that a communication device on which the chip system is installed performs the method in any one of the possible implementations of the first aspect to the sixteenth aspect.

DESCRIPTION OF EMBODIMENTS

The following describes technical solutions of this application with reference to the accompanying drawings.

Figure 1:
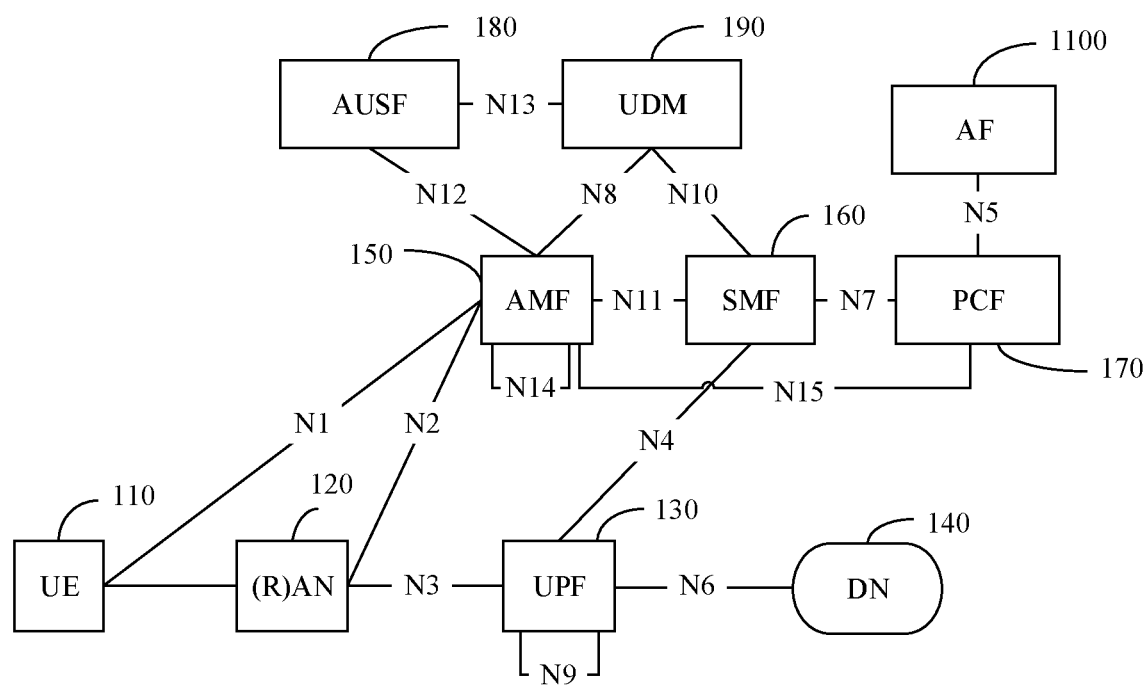
FIG. 1 is a network architecture applicable to an embodiment of this application.

FIG. 1 is a network architecture applicable to an embodiment of this application. As shown in FIG. 1, the following separately describes components in the network architecture.

1. User equipment 110 may include various handheld devices, vehicle-mounted devices, wearable devices, and computing devices that have a wireless communication function, other processing devices connected to a wireless modem, and various forms of terminals, mobile stations (MSs), and soft clients. For example, the user equipment may be a water meter, an electricity meter, or a sensor.

2. A (radio) access network ((R)AN) 120 is configured to provide a network access function for authorized user equipment in a specific area, and can use transmission tunnels of varying quality based on levels, service requirements, and the like of the user equipment.

The (R)AN can manage radio resources and provide an access service for user equipment, to forward a control signal and user equipment data between the user equipment and a core network. The (R)AN may also be understood as a base station in a conventional network.

3. A user plane network element 130 is used for packet routing and forwarding, quality of service (QoS) processing of user plane data, and the like.

In a 5G communication system, the user plane network element may be a user plane function (UPF) network element. In a future communication system, the user plane network element may still be the UPF network element, or may have another name. This is not limited in this application.

4. A data network element 140 is configured to provide a network for data transmission.

In the 5G communication system, the data network element may be a data network (DN) element. In the future communication system, the data network element may still be the DN network element, or may have another name. This is not limited in this application.

5. An access management network element 150 is mainly configured to perform mobility management, access management, and the like, and may be configured to implement functions, such as lawful interception and access authorization/authentication, other than session management in functions of a mobility management entity (MME).

In the 5G communication system, the access management network element may be an AMF. In the future communication system, the access management network element may still be the AMF, or may have another name. This is not limited in this application.

6. A session management network element 160 is mainly configured to manage a session, assign and manage an Internet Protocol (IP) address of user equipment, select an endpoint that can manage a UPF interface and a policy control and charging function interface, notify downlink data, and the like.

In the 5G communication system, the session management network element may be a session management function (SMF) network element. In the future communication system, the session management network element may still be the SMF network element, or may have another name. This is not limited in this application.

7. A policy control network element 170 is configured to guide a unified policy framework of network behavior, and provide policy rule information for a control plane function network element (such as an AMF or an SMF network element), and the like.

In a $4^{th}$ generation (4G) communication system, the policy control network element may be a policy and charging rules function (PCRF) network element. In the 5G communication system, the policy control network element may be a policy control function (PCF) network element. In the future communication system, the policy control network element may still be the PCF network element, or may have another name. This is not limited in this application.

8. An authentication server 180 is configured to authenticate a service, generate a key to implement two-way authentication for user equipment, and support a unified authentication framework.

In the 5G communication system, the authentication server may be an authentication server function (AUSF) network element. In the future communication system, the authentication server function network element may still be the AUSF network element, or may have another name. This is not limited in this application.

9. A data management network element 190 is configured to process a user equipment identity, perform access authentication, registration, mobility management, and the like.

In the 5G communication system, the data management network element may be a unified data management (UDM) network element. In the 4G communication system, the data management network element may be a home subscriber server (HSS) network element. In the future communication system, the UDM may still be the UDM network element, or may have another name. This is not limited in this application.

10. An application network element 1100 is configured to perform application-affected data routing, access a network exposure function network element, interact with a policy framework to perform policy control, and the like.

In the 5G communication system, the application network element may be an application function (AF) network element. In the future communication system, the application network element may still be the AF network element, or may have another name. This is not limited in this application.

11. Network repository network element is configured to maintain real-time information of all network function services in a network.

In the 5G communication system, the network repository network element may be a network registration function (NRF) network element. In the future communication system, the network repository network element may still be the NRF network element, or may have another name. This is not limited in this application.

It may be understood that the foregoing network elements or functions may be network elements in a hardware device, software functions running on dedicated hardware, or virtualized functions instantiated on a platform (for example, a cloud platform). For ease of description, that the access management network element is an AMF, the data management network element is a UDM network element, the session management network element is an SMF network element, and the user plane network element is a UPF network element is used as an example for subsequent description in this application.

Further, the AMF network element is referred to as an AMF for short, the UDM network element is referred to as a UDM for short, the SMF network element is referred to as an SMF for short, and the UPF network element is referred to as a UPF for short. To be specific, in subsequent descriptions in this application, the AMF may be replaced with an access management network element, the UDM may be replaced with a data management network element, the SMF may be replaced with a session management network element, and the UPF may be replaced with a user plane network element.

For ease of description, in the embodiments of this application, a method for mobility registration is described by using an example in which apparatuses are an AMF entity and a UDM entity. For an implementation method in which the apparatuses are a chip in an AMF entity and a chip in a UDM entity, refer to specific descriptions in which the apparatuses are the AMF entity and the UDM entity. Details are not described herein.

In the network architecture shown in FIG. 1, the user equipment is connected to the AMF through an N1 interface, the RAN is connected to the AMF through an N2 interface, and the RAN is connected to the UPF through an N3 interface. UPFs are connected to each other through an N9 interface, and the UPF is interconnected to a DN through an N6 interface. The SMF controls the UPF through an N4 interface. The AMF is connected to the SMF through an N11 interface. The AMF obtains subscription data of the user equipment from a UDM through an N8 interface. The SMF obtains the subscription data of the user equipment from the UDM unit through an N10 interface.

It should be understood that the foregoing network architecture applied to the embodiments of this application is merely an example, and a network architecture applicable to the embodiments of this application is not limited thereto. Any network architecture that can implement functions of the foregoing network elements is applicable to the embodiments of this application.

For example, in some network architectures, network function network elements and entities such as the AMF, the SMF network element, the PCF network element, a Bootstrapping Server Function (BSF) network element, and the UDM network element are all referred to as network function (NF) network elements. Alternatively, in some other network architectures, a set of network elements such as the AMF, the SMF network element, the PCF network element, a BSF network element, and the UDM network element may be referred to as control plane function network elements.

The technical solutions of the embodiments of this application may be applied to various communication systems, such as a Global System for Mobile Communications (GSM) system, a code-division multiple access (CDMA) system, a wideband CDMA (WCDMA) system, a General Packet Radio Service (GPRS) system, a Long Term Evolution (LTE) system, an LTE frequency division duplex (FDD) system, an LTE time division duplex (TDD), a Universal Mobile Telecommunications System (UMTS), a worldwide interoperability for microwave access (WIMAX) communication system, a future 5G system, or a New Radio (NR) system.

The user equipment in the embodiments of this application may also be referred to as an access terminal, a subscriber unit, a subscriber station, a mobile station, a remote station, a remote terminal, a mobile device, a user terminal, a terminal, a wireless communication device, a user agent, or a user apparatus. The user equipment may alternatively be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, a vehicle-mounted device, a wearable device, user equipment in a future 5G network, user equipment in a future evolved public land mobile network (PLMN), or the like. This is not limited in the embodiments of this application.

A network device in the embodiments of this application may be a device configured to communicate with the user equipment. The network device may be a base transceiver station (BTS) in the GSM or the CDMA system, may be a NodeB (NB) in the WCDMA system, may be an evolved NodeB (eNB or eNodeB) in the LTE system, or may be a radio controller in a cloud radio access network (CRAN) scenario. Alternatively, the network device may be a relay node, an access point, a vehicle-mounted device, a wearable device, a network device in the future 5G network, a network device in a future evolved PLMN network, or the like. This is not limited in the embodiments of this application.

In the embodiments of this application, the user equipment or the network device includes a hardware layer, an operating system layer running above the hardware layer, and an application layer running above the operating system layer. The hardware layer includes hardware such as a central processing unit (CPU), a memory management unit (MMU), and a memory (or a main memory). The operating system may be any one or more computer operating systems that implement service processing through a process, for example, a LINUX operating system, a UNIX operating system, an ANDROID operating system, an IOS operating system, or a WINDOWS operating system. The application layer includes applications such as a browser, an address book, word processing software, and instant messaging software. In addition, a specific structure of an entity for performing a method provided in the embodiments of this application is not particularly limited in the embodiments of this application, provided that a program recording code of the method provided in the embodiments of this application can be run to perform communication according to the method provided in the embodiments of this application. For example, the entity for performing the method provided in the embodiments of this application may be the user equipment or the network device, or may be a function module capable of invoking and executing the program in the user equipment or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD), a DIGITAL VERSATILE DISC (DVD), a smart card, or a flash memory component (for example, an erasable programmable read-only memory (ROM) (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

The AMF, the UE, the (R)AN, the AUSF, and the UDM in the network architecture shown in FIG. 1 are mainly involved in the embodiments of this application. For the AMF, an initial AMF, a first AMF, and a second AMF are involved in this application.

Further, the first AMF in this application is an AMF that serves the UE last time, that is, an AMF that serves the UE before a current registration moment, and may also be referred to as an AMF accessed by the UE last time. The initial AMF in this application is an AMF selected by the (R)AN when the current UE initiates a registration request. The second AMF in this application is another AMF that is selected to serve the UE after the initial AMF determines to perform AMF redirection and that is different from the initial AMF.

Further, the AUSF and UDM network elements in this application are mainly configured to perform primary authentication.

Further, for ease of description, in the embodiments of this application, an AMF key included in a first NAS security context set up between the UE and the first AMF is denoted as Kamf, and Kamf may also be referred to as a first key or an old key. An identifier corresponding to Kamf is denoted as ngKSI, and ngKSI is also referred to as a first key identifier or an old key identifier. The first NAS security context may also be referred to as an old NAS security context.

After the initial AMF and the UE perform primary authentication, an activated and used key generated after the primary authentication is denoted as Kamf_new, and a key identifier is denoted as ngKSI_new, where Kamf_new may also be referred to as a second key, and ngKSI_new may also be referred to as a second key identifier.

A key generated after key derivation is performed on Kamf_new is denoted as Kamf_new', and Kamf_new' may also be referred to as a third key. Further, if a key generated after key derivation has a key identifier consistent with that corresponding to a derived key, a key identifier corresponding to Kamf_new' is also denoted as ngKSI_new, and is referred to as the second key identifier.

A key generated after key derivation is performed on Kamf is denoted as Kamf', and Kamf' may also be referred to as a fourth key. Further, if a key generated after key derivation has a key identifier consistent with that corresponding to a derived key, a key identifier corresponding to Kamf' is also denoted as ngKSI.

A key generated after key derivation is performed on Kamf' is denoted as Kamf'', and Kamf'' may also be referred to as a fifth key. Further, if a key generated after key derivation has a key identifier consistent with that corresponding to a derived key, a key identifier corresponding to Kamf'' is also denoted as ngKSI.

A key generated after key derivation is performed on Kamf'' is denoted as Kamf''', and Kamf''' may also be referred to as a sixth key. Further, if a key generated after key derivation has a key identifier consistent with that corresponding to a derived key, a key identifier corresponding to Kamf''' is also denoted as ngKSI.

A key generated after key derivation is performed on Kamf_new' is denoted as Kamf_new'', and Kamf_new'' may also be referred to as a seventh key. Further, if a key generated after key derivation has a key identifier consistent with that corresponding to a derived key, a key identifier corresponding to Kamf_new'' is also denoted as ngKSI_new.

It should be understood that, the embodiments of this application impose no limitation on a derivation mechanism and a parameter that are used to perform key derivation on a key to generate a new key. However, a new key generated through key derivation cannot be used to obtain a derived key through key derivation. Alternatively, it may be referred to as that the new key is isolated from the derived key.

In a possible implementation, the key derivation in this application may be horizontal key derivation defined in an existing protocol.

In another possible implementation, the key derivation in this application may be a key derivation manner agreed on between different network elements.

It should be understood that in the embodiments of this application, a structure of a network element does not change, and only other signaling is newly added between network elements and/or an IE is newly added to signaling exchanged between existing network elements, to achieve an objective that needs to be achieved in a registration procedure in which AMF redirection occurs and that is provided in the embodiments of this application.

First, to facilitate understanding of a method in the registration procedure in which the AMF redirection occurs and that is provided in the embodiments of this application, the following briefly describes two scenarios, defined in an existing protocol, of a registration failure in the registration procedure in which the AMF redirection occurs.

Figure 2:
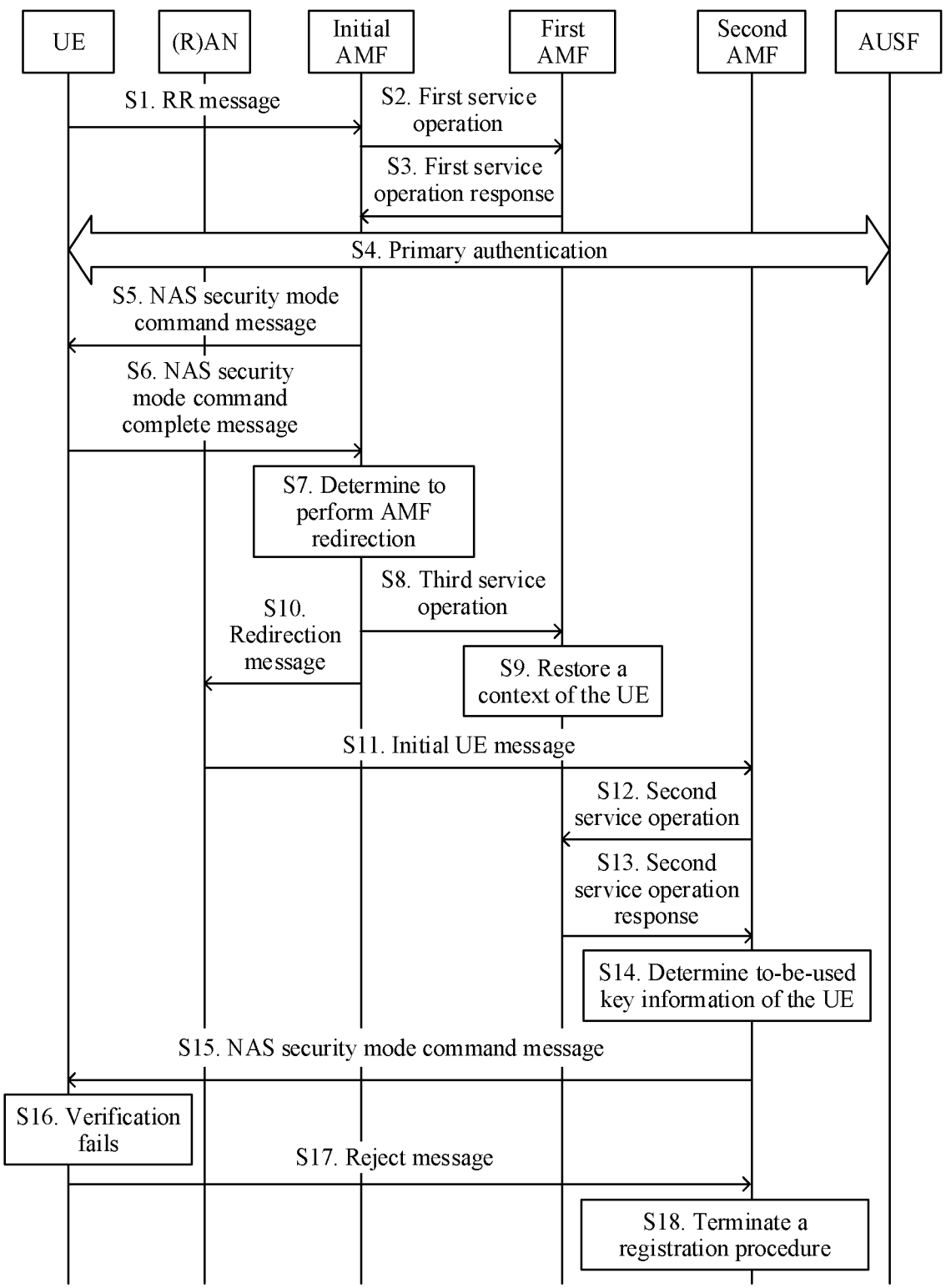
FIG. 2 is a schematic flowchart of AMF redirection.

First Scenario:

FIG. 2 is a schematic diagram of a registration procedure in which AMF redirection occurs. In the figure, UE, a (R)AN, an initial AMF, a first AMF, a second AMF, an AUSF, and S1 to S16 are included. A first NAS security context is set up between the UE and the first AMF that serves the UE last time, the UE and the first AMF store a same AMF key, which is denoted as Kamf, and a key identifier corresponding to Kamf is denoted as ngKSI.

S1. The UE sends a registration request (RR) message to the initial AMF, where the RR message carries a 5G-GUTI of the UE.

It should be understood that in this embodiment of this application, that the UE sends the RR message to the initial AMF means that the UE sends the RR message to the (R)AN, and then the (R)AN sends the RR message to the initial AMF. Because the (R)AN can perform transparent transmission, in this step, for brevity of description, that the UE sends the RR message to the initial AMF is directly described in this embodiment of this application and the accompanying drawing.

S2. The initial AMF invokes a first service operation from the first AMF. Further, after receiving the RR message sent by the UE, the initial AMF determines, based on the 5G-GUTI in the RR message, the first AMF that serves the UE last time, and invokes the first service operation from the first AMF. The first service operation may be referred to as Namf_Communication_UEContextTransfer, and is used to request a context of the UE from the first AMF. The context of the UE includes the security context of the UE, and the security context of the UE includes an AMF key set up between the UE and the first AMF and an identifier corresponding to the AMF key.

S3. The first AMF sends a first service operation response to the initial AMF. Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransfer Response. Further, the first service operation response includes Kamf or Kamf', and a key identifier ngKSI corresponding to Kamf or Kamf'.

It should be understood that verification of integrity protection for a message in this embodiment of this application means A message receiver obtains a message authentication code by calculating a received message by using an agreed algorithm (and key), and compares the message authentication code with a received message authentication code.

Further, when the first service operation response includes Kamf, the first AMF directly includes the AMF key used by the UE and the first AMF in the first service operation response, and notifies the initial AMF of the AMF key.

Alternatively, when the first service operation response includes Kamf', the first AMF performs key derivation based on the key Kamf used by the UE and the first AMF, to generate a new key, which is denoted as Kamf'. Further, in this case, the first service operation response further includes a key derivation indication. The key derivation indication is used to indicate that the first AMF performs key derivation on the key Kamf' included in the first service operation response. The key derivation indication may be referred to as keyAMFHDerivationInd.

It should be understood that a manner in which the first AMF obtains Kamf' is not limited in this embodiment of this application. Kamf' may be obtained by using a horizontal key derivation method specified in an existing protocol, or may be obtained by using another agreed derivation algorithm and parameter. Details are not described in this application.

The key identifiers corresponding to Kamf and Kamf' are the same, and are denoted as ngKSI. The key and the key identifier may be collectively referred to as key information. The first service operation response may further carry ngKSI.

S4. The initial AMF initiates a primary authentication procedure, and the UE and the initial AMF separately generate Kamf_new and an identifier ngKSI_new corresponding to Kamf_new.

Further, after obtaining Kamf or Kamf' from the first AMF, the initial AMF may perform one of the following operations:

Operation 1: If the first AMF sends Kamf, directly use Kamf sent by the first AMF.

Operation 2: If the first AMF sends Kamf', directly use Kamf' sent by the first AMF.

Operation 3: The initial AMF performs primary authentication without using the key sent by the first AMF, to generate the new AMF key Kamf_new and the new key identifier ngKSI_new.

In the AMF redirection procedure shown in FIG. 2, the initial AMF performs the foregoing operation 3. After performing the operation 3, the initial AMF performs the following NAS SMC procedure, so that the AMF key on the UE side is Kamf_new generated through the primary authentication. That is, the following steps S5 and S6 are performed.

S5. The initial AMF sends a NAS SMC message to the UE. Unless otherwise specified, the NAS SMC message in the following descriptions is the NAS SMC message. When NAS SMC represents NAS security mode control, special descriptions are required.

Further, the NAS SMC message carries an indication for requesting a complete initial NAS message. Because this application mainly relates to the registration procedure of the UE, the indication for requesting the complete initial NAS message is an indication for requesting a complete registration request message. When no special explanation is provided below, the indication for requesting the complete initial NAS message is the indication for requesting the complete registration request message. The initial AMF activates and starts using Kamf_new generated through the primary authentication.

Further, the NAS SMC message is used by the initial AMF and the UE to negotiate about the used AMF key.

S6. The UE sends a NAS security mode command complete message to the initial AMF. The UE includes the complete initial NAS message in the NAS security mode complete message based on the indication for requesting the complete initial NAS message in the NAS SMC message. In this embodiment of this application, the complete initial NAS message mainly refers to the complete registration request message. The UE activates and starts using Kamf_new.

Further, a difference between the complete registration request message in this application and the registration request message in S1 lies in that information carried in the complete registration request message is cleartext and is not encrypted, while some information is cleartext and some information is encrypted in the registration request message in S1.

S7. The initial AMF determines, based on requested network slice selection assistance information (NSSAIs) carried in the complete registration request message in the security mode command complete message sent by the UE, to perform AMF redirection. This may be referred to as that the initial AMF determines to perform NAS reroute.

Further, in this embodiment of this application, a reason why the initial AMF determines to perform AMF redirection is not limited, and may be any reason for triggering AMF redirection specified in an existing protocol. For example, when the initial AMF cannot serve a network slice of the UE, the initial AMF determines to perform AMF redirection, to select the second AMF that can serve the UE. An existing protocol defines the following two manners for implementation of redirection, and the initial AMF may select either of the following manners:

Manner 1: If a connection can be established between the initial AMF and the second AMF, the initial AMF invokes an Namf_Communication_N1 Message Notify service operation from the second AMF.

Manner 2: If there is no connection between the initial AMF and the second AMF (where a possible cause is that the initial AMF and the second AMF belong to different network slices, and interworking between the initial AMF and the second AMF is not allowed), the initial AMF sends the received registration request message of the UE to the second AMF by using the (R)AN.

The foregoing manner 2 is considered in the registration procedure shown in FIG. 2.

S8. The initial AMF invokes a third service operation from the first AMF. The third service operation indicates a registration failure of the UE with the initial AMF.

Further, the third service operation may be referred to as Namf_Communication_RegistrationStatusUpdate, and a registration status of the UE carried in the third service operation is "NOT_TRANSFERRED".

S9. The first AMF restores the context of the UE. After receiving the invocation for the third service operation from the initial AMF, the first AMF restores the context of the UE to a state existing before S2, as if the first AMF never receives the invocation for Namf_Communication_UEContextTransfer sent by the initial AMF in S2.

S10. The initial AMF sends a redirection message to the (R)AN. The message may be referred to as a NAS reroute message. The RR message received from the UE in S1 is carried in the NAS reroute message and sent to the (R)AN.

S11. The (R)AN sends an initial UE message to the second AMF (target AMF), where the initial UE message carries the foregoing RR message.

S12. The second AMF invokes the first AMF to send a second service operation. The second service operation may be referred to as Namf_Communication_UEContextTransfer.

Further, in the foregoing manner 2, because the second AMF does not obtain the context of the UE (including the security context of the UE), the second AMF obtains the context of the UE from the first AMF based on the 5G-GUTI in the RR message.

S13. The first AMF sends a second service operation response to the second AMF. Further, the first AMF sends the second service operation response to the initial AMF after successfully authenticating the UE. Authentication of the UE by the first AMF means verification of integrity protection for the RR message. The second service operation response may be referred to as Namf_Communication_UEContextTransfer Response. The second service operation response includes Kamf or Kamf', and the key identifier ngKSI corresponding to Kamf or Kamf'.

An AMF key obtained by the second AMF may be Kamf or Kamf'. In this case, the second AMF may perform any one of the following operations:

Operation 1: If the first AMF sends Kamf, directly use Kamf sent by the first AMF.

Operation 2: If the first AMF sends Kamf', directly use Kamf' sent by the first AMF.

Operation 3: The second AMF performs primary authentication without using the key sent by the first AMF, to generate a new AMF key Kamf_new2 and a new key identifier ngKSI_new2.

In the AMF redirection procedure shown in FIG. 2, the second AMF performs the foregoing operation 2.

When the second service operation response includes Kamf', the first AMF performs key derivation based on the key Kamf used by the UE and the first AMF, to generate a new key, which is denoted as Kamf'. Further, in this case, the second service operation response further includes a key derivation indication. The key derivation indication is used to indicate that the first AMF performs key derivation on the key Kamf' included in the second service operation response. The key derivation indication may be referred to as keyAMFHDerivationInd.

S14. The second AMF determines to-be-used key information of the UE.

Further, the second AMF determines to use Kamf' sent by the first AMF.

S15. The second AMF sends a NAS SMC message to the UE. If the second AMF receives the key derivation indication from the first AMF, the second AMF needs to include the key derivation indication in the NAS SMC message, to indicate the UE to perform key derivation.

Further, in this embodiment of this application, the key derivation indication carried in the second service operation response sent by the first AMF to the second AMF is referred to as keyAMFHDerivationInd. The key derivation indication carried in the NAS SMC message sent by the second AMF to the UE may be referred to as K_AMF_change_flag, or may be referred to as an AMF key change indication, where a value of K_AMF_change_flag carried in the NAS SMC message is 1, to indicate the UE to perform key derivation.

S16. The UE fails to verify integrity protection for the NAS SMC message.

S17. The UE sends a reject message to the second AMF. The reject message may be referred to as a NAS SMC reject message.

S18. The second AMF terminates the registration procedure.

Further, when receiving the NAS SMC reject message, the second AMF terminates the registration procedure.

In the registration procedure in which the redirection occurs shown in FIG. 2, the AMF key set up between the UE and the first AMF is Kamf. After performing primary authentication, the initial AMF sets up the NAS security context by using the NAS SMC message, and the UE and the initial AMF use Kamf_new. The key obtained by the second AMF from the first AMF may be Kamf or Kamf'.

If the key obtained by the second AMF from the first AMF is Kamf, and Kamf is used, the key of the UE is Kamf_new, and the key of the second AMF is Kamf. The keys on the UE and the target AMF are inconsistent. As a result, the registration procedure is terminated.

If the key obtained by the second AMF from the first AMF is Kamf', and Kamf' is used, the second AMF sends the key derivation indication in the NAS SMC message, to indicate the UE to perform key derivation. The key derivation indication is referred to as K_AMF_change_flag. Further, a value of K_AMF_change_flag is 1. The key of the UE in this case is Kamf_new. After receiving the key derivation indication, the UE performs horizontal derivation on Kamf_new to obtain a key Kamf_new'. In this case, the key of the UE is Kamf_new', and the key of the second AMF is Kamf'. Inconsistency between the key of the UE and the key of the second AMF causes termination of the registration procedure.

In conclusion, in the registration procedure in which the redirection occurs shown in FIG. 2, regardless of whether the first AMF sends Kamf or Kamf' to the initial AMF, the initial AMF determines to perform primary authentication, and uses Kamf_new generated through the primary authentication. After receiving the AMF key (regardless of Kamf or Kamf') sent by the first AMF, the second AMF determines to use Kamf or Kamf' sent by the first AMF. In this case, key information on the UE is inconsistent with that on the second AMF, causing a registration failure.

In the procedure shown in FIG. 2, if in S13, the second AMF performs the operation 3, that is, the second AMF initiates primary authentication, after S13, the second AMF sends an authentication-related NAS message (for example, an authentication request message) to the UE, where the NAS message is not security protected. After receiving the NAS message that is not protected, the UE directly discards the NAS message. Because the UE has set up the security context with the network side and activated the security context, the UE discards the NAS message that is not security protected. As a result, the registration fails.

In the procedure shown in FIG. 2, if in S13, the second AMF performs the operation 1, that is, the second AMF directly uses Kamf sent by the first AMF, the second AMF may choose to send the NAS SMC. For example, when a security algorithm selected by the second AMF is different from a security algorithm selected by the first AMF, the second AMF may choose to send another NAS message in the registration procedure. After the UE receives the NAS SMC or the another NAS message in the registration procedure, the UE fails to verify integrity of the received message. This is because the key used by the second AMF is Kamf, and the key used by the UE is Kamf_new. As a result, the registration fails.

Figure 3:
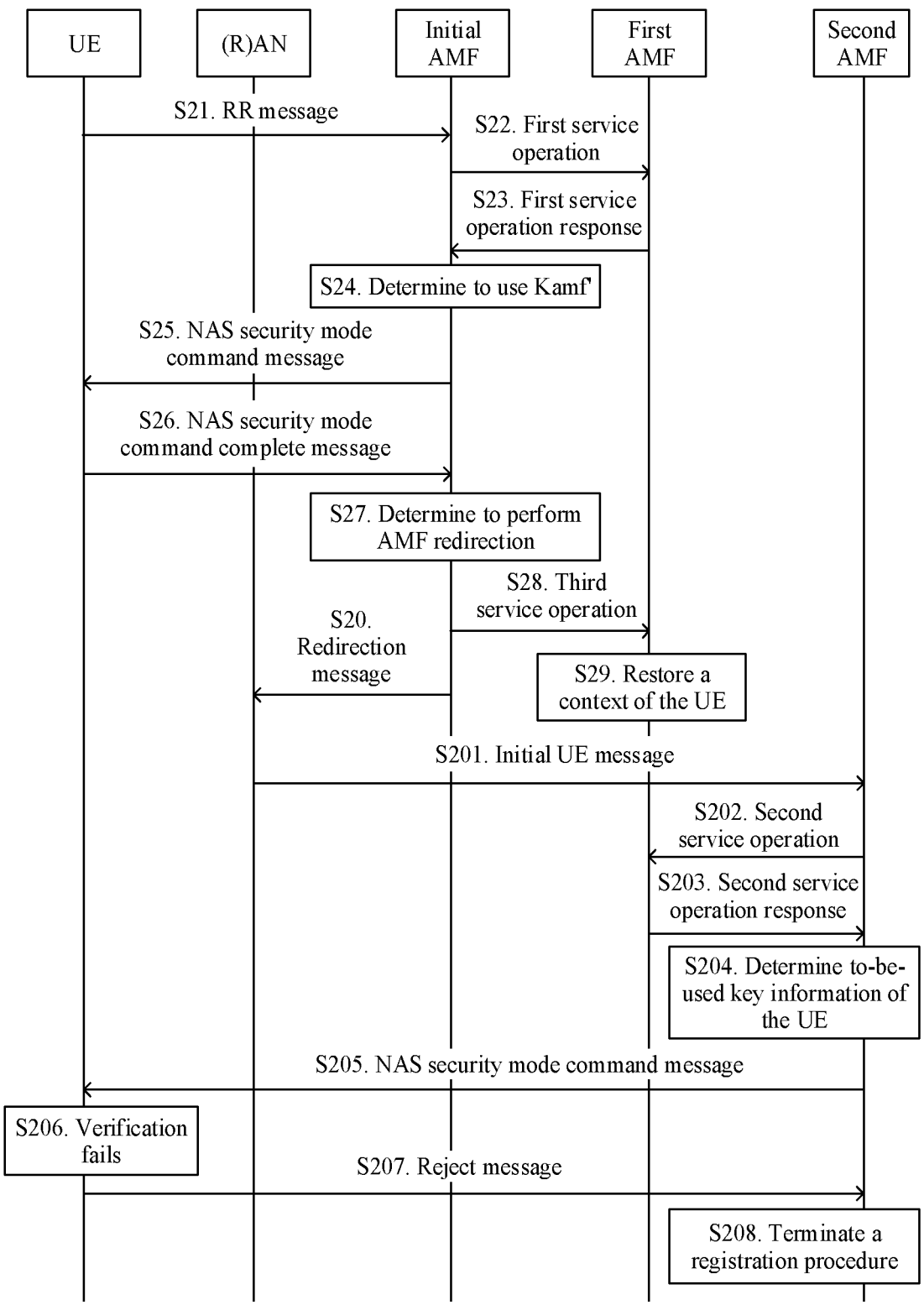
FIG. 3 is another schematic flowchart of AMF redirection.

Second Scenario:

FIG. 3 is another schematic diagram of a registration procedure in which AMF redirection occurs. In the figure, UE, a (R)AN, an initial AMF, a first AMF, a second AMF, and S21 to S208 are included. A security context is created by the UE and the first AMF that serves the UE last time, and the UE and the first AMF store a same AMF key, which is denoted as Kamf.

S21. The UE sends an RR message to the initial AMF, where the RR message carries a 5G-GUTI of the UE.

S22. The initial AMF invokes a first service operation from the first AMF. Further, after receiving the RR message sent by the UE, the initial AMF determines, based on the 5G-GUTI in the RR message, the first AMF that serves the UE last time, and invokes the first service operation from the first AMF. The first service operation may be referred to as Namf_Communication_UE Context Transfer, and is used to request a context of the UE.

S23. The first AMF sends a first service operation response to the initial AMF. Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransfer Response. Further, the first service operation response includes Kamf'.

It should be understood that when the first service operation response includes Kamf', the first AMF performs key derivation based on the key Kamf used by the UE and the first AMF, to generate a new key, which is denoted as Kamf'. The first AMF sends Kamf' to the initial AMF. It should be further understood that a manner in which the first AMF obtains Kamf' is not limited in this embodiment of this application. Kamf' may be obtained by using a key derivation method specified in an existing protocol, or may be obtained by using a key derivation algorithm and a parameter that are agreed on between network elements. Details are not described in this application.

Further, when including Kamf', the first service operation response further includes a key derivation indication. In this case, the initial AMF needs to include a key derivation indication in a NAS SMC message, to indicate the UE to perform key derivation.

Further, in this embodiment of this application, the key derivation indication carried in the first service operation response sent by the first AMF to the initial AMF is referred to as keyAMFHDerivationInd, and the key derivation indication carried in the NAS SMC message sent by the initial AMF to the UE is referred to as K_AMF_change_flag, where a value of K_AMF_change_flag carried in the NAS SMC message is 1, to indicate the UE to perform horizontal key derivation.

S24. The initial AMF determines to use Kamf'.

Different from the method procedure shown in FIG. 2, in the method procedure shown in FIG. 3, the initial AMF does not perform primary authentication, but directly uses, after obtaining Kamf' based on the first service operation response, Kamf' sent by the first AMF (which may be understood as performing the operation 2 listed in S4).

S25. The initial AMF sends the NAS SMC message to the user equipment. The NAS SMC message carries an indication for requesting a complete initial NAS message. The initial AMF activates and starts using Kamf'.

S26. The UE sends a NAS security mode command complete message to the initial AMF. The UE includes a complete registration request message in the NAS security mode complete message based on the indication for requesting the complete initial NAS message in the NAS SMC message. The UE activates and starts using Kamf'.

S27. The initial AMF determines, based on requested NSSAIs carried in the complete registration request message in the security mode command complete message sent by the UE, to perform AMF redirection. This may be referred to as that the initial AMF determines to perform NAS reroute.

Further, in this embodiment of this application, a reason why the initial AMF determines to perform AMF redirection is not limited, and may be any reason for triggering AMF redirection specified in an existing protocol. For example, when the initial AMF cannot server a network slice requested by the UE, the initial AMF determines to perform AMF redirection, to select the second AMF that can serve the UE. An existing protocol defines the following two manners for implementation of redirection, and the initial AMF may select either of the following manners:

Manner 1: If a connection can be established between the initial AMF and the second AMF, the initial AMF invokes an Namf_Communication_N1 Message Notify service operation from the second AMF.

Manner 2: If there is no connection between the initial AMF and the second AMF (where a possible cause is that the initial AMF and the second AMF belong to different network slices, and interworking between the initial AMF and the second AMF is not allowed), the initial AMF sends the registration request, received in S21, of the UE to the second AMF by using the (R)AN.

The foregoing manner 2 is considered in the registration procedure in which the redirection occurs shown in FIG. 3.

S28. The initial AMF invokes a third service operation from the first AMF. The third service operation notifies, the UE that registration with the initial AMF fails.

Further, the third service operation may be referred to as Namf_Communication_RegistrationStatusUpdate, and a registration status of the UE carried in the third service operation is "NOT_TRANSFERRED".

S29. The first AMF restores the context of the UE. After receiving the invocation for the third service operation from the initial AMF, the first AMF restores the context of the UE to a state existing before S22, as if the first AMF never receives the invocation for Namf_Communication_UE Context Transfer sent by the initial AMF in S22.

S20. The initial AMF sends a redirection message to the (R)AN. The message may be referred to as a NAS reroute message. The RR message received from the UE in S21 is carried in the NAS reroute message and sent to the (R)AN.

S201. The (R)AN sends an initial UE message to the second AMF (target AMF), where the initial UE message carries the foregoing RR message.

S202. The second AMF invokes a second service operation from the first AMF. The second service operation may be referred to as Namf_Communication_UEContextTransfer.

Further, in the foregoing manner 2, because the second AMF does not obtain the context of the UE (including the security context of the UE), the second AMF obtains the context of the UE from the first AMF based on the 5G-GUTI in the RR message.

S203. The first AMF sends a second service operation response to the second AMF. Further, the first AMF sends the second service operation response to the initial AMF after successfully authenticating the UE. Authentication of the UE by the first AMF means verification of integrity protection for the registration request message. The second service operation response is Namf_Communication_UEContextTransfer Response, and the second service operation response includes Kamf or Kamf'.

An AMF key obtained by the second AMF may also be Kamf or Kamf'. In this case, the second AMF may perform the following operations:

Operation 1: If the first AMF sends Kamf, directly use Kamf sent by the first AMF.

Operation 2: If the first AMF sends Kamf', directly use Kamf' sent by the first AMF.

Operation 3: The second AMF performs primary authentication, to generate a new AMF key, which is denoted as Kamf_new2.

In the AMF redirection procedure shown in FIG. 3, the second AMF performs the foregoing operation 2.

When the second service operation response includes Kamf', the first AMF performs key derivation based on the key Kamf used by the UE and the first AMF, to generate a new key, which is denoted as Kamf'. Further, in this case, the second service operation response further includes a key derivation indication. The key derivation indication is used to indicate that the first AMF performs key derivation on the key Kamf' included in the second service operation response. The key derivation indication may be referred to as keyAMFHDerivationInd.

S204. The second AMF determines to-be-used key information of the UE.

Further, the second AMF determines to use Kamf or Kamf' sent by the first AMF.

S205. The second AMF sends a NAS SMC message to the UE. If the second AMF receives the key derivation indication from the first AMF, the second AMF needs to include the key derivation indication in the NAS SMC message, to indicate the UE to perform key derivation.

Further, in this embodiment of this application, the key derivation indication carried in the second service operation response sent by the first AMF to the second AMF is referred to as keyAMFHDerivationInd, and the key derivation indication carried in the NAS SMC message sent by the second AMF to the UE is referred to as K_AMF_change_flag, where a value of K_AMF_change_flag carried in the NAS SMC message is 1, to indicate the UE to perform horizontal key derivation.

S206. The UE fails to verify integrity protection for the NAS SMC message.

S207. The UE sends a reject message to the second AMF. The reject message is a NAS SMC reject message.

S208. The second AMF terminates the registration procedure.

Further, when receiving the NAS SMC reject message, the second AMF terminates the registration procedure.

In the registration procedure in which the redirection occurs shown in FIG. 3, the AMF key set up between the UE and the first AMF is Kamf. The initial AMF uses the NAS SMC message, so that the AMF key used by the UE and the initial AMF is Kamf'. The key obtained by the second AMF from the first AMF may be Kamf or Kamf'.

If the key obtained by the second AMF from the first AMF is Kamf, and Kamf is used, the key of the UE is Kamf' and the key of the second AMF is Kamf. The keys of the UE and the target AMF are inconsistent. As a result, the registration procedure is terminated.

If the key obtained by the second AMF from the first AMF is Kamf', and Kamf' is used, the second AMF includes the key derivation indication in the NAS SMC message, to indicate the UE to perform key derivation. The key derivation indication information is referred to as K_AMF_change_flag. Further, a value of K_AMF_change_flag is 1. The key of the UE in this case is Kamf'. After receiving K_AMF_change_flag whose value is 1, the UE performs key derivation by using Kamf' to obtain a key Kamf''. In this case, the key of the UE is Kamf'', and the key of the second AMF is Kamf'. Inconsistency between the key of the UE and the key of the second AMF causes termination of the registration procedure.

In conclusion, in the registration procedure in which the AMF redirection occurs shown in FIG. 3, the first AMF sends Kamf' to the initial AMF, and the initial AMF uses the NAS SMC message so that the AMF key used by the UE and the initial AMF is Kamf'. After receiving the AMF key (regardless of Kamf or Kamf') sent by the first AMF, the second AMF determines to use Kamf or Kamf' sent by the first AMF. In this case, key information on the UE is inconsistent with that on the second AMF, causing a registration failure.

In the procedure shown in FIG. 3, if in S203, the second AMF performs the operation 3, that is, the second AMF initiates primary authentication, after S203, the second AMF sends an authentication-related NAS message (for example, an authentication request message) to the UE, where the NAS message is not security protected. After receiving the NAS message that is not protected, the UE directly discards the NAS message. Because the UE has set up the security context with the network side and activated the security context, the UE discards the NAS message that is not security protected. As a result, the registration fails.

In the procedure shown in FIG. 3, if in S203, the second AMF performs the operation 1, that is, the second AMF directly uses Kamf sent by the first AMF, the second AMF may send the NAS SMC. For example, when a security algorithm selected by the second AMF is different from a security algorithm selected by the first AMF, the second AMF may send another NAS message in the registration procedure. After the UE receives the NAS SMC or the another NAS message in the registration procedure that is sent by the second AMF, the UE fails to verify integrity of the received message. This is because the key used by the second AMF is Kamf, and the key used by the UE is Kamf'. As a result, the registration fails.

In the procedure shown in FIG. 2, after receiving the first service operation, the initial AMF initiates primary authentication. In the procedure shown in FIG. 3, after receiving the first service operation, the initial AMF uses Kamf' sent by the first AMF. Actually, after receiving the first service operation, if the initial AMF uses Kamf sent by the first AMF, and sends the NAS SMC message to the UE to update the selected security algorithm, a subsequent registration procedure still fails. This is because of the following.

If the second AMF sends the NAS SMC message to the UE, when receiving the NAS SMC message, the UE fails to verify integrity protection because NAS counts used by the second AMF and the UE do not match.

Alternatively, if the second AMF initiates the authentication-related NAS message to the UE, the NAS message is not security protected. When receiving the NAS message, the UE discards the NAS message because the UE has created the NAS security context with the network side.

Alternatively, if the second AMF sends the other registration message in the registration procedure to the UE, when receiving the NAS message, the UE fails to verify integrity protection because NAS counts used by the second AMF and the UE do not match.

In the registration procedures in which the redirection occurs shown in FIG. 2 and FIG. 3, the key information on the UE and key information on the second AMF are inconsistent, resulting in the registration failure. To avoid the registration failure shown in FIG. 2 and FIG. 3, this application provides a method for a mobility registration procedure, to ensure that the key information on the UE is consistent with that on the second AMF, so that the UE can successfully complete registration. The following describes in detail the method for registration procedure provided in the embodiments of this application with reference to FIG. 4A to FIG. 7B.

Figure 4A:
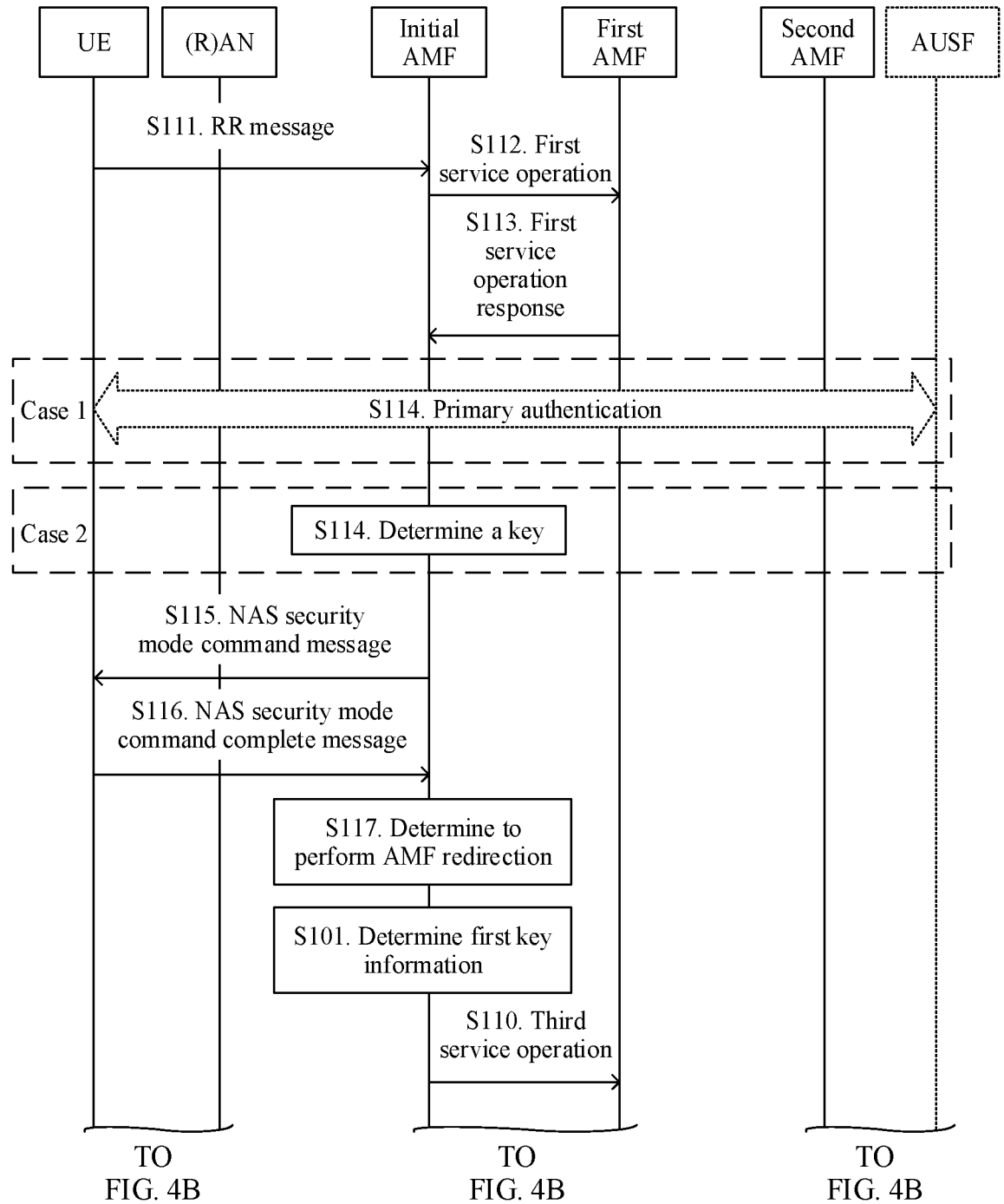
FIG. 4A and FIG. 4B are a schematic flowchart of a method for mobility registration according to an embodiment of this application.
Figure 4B:
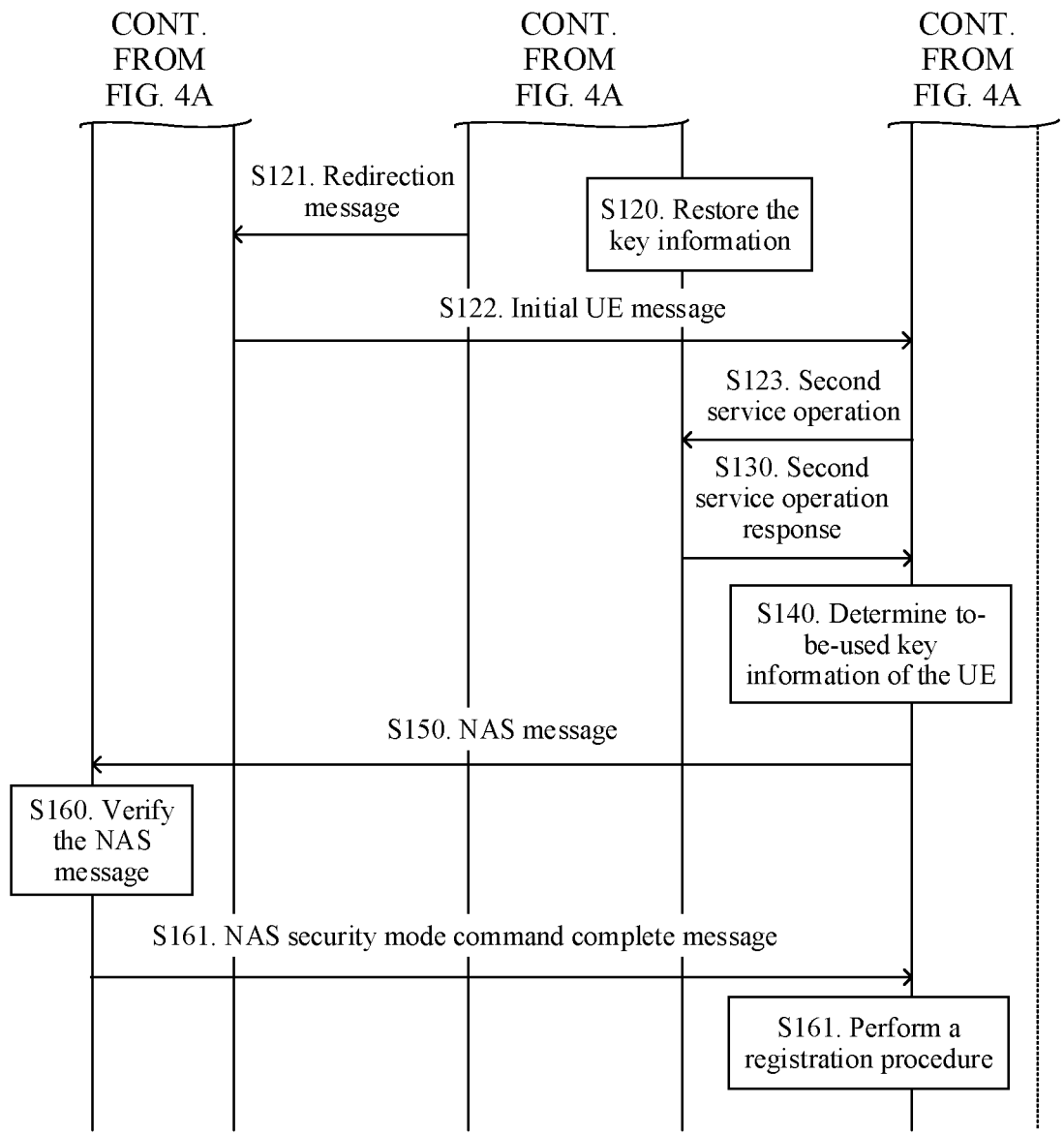

FIG. 4A and FIG. 4B are a schematic flowchart of a method for a registration procedure in which AMF redirection occurs according to an embodiment of this application. In the figure, UE, a (R)AN, an initial AMF, a first AMF, a second AMF, an AUSF, and S110 to S160 are included. A security context is created by the UE and the first AMF that serves the UE last time, and the UE and the first AMF store a same AMF key, which is denoted as Kamf. The following describes S110 to S160 in detail from a perspective of signaling interaction.

S110. The initial AMF invokes a third service operation from the first AMF.

Further, the third service operation is used to indicate that the user equipment fails to be registered with the initial AMF, where the third service operation includes first key information, and the first key information includes a key used by the initial AMF and NAS counts.

The third service operation is used to indicate that the user equipment fails to be register with the initial AMF. Further, the initial AMF notifies the first AMF that registration of the UE with the initial AMF fails, and AMF redirection occurs. The third service operation invoked by the initial AMF may be referred to as Namf_Communication_RegistrationStatusUpdate, and a value of a registration status of the user equipment carried in the third service operation is "NOT_TRANSFERRED". It should be noted that different from the method procedures shown in FIG. 2 and FIG. 3, in the embodiment shown in FIG. 4A and FIG. 4B of this application, the notification message further carries key information currently used by the initial AMF. Therefore, the method procedure shown in FIG. 4A and FIG. 4B further includes S101: The initial AMF determines the first key information, where the first key information includes the key information used by the initial AMF.

It should be understood that, that the initial AMF sends the first key information to the first AMF by invoking the third service operation from the first AMF is merely an example, and does not constitute any limitation on this application. Alternatively, the first key information may be sent to the first AMF in other manners, for example, by using newly added signaling, where the signaling carries the first key information. The other manners are not listed herein one by one.

Further, the initial AMF may determine the key in the first key information in the following two cases:

Case 1:

After successfully obtaining the context of the UE from the first AMF (S3 shown in FIG. 2), the initial AMF initiates primary authentication (S4 shown in FIG. 2). The UE and the initial AMF separately generate a new AMF key, which is denoted as Kamf_new. The initial AMF initiates a NAS security command control procedure, so that the UE and the initial AMF activate and start using the key Kamf_new generated through the primary authentication (S5 and S6 shown in FIG. 2). Then, the initial AMF determines to perform NAS reroute (S7 shown in FIG. 2). In the case 1, a key in the newly added first key information included by the initial AMF in the third service operation may be any one of the following two options:

Option 1: AMF key information that is generated by the initial AMF and the UE through the primary authentication and that is activated and used. That is, the first key information includes Kamf_new and a key identifier ngKSI_new corresponding to Kamf_new.

Option 2: Kamf_new generated by the initial AMF through the primary authentication, a new key Kamf_new' obtained by the initial AMF performing key derivation on Kamf_new, and a key identifier ngKSI_new of the new key Kamf_new', where the initial AMF currently determines to use Kamf_new' and ngKSI_new. That is, the first key information includes Kamf_new', first indication information, and the key identifier ngKSI_new corresponding to Kamf_new'. The first indication information is used to indicate that the key Kamf_new' included in the first key information is obtained by performing key derivation by the initial AMF. The first indication information may be referred to as initAMFHDerivationInd.

It should be understood that, in this application, a derivation mechanism and a parameter used by the initial AMF to perform key derivation on Kamf_new to obtain Kamf_new' are not limited, provided that generated Kamf_new' and Kamf_new are isolated.

In a possible implementation, the initial AMF performs horizontal derivation on Kamf_new to obtain Kamf_new', based on horizontal key derivation defined in an existing protocol.

In another possible implementation, the initial AMF and another network element in the system agree on a key derivation manner. When the first key information carried in the third service operation includes the first indication information, the first AMF can determine, based on the first indication information included in the first key information, that the key Kamf_new' included in the first key information is a key obtained based on the agreed key derivation manner.

Case 2:

The initial AMF successfully obtains the context of the UE from the first AMF, where the context includes the security context of the UE, and the security context of the UE includes AMF key information used by the UE and the first AMF. In addition, the initial AMF receives a key derivation indication sent by the first AMF, where the key derivation indication is used to indicate that a key received by the initial AMF is obtained by the first AMF through key derivation. The key derivation indication may be referred to as keyAMFHDerivationInd (S23 shown in FIG. 3). In this case, the initial AMF determines to use a key Kamf' returned by the first AMF (S24 shown in FIG. 3). The initial AMF initiates a NAS security mode control procedure, and the UE generates Kamf' in the procedure. In addition, the UE and the initial AMF activate and start using Kamf' (S25 and S26 shown in FIG. 3), and the initial AMF determines to perform NAS reroute via the (R)AN (S27 shown in FIG. 3). In the case 2, a key in the newly added first key information included by the initial AMF in the third service operation may be any one of the following three options:

Option 1: The first key information includes second indication information, and the second indication information is used to indicate that the initial AMF activates and uses the key Kamf' sent by the first AMF to the initial AMF. The second indication information may be referred to as OldAMFHDKeyActivatedInd. Optionally, the first key information may further include a key identifier ngKSI corresponding to the key Kamf'.

Option 2: The first key information includes a key Kamf', and may include a key identifier ngKSI corresponding to the key Kamf'.

Option 3: The first key information includes a key Kamf" and first indication information, and may include a key identifier ngKSI corresponding to the key Kamf". The key Kamf" is a new key Kamf" generated by the initial AMF by performing key derivation on the key Kamf' received from the first AMF. The first indication information is used to indicate that Kamf" carried in the third service operation is a key obtained after the initial AMF performs key derivation.

Case 3:

The initial AMF successfully obtains the context of the UE from the first AMF, where the context includes the security context of the UE, and the security context of the UE includes AMF key information used by the UE and the first AMF. In addition, the initial AMF receives the key Kamf sent by the first AMF. The initial AMF determines to use the key Kamf returned by the first AMF. The initial AMF initiates a NAS security mode control procedure to update a security algorithm. In this procedure, the UE and the initial AMF activate and start using Kamf. The initial AMF determines to perform NAS reroute via the (R)AN (S27 shown in FIG. 3). In the case 2, the newly added first key information included by the initial AMF in the third service operation includes current NAS counts, and may further include a key. The key may be any of the following options:

Option 1: Kamf obtained by the initial AMF from the first AMF, and/or a key identifier corresponding to the Kamf.

Option 2: The key Kamf' and first indication information, where a key identifier ngKSI corresponding to the key Kamf' may be included. The key Kamf' is a new key Kamf' generated by the initial AMF by performing key derivation on the key Kamf received from the first AMF. The first indication information is used to indicate that Kamf' carried in the third service operation is a key obtained after the initial AMF performs key derivation.

Option 3: The initial AMF does not send any key.

In the option 3 in the foregoing case 3, the first key information sent by the initial AMF includes only NAS counts.

It should be understood that, similar to the case 1, in this application, a derivation mechanism and a parameter used by the initial AMF to perform key derivation on Kamf' to obtain Kamf" are not limited, provided that generated Kamf" and Kamf' are isolated.

In a possible implementation, the initial AMF performs horizontal key derivation on Kamf' to obtain Kamf", based on horizontal key derivation defined in an existing protocol.

In another possible implementation, the initial AMF and another network element in the system agree on a key derivation manner. When the first key information carried in the notification message includes the first indication information, the first AMF can determine, based on the first indication information included in the first key information, that the key Kamf" included in the first key information is a key obtained based on the agreed key derivation manner.

In a possible implementation, in the embodiment shown in FIG. 4A and FIG. 4B, the third service operation may further carry a cause value, and the cause value is used to indicate that the UE fails to be registered with the initial AMF because the AMF redirection occurs. That is, in the embodiment shown in FIG. 4A and FIG. 4B, the first AMF can learn, based on the third service operation, that the UE fails to be registered with the initial AMF and that the UE fails to be registered with the initial AMF because the AMF redirection occurs.

It should be further understood that, in the case 2, the key identifier corresponding to the key Kamf' or Kamf" is consistent with the key identifier ngKSI corresponding to the key Kamf. Therefore, in the case 2, the first key information may not include the key identifier corresponding to Kamf' or Kamf", or may include the key identifier ngKSI corresponding to Kamf' or Kamf". This is not limited in this application.

It should be further understood that the embodiment shown in FIG. 4A and FIG. 4B mainly relates to improvements in some procedures after the initial AMF determines to perform redirection shown in FIG. 2 and FIG. 3. A procedure before the initial AMF determines to perform redirection is similar to that shown in FIG. 2 and FIG. 3. For example, before S110 is performed, the method procedure shown in FIG. 4A and FIG. 4B needs to further include the following steps.

S111. The UE sends an RR message to the initial AMF, where the RR message carries a 5G-GUTI of the UE.

S112. The initial AMF invokes a first service operation from the first AMF. Further, after receiving the RR message sent by the UE, the initial AMF determines, based on the 5G-GUTI in the RR message, the first AMF that serves the UE last time, and sends an invocation for the first service operation to the first AMF. The invocation for the first service operation may be referred to as Namf_Communication_UEContextTransfer, and is used to request the context of the UE.

S113. The first AMF sends a first service operation response to the initial AMF. Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransfer Response.

Corresponding to the foregoing case 1, the first service operation response includes Kamf or Kamf'.

Corresponding to the foregoing case 2, the first service operation response includes Kamf'.

Corresponding to the foregoing case 3, the first service operation response includes Kamf' or Kamf.

S114. Corresponding to the foregoing case 1, the initial AMF initiates a primary authentication procedure, and the initial AMF and the UE separately generate Kamf_new and ngKSI_new corresponding to Kamf_new, corresponding to the foregoing case 2, the initial AMF determines to use Kamf', or corresponding to the foregoing case 3, the initial AMF determines to use Kamf.

S115. The initial AMF initiates a NAS SMC message to the user equipment.

Corresponding to the foregoing case 1, the initial AMF activates and starts using Kamf_new generated through the primary authentication.

Corresponding to the foregoing case 2, the initial AMF activates and starts using Kamf'.

Further, the NAS SMC message carries an indication for requesting a complete initial NAS message.

Corresponding to the foregoing case 3, the initial AMF activates and starts using Kamf.

Corresponding to the foregoing cases 1 and 2, the initial AMF includes the indication for requesting the complete initial NAS message in the NAS SMC message. Corresponding to the foregoing case 3, the initial AMF may decrypt a NAS container in a registration message to obtain a complete initial registration message.

S116. The UE sends a NAS security mode command complete (NAS security mode complete) message to the initial AMF.

Corresponding to the foregoing case 1, the UE activates and starts using Kamf_new.

Corresponding to the foregoing case 2, the UE activates and starts using Kamf'.

Corresponding to the foregoing case 3, the UE activates and starts using Kamf.

Further, based on the indication for requesting the complete initial NAS message in the NAS SMC, the NAS security mode command complete message carries a complete registration request message. Further, a difference between the complete registration request message in this application and the registration request message in S111 lies in that information carried in the complete registration request message is cleartext and is not encrypted, while some information is cleartext and some information is encrypted in the registration request message in S111.

S117. The initial AMF determines, based on requested NSSAIs carried in the complete registration request message in the security mode command complete message sent by the UE or requested NSSAIs obtained based on decryption registration message, to perform AMF redirection. In other words, the initial AMF determines to perform NAS reroute.

Further, in this embodiment of this application, a reason why the initial AMF determines to perform AMF redirection is not limited, and may be any reason for triggering AMF redirection specified in an existing protocol. For example, when the initial AMF cannot server a network slice of the UE, the initial AMF determines to perform AMF redirection, to select the second AMF that can serve the UE. An existing protocol defines the following two manners for implementation of redirection, and the initial AMF may select either of the following manners:

Manner 1: If a connection can be established between the initial AMF and the second AMF, the initial AMF invokes an Namf_Communication_N1MessageNotify service operation from the second AMF.

Manner 2: If there is no connection between the initial AMF and the second AMF (where a possible cause is that the initial AMF and the second AMF belong to different network slices, and interworking between the initial AMF and the second AMF is not allowed), the initial AMF sends the received registration request of the UE to the second AMF by using the (R)AN.

The foregoing manner 2 is considered in the registration procedure shown in FIG. 4A and FIG. 4B.

Further, after S110 is performed, after receiving the invocation for the third service operation sent by the initial AMF, the first AMF needs to store the first key information carried in the third service operation. That is, S120 of storing the first key information by the first AMF is performed.

Further, for the several different options separately listed in the foregoing case 1, case 2, and case 3, the first key information stored by the first AMF includes the following three cases:

Case 1:

Option 1: Kamf_new, the key identifier ngKSI_new corresponding to Kamf_new, and NAS counts.

Option 2: Kamf_new', the first indication information, the key identifier ngKSI_new corresponding to Kamf_new', and NAS counts, where the first indication information is used to indicate that the key in the first key information is obtained by the initial AMF by performing key derivation.

Case 2:

Option 1: the second indication information and NAS counts, where the second indication information is used to indicate that the initial AMF activates and uses the key Kamf' sent by the first AMF to the initial AMF. Optionally, the first key information may further include the key identifier ngKSI corresponding to the key Kamf'.

Option 2: Kamf' and NAS counts, where the key identifier ngKSI corresponding to Kamf' may be included.

Option 3: Kamf'', the first indication information, and the NAS counts, where the key identifier ngKSI corresponding to the key Kamf'' may be included. The first indication information is used to indicate that Kamf'' carried in the notification message is a key obtained after the initial AMF performs key derivation.

Case 3:

Option 1: NAS counts, and Kamf and/or the key identifier ngKSI corresponding to Kamf.

Option 2: Kamf', the first indication information, and NAS counts, where the key identifier ngKSI corresponding to Kamf' may be included. The first indication information is used to indicate that Kamf' carried in the notification message is a key obtained after the initial AMF performs key derivation.

Option 3: NAS counts.

It should be understood that the embodiment shown in FIG. 4A and FIG. 4B mainly relates to signaling exchange among the initial AMF, the first AMF, the second AMF, and the UE in the redirection processes that the initial AMF determines to perform and that are shown in FIG. 2 and FIG. 3.

In a possible implementation, signaling exchange with the (R)AN does not change. For example, before S120 is performed, the method shown in FIG. 4A and FIG. 4B needs to further include the following steps.

S121. The initial AMF sends a redirection message to the (R)AN. The message may be referred to as a NAS reroute message. The RR message received from the UE is carried in the NAS reroute message and sent to the (R)AN.

S122. The (R)AN sends an initial UE message to the second AMF, where the initial UE message carries the RR message.

In another possible implementation, signaling exchange with the (R)AN changes. For example, before S120 is performed, the method shown in FIG. 4A and FIG. 4B needs to further include the following steps.

S121. The initial AMF sends a redirection message to the (R)AN. The message may be referred to as a NAS reroute message.

Different from the NAS reroute message shown in FIG. 2 and FIG. 3, the NAS reroute message does not carry the RR message received from the UE, but carries the complete registration request message shown in S116.

S122. The (R)AN sends an initial UE message to the second AMF, where the initial UE message carries the complete registration request message. The complete registration request message is used to indicate that the AMF redirection occurs on a network side, and the second AMF is selected to serve the UE.

Further, if in S122, the initial UE message sent by the (R)AN to the second AMF carries the complete registration request message, the second AMF does not need to request the complete registration request message from the UE, and the second AMF can determine, based on the complete registration request message, that the AMF redirection occurs on the network side, and that the second AMF can serve the UE. In addition, the second AMF does not need to perform the step of whether to perform AMF redirection again.

S123. The second AMF invokes a second service operation from the first AMF. The second service operation is Namf_Communication_UEContextTransfer.

Further, after receiving the invocation for the second service operation sent by the second AMF, the first AMF verifies the RR message by using the NAS security context created by the first AMF and the UE, and after the verification succeeds, the first AMF sends a second service operation response to the second AMF. That is, S130 of sending the second service operation response by the first AMF to the second AMF is performed. In the embodiment shown in FIG. 4A and FIG. 4B, information carried in the second service operation response sent by the first AMF to the second AMF is different from the second service operation responses shown in FIG. 2 and FIG. 3. The following describes in detail the second service operation response sent by the first AMF to the second AMF.

It should be noted that the second service operation response includes second key information, where the second key information includes some information in the first key information, or the second key information includes a key generated after key derivation is performed on the key in the first key information, third indication information, and the NAS counts in the first key information.

It should be understood that, that the first AMF sends the second key information to the second AMF by using the second service operation response sent by the first AMF to the second AMF is merely an example, and does not constitute any limitation on this application. Alternatively, the second key information may be sent to the second AMF in other manners, for example, by using newly added signaling, where the signaling carries the second key information. The other manners are not listed herein one by one.

Further, for the case 1, the case 2, and the case 3 in S110, a key in the second key information included in the second service operation response sent by the first AMF to the second AMF includes the following plurality of possible options, where An option 1 and an option 2 correspond to the option 1 and the option 2 of the first key information included in the invocation for the third service operation received by the first AMF from the initial AMF described in the case 1 in S110, an option 3 corresponds to the option 2 of the first key information included in the invocation for the third service operation received by the first AMF from the initial AMF described in the case 2 in S110, an option 4 corresponds to the option 3 of the first key information included in the notification message received by the first AMF from the initial AMF described in the case 2 in S110, an option 5 corresponds to the option 1 of the first key information included in the invocation for the third service operation received by the first AMF from the initial AMF described in the case 2 in S110, an option 6 corresponds to the option 1 and the option 3 of the key in the first key information included in the invocation for the third service operation received by the first AMF from the initial AMF described in the case 3 in S110, and an option 7 corresponds to the option 2 of the key in the first key information included in the invocation for the third service operation received by the first AMF from the initial AMF described in the case 3 in S110.

Option 1: The first AMF does not receive the first indication information from the initial AMF. To be specific, a key in first key information carried in a third service operation response is a key on which the initial AMF does not perform key derivation, and the first key information carried in the third service operation response sent by the initial AMF to the first AMF includes the key Kamf_new and the key identifier ngKSI_new corresponding to Kamf_new.

In a possible implementation, the first AMF does not perform key derivation on the received key Kamf_new. In this case, the second key information sent by the first AMF to the second AMF in the second service operation response includes Kamf_new and the key identifier ngKSI_new corresponding to Kamf_new.

In another possible implementation, the first AMF determines to perform key derivation on the received key Kamf_new, to obtain Kamf_new'. In this case, the second key information sent by the first AMF to the second AMF in the second service operation response includes Kamf_new' obtained after key derivation is performed on Kamf_new, and the key identifier ngKSI_new corresponding to Kamf_new'. According to an existing standard definition, after performing key derivation, the first AMF includes the third indication information in the second service operation response, to indicate that the key Kamf_new' in the second key information is obtained by the first AMF by performing key derivation. The third indication information may be referred to as keyAMFHDerivationInd.

Option 2: The first AMF receives the first indication information from the initial AMF. To be specific, a key in first key information carried in a third service operation response is a key obtained after the initial AMF performs key derivation, and the first key information carried in the third service operation response sent by the initial AMF to the first AMF includes Kamf_new' and the key identifier ngKSI_new corresponding to Kamf_new'.

In a possible implementation, the first AMF does not perform key derivation on the received key Kamf_new'. In this case, the second key information sent by the first AMF to the second AMF in the second service operation response includes Kamf_new' and the key identifier ngKSI_new corresponding to Kamf_new'. The first second AMF further includes, based on the received first indication information, fourth indication information in the second key information sent to the second AMF, where the fourth indication information is denoted as initAMFHDerivationInd2. The fourth indication information is used to indicate the first AMF to perform key derivation. The fourth indication information and the first indication information may be the same or different.

In another possible implementation, the first AMF determines to perform key derivation on the received key Kamf_new', to obtain Kamf_new". In this case, the second key information sent by the first AMF to the second AMF in the second operation service response includes Kamf_new" obtained after key derivation is performed on Kamf_new', and the key identifier ngKSI_new corresponding to Kamf_new". The first AMF further includes, based on the received first indication information, fourth indication information in the second key information sent to the second AMF, where the fourth indication information is denoted as initAMFHDerivationInd2. The fourth indication information is used to indicate the first AMF to perform horizontal key derivation. The fourth indication information and the first indication information may be the same or different. According to an existing standard definition, after performing horizontal key derivation, the first AMF includes the third indication information in the second service operation response, to indicate that the key Kamf_new' in the second key information is obtained by the first AMF by performing key derivation. The third indication information may be referred to as keyAMFHDerivationInd.

Option 3: The first AMF does not receive the first indication information from the initial AMF. To be specific, a key in first key information carried in a third service operation response is a key on which the initial AMF does not perform key derivation, and the first key information carried in the third service operation response sent by the initial AMF to the first AMF includes Kamf', and the first key information may further include the key identifier ngKSI corresponding to Kamf'.

In a possible implementation, the first AMF does not perform key derivation on the received key Kamf'. In this case, the second key information sent by the first AMF to the second AMF in the second service operation response includes Kamf' and the key identifier ngKSI corresponding to Kamf'.

In another possible implementation, the first AMF determines to perform key derivation on the received key Kamf', to obtain Kamf". In this case, the second key information sent by the first AMF to the second AMF in the second service operation response includes Kamf" obtained after key derivation is performed on Kamf' and the key identifier ngKSI corresponding to Kamf". According to an existing standard definition, after performing key derivation, the first AMF includes the third indication information in the second service operation response, to indicate that the key Kamf_new' in the second key information is obtained by the first AMF by performing key derivation. The third indication information may be referred to as keyAMFHDerivationInd.

For the foregoing two possible implementations, if the first AMF receives the key identifier ngKSI, the second key information sent by the first AMF to the second AMF in the second service operation response includes the received key identifier ngKSI. Otherwise, the first AMF finds the key identifier ngKSI from the locally stored NAS security context created with the UE, and then includes the key identifier ngKSI in the second key information. That is, the second key information sent by the first AMF to the second AMF in the second service operation response includes the key identifier ngKSI. However, this application imposes no limitation on whether the key identifier ngKSI is received from the first AMF or is found by the first AMF from the locally stored NAS security context created with the UE.

Option 4: The first AMF receives the first indication information from the initial AMF. To be specific, a key in first key information carried in a third service operation response is a key obtained after the initial AMF performs key derivation, and the first key information carried in the third service operation response sent by the initial AMF to the first AMF includes Kamf", and the first key information may further include the key identifier ngKSI corresponding to Kamf".

In a possible implementation, the first AMF does not perform key derivation on the received key Kamf". In this case, the second key information sent by the first AMF to the second AMF in the second service operation response includes Kamf", the key identifier ngKSI corresponding to Kamf", and fourth indication information. The first AMF further includes, based on the received first indication information, fourth indication information in the second key information sent to the second AMF, where the fourth indication information is denoted as initAMFHDerivationInd2. The fourth indication information is used to indicate the first AMF to perform horizontal key derivation.

In another possible implementation, the first AMF determines to perform key derivation on the received key Kamf", to obtain Kamf'''. In this case, the second key information sent by the first AMF to the second AMF in the second service operation response includes Kamf''' obtained after key derivation is performed on Kamf", a key identifier ngKSI corresponding to Kamf''', and the fourth indication information. According to an existing standard, the second service invoking response sent by the first AMF to the second AMF further includes a third key derivation indication information indication, to indicate that kamf''' in the second key information is obtained by the first AMF by performing horizontal key derivation.

For the foregoing two possible implementations, if the first AMF receives the key identifier ngKSI, the second key information sent by the first AMF to the second AMF in the second service operation response includes the received key identifier ngKSI. Otherwise, the first AMF finds the key identifier ngKSI from the locally stored NAS security context created with the UE, and then includes the key identifier ngKSI in the second key information.

Option 5: The first AMF receives the second indication information from the initial AMF. Optionally, the first AMF may further receive the key identifier ngKSI and/or Kamf' from the initial AMF.

In a possible implementation, the first AMF performs, based on the second indication information, key derivation on Kamf used by the first AMF and the UE, to obtain Kamf'. In this case, the second key information sent by the first AMF to the second AMF in the second service operation response includes Kamf' and the key identifier ngKSI corresponding to Kamf'.

In another possible implementation, the first AMF performs, based on the second indication information, key derivation on Kamf used by the first AMF and the UE, to obtain Kamf', and then the first AMF determines, according to a local policy, to perform key derivation on Kamf' to obtain Kamf". In this case, the second key information sent by the first AMF to the second AMF in the second service operation response includes Kamf" and the key identifier ngKSI corresponding to Kamf". According to an existing standard definition, in this possible implementation, the first AMF includes the third indication information in the second service operation response, to indicate that Kamf" in the second key information is obtained by the first AMF by performing key derivation.

For the foregoing two possible implementations, if the first AMF receives the key identifier ngKSI, the second key information sent by the first AMF to the second AMF in the second service operation response includes the received key identifier ngKSI. Otherwise, the first AMF finds the key identifier ngKSI from the locally stored NAS security context created with the UE, and then includes the key identifier ngKSI in the second key information.

Option 6: The first AMF receives Kamf and/or the key identifier ngKSI corresponding to Kamf from the initial AMF. Alternatively, the first key information received by the first AMF from the initial AMF does not include the key and the identifier, but only includes NAS counts.

In a possible implementation, the first AMF obtains Kamf and/or ngKSI from the locally stored NAS security context created by the first AMF and the UE. Alternatively, the first AMF obtains Kamf and/or ngKSI from the first key information received by the initial AMF. In this case, the second key information sent by the first AMF to the second AMF in the second service operation response includes Kamf and the key identifier ngKSI corresponding to Kamf.

In another possible implementation, the first AMF obtains Kamf and/or ngKSI from the locally stored NAS security context created by the first AMF and the UE. Alternatively, the first AMF obtains Kamf and/or ngKSI from the first key information received by the initial AMF. Then, the first AMF determines to perform key derivation on the received key Kamf, to obtain Kamf'. In this case, the second key information sent by the first AMF to the second AMF in the second service operation response includes Kamf' obtained after key derivation is performed on Kamf and the key identifier ngKSI corresponding to Kamf'. According to an existing standard definition, after performing key derivation, the first AMF includes the third indication information in the second service operation response, to indicate that the key Kamf_new' in the second key information is obtained by the first AMF by performing key derivation. The third indication information may be referred to as keyAMFHDerivationInd.

Option 7: The first AMF receives Kamf' and the first indication information from the initial AMF, and the first AMF may further obtain, from the initial AMF, the key identifier ngKSI corresponding to Kamf'.

In a possible implementation, the first AMF does not perform key derivation on the received key Kamf'. In this case, the second key information sent by the first AMF to the second AMF in the second service operation response includes Kamf', the key identifier ngKSI corresponding to Kamf', and fourth indication information. The first AMF further includes, based on the received first indication information, fourth indication information in the second key information sent to the second AMF, where the fourth indication information is denoted as initAMFHDerivationInd2. The fourth indication information is used to indicate the first AMF to perform horizontal key derivation.

In another possible implementation, the first AMF determines to perform key derivation on the received key Kamf', to obtain Kamf". In this case, the second key information sent by the first AMF to the second AMF in the second service operation response includes Kamf" obtained after key derivation is performed on Kamf', the key identifier ngKSI corresponding to Kamf", and the fourth indication information. According to an existing standard, the second service invoking response sent by the first AMF to the second AMF further includes a third key derivation indication information indication, to indicate that kamf" in the second key information is obtained by the first AMF by performing horizontal key derivation. It should be understood that the first indication information, the third indication information, and the fourth indication information may be collectively referred to as derivation indication information, and indicate that the received key is a key obtained by performing key derivation. That is, after receiving N pieces of derivation indication information, the UE needs to perform N times of derivation on a currently used AMF key, to ensure that an obtained key is consistent with the AMF key used by the second AMF, where N is an integer.

S140. The second AMF determines to-be-used key information of the UE. The second AMF determines, based on the second key information received by the second AMF in S130, to use the key, the corresponding key identifier, and the NAS counts in the second key information.

S150. The second AMF sends a NAS message to the UE. The NAS message is protected based on the second key information.

Further, if the second key information received by the second AMF includes the fourth indication information, the second AMF sends a NAS SMC message, and includes fifth indication information in the NAS SMC message, to indicate the UE to perform key derivation. The fifth indication information may be denoted as init_AMF_CHANGE_FLAG.

According to an existing standard definition, a case in which the second AMF sends the NAS SMC message further includes that the second service operation response received by the second AMF includes the third indication information, and in this case, the second AMF further includes a K_AMF_change_flag indication whose value is 1 in the NAS SMC message, or a security algorithm selected by the second AMF is different from a security algorithm that is selected by the first AMF and that is carried in the second service operation response.

In a possible implementation, the NAS SMC message sent by the second AMF to the UE carries the indication for requesting the complete initial NAS message.

In another possible implementation, in S122, when the initial UE message sent by the (R)AN to the second AMF carries the complete registration request message, the NAS SMC message sent by the second AMF to the UE does not need to carry the indication for requesting the complete initial NAS message.

If the initial AMF does not perform key derivation, the first AMF does not perform key derivation, and the second AMF determines to use the AMF key sent by the first AMF and the security algorithm selected by the first AMF, the NAS message is a NAS message that is not a NAS SMC message sent to the UE based on the registration procedure.

S160. The UE verifies the received NAS message.

If the NAS message is a NAS message that is not a NAS SMC message, the UE can successfully verify the NAS message because the NAS message is encrypted and integrity protected.

If the NAS message is a NAS SMC message, in a possible implementation, the NAS SMC message carries the fifth indication information, and the UE first performs key derivation based on the located activated and used AMF key. If the AMF key used by the UE is Kamf, the UE performs key derivation to generate Kamf". If the AMF key used by the UE is Kamf_new, the UE performs key derivation to generate Kamf_new'. The key derivation uses a same mechanism and parameter as derivation performed by the initial AMF. Then, the UE processes the NAS SMC message according to an existing standard definition. For example, if the NAS SMC message further carries K_AMF_change_flag whose value is 1, the UE then performs key derivation. If the UE generates Kamf" based on the fifth indication information, the UE performs key derivation to generate Kamf". If the UE generates Kamf_new' based on the fifth indication information, the UE performs key derivation to generate Kamf_new". The key derivation uses a same mechanism and parameter as derivation performed by the first AMF. After the processing succeeds, the UE sends a NAS security mode command complete message to a target AMF. After the second AMF receives the NAS security mode command complete message, the second AMF continues to perform a registration procedure. That is, the method procedure shown in FIG. 4A and FIG. 4B further includes S161 and S162.

The method procedure shown in FIG. 4A and FIG. 4B describes in detail the method procedure for registration in which the AMF redirection occurs according to an embodiment of this application. With respect to FIG. 2 and FIG. 3, the following describes in detail with reference to FIG. 5A to FIG. 5J, how the problem of inconsistent AMF keys on the UE and the second AMF shown in FIG. 2 and FIG. 3 is resolved in the method for registration procedure shown in FIG. 4A and FIG. 4B. FIG. 5A to FIG. 5J are flowcharts of key information transfer according to an embodiment of this application.

It should be understood that FIG. 5A to FIG. 5J are mainly used to describe how AMF keys on UE and a second AMF remain consistent. Therefore, FIG. 5A to FIG. 5J show only a key information transfer procedure, and do not show other procedures. Further, in the procedure shown in FIG. 5A to FIG. 5J, an AMF key previously created by the UE and a first AMF is denoted as Kamf.

Corresponding to the case 1 in S110 in the method procedure shown in FIG. 4A and FIG. 4B, after the initial AMF performs primary authentication, the NAS SMC message is used to enable the initial AMF and the UE to activate and use Kamf_new generated through the primary authentication, and the corresponding identifier ngKSI_new. The initial AMF determines to perform AMF redirection. With reference to FIG. 5A to FIG. 5D, how the problem of inconsistent AMF keys on the UE and the second AMF is resolved in the embodiment shown in FIG. 4A and FIG. 4B is described below separately based on different cases of whether the initial AMF and the first AMF perform key derivation on the key after the initial AMF determines to perform AMF redirection.

Figure 5A:
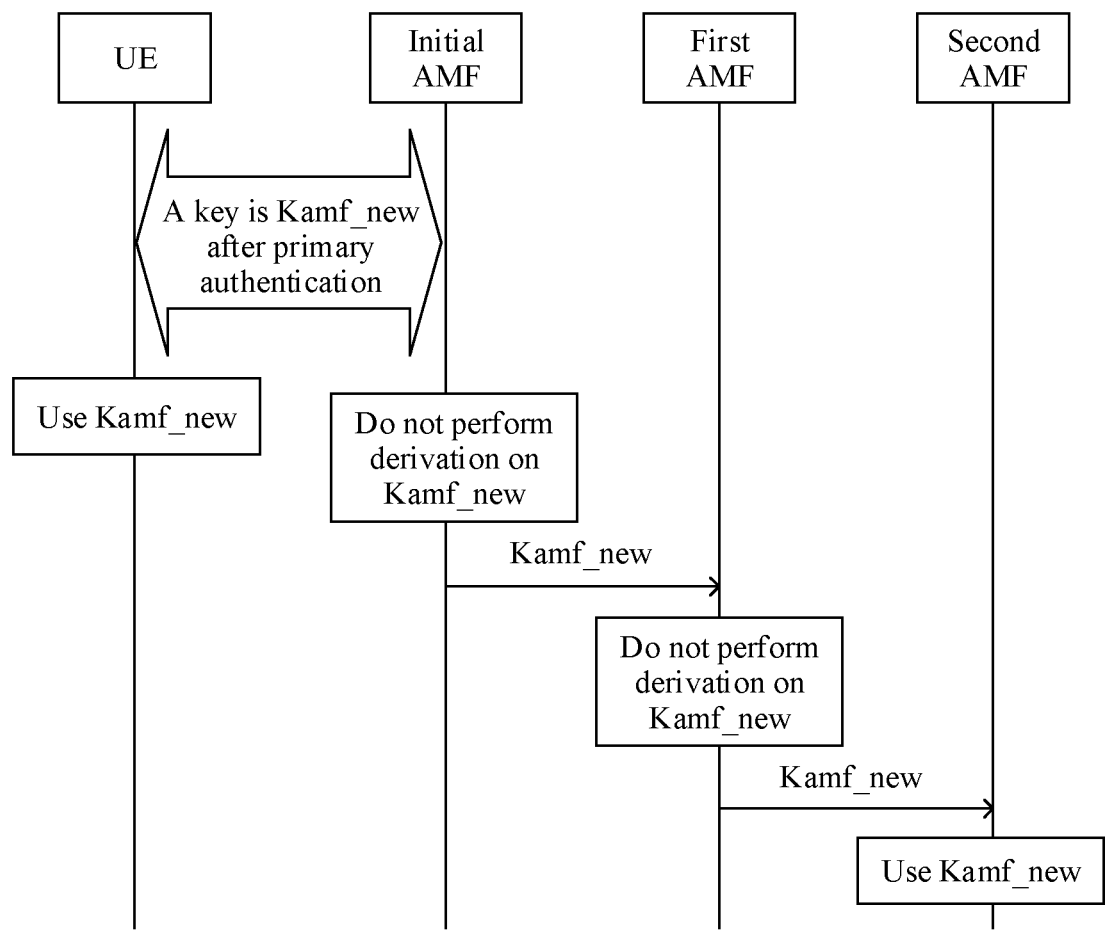
FIG. 5A, FIG. 5B, FIG. 5C, FIG. 5D, FIG. 5E, FIG. 5F, FIG. 5G, FIG. 5H, FIG. 5I, and FIG. 5J are flowcharts of key information transfer according to an embodiment of this application.

Case 1: As shown in FIG. 5A, the initial AMF does not perform key derivation on Kamf_new, and sends the AMF key Kamf_new and the key identifier ngKSI_new to the first AMF, and the first AMF does not perform key derivation on Kamf_new, and sends the key Kamf_new and the key identifier ngKSI_new to the second AMF. In this case, the keys on the UE and the second AMF are both Kamf_new, and the keys are consistent.

Figure 5B:
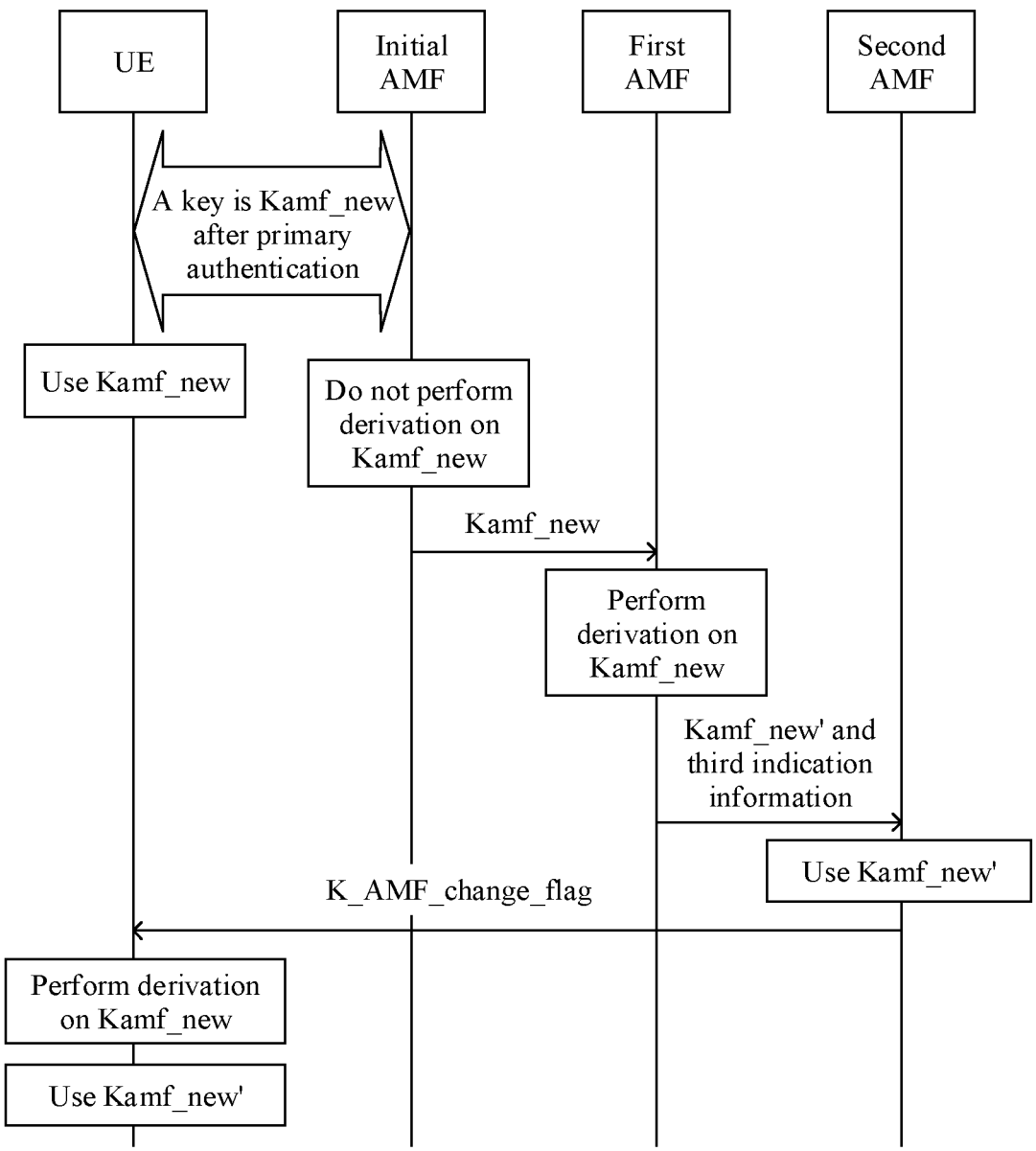

Case 2: As shown in FIG. 5B, the initial AMF does not perform key derivation on Kamf_new, and sends the AMF key Kamf_new and the key identifier ngKSI_new to the first AMF, and the first AMF performs key derivation on Kamf_new, and sends the key Kamf_new' obtained through the derivation and the identifier ngKSI_new to the second AMF. According to the existing standard definition, the first AMF further sends the third indication information to the second AMF, where the third indication information is used to indicate that the key Kamf_new' in the second key information is obtained by the first AMF by performing key derivation. The NAS SMC message sent by the second AMF to the UE carries K_AMF_change_flag whose value is 1. After receiving K_AMF_change_flag whose value is 1, the UE performs key derivation on Kamf_new, and generates Kamf_new' based on the current Kamf_new. In this way, the keys on the UE and the second AMF are both Kamf_new', and the keys are consistent.

Figure 5C:
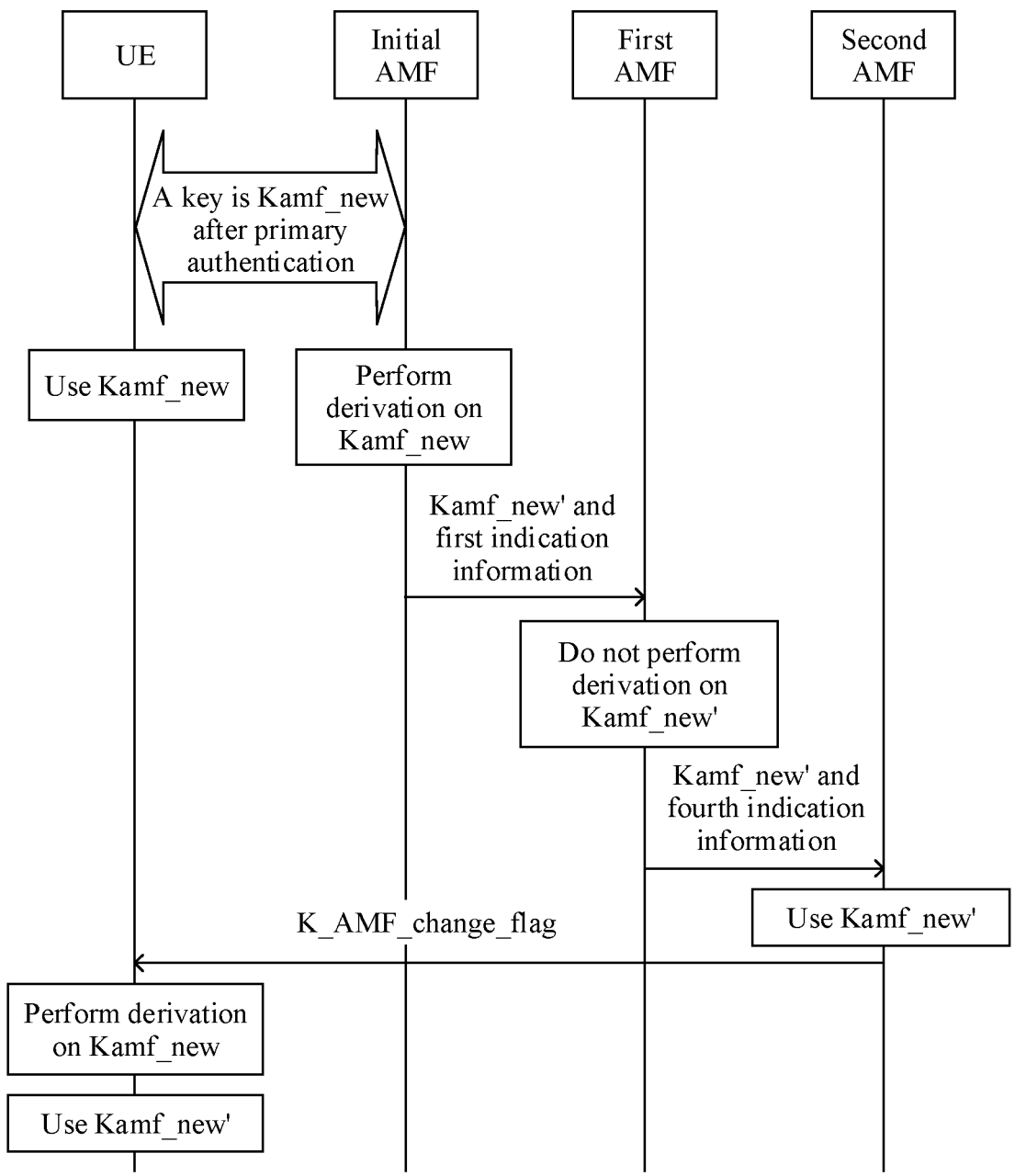

Case 3: As shown in FIG. 5C, the initial AMF performs key derivation on Kamf_new, and sends the AMF key Kamf_new', the key identifier ngKSI_new, and the first indication information to the first AMF, where the first indication information is used to indicate that the key Kamf_new' in the first key information is obtained by the initial AMF by performing key derivation, and the first AMF does not perform key derivation on Kamf_new', and sends the key Kamf_new', the key identifier ngKSI_new, and the fourth indication information to the second AMF, where the fourth indication information is used to indicate that the key Kamf_new' in the second key information is obtained by the initial AMF by performing key derivation. The NAS SMC message sent by the second AMF to the UE carries K_AMF_change_flag whose value is 1. After receiving K_AMF_change_flag whose value is 1, the UE performs key derivation on Kamf_new, and generates Kamf_new' based on the current Kamf_new. In this way, the keys on the UE and the second AMF are both Kamf_new', and the keys are consistent.

Figure 5D:
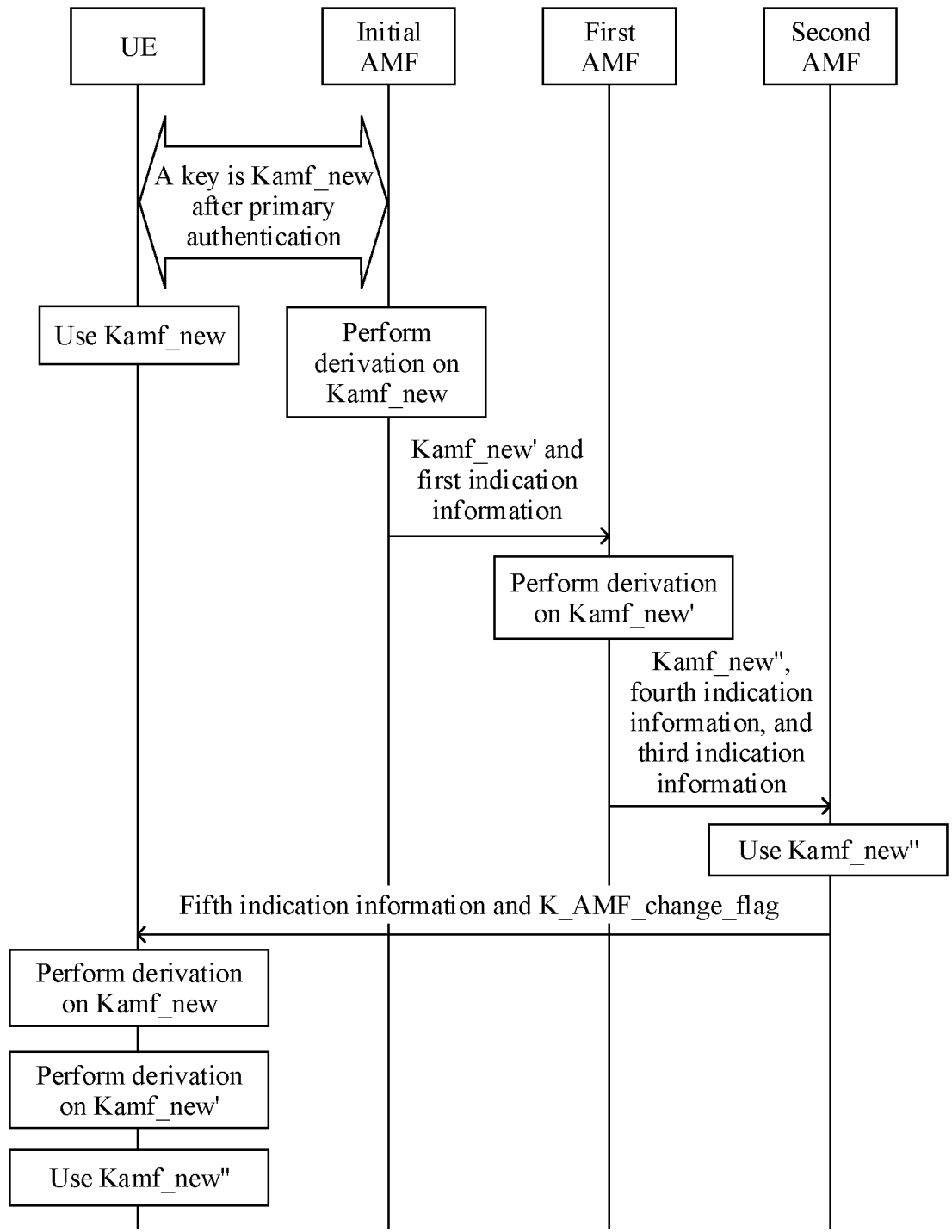

Case 4: As shown in FIG. 5D, the initial AMF performs key derivation on Kamf_new, and sends the AMF key Kamf_new', the key identifier ngKSI_new, and the first indication information to the first AMF, where the first indication information is used to indicate that the key Kamf_new' in the first key information is obtained by the initial AMF by performing key derivation, and the first AMF performs key derivation on Kamf_new', and sends the key Kamf_new'' obtained through the key derivation, the identifier ngKSI_new, and the fourth indication information to the second AMF. According to the existing standard definition, because the first AMF performs horizontal key derivation, the first AMF further sends the third indication information to the second AMF, where the third indication information is used to indicate that the first AMF performs horizontal key derivation. The NAS SMC message sent by the second AMF to the UE carries the fifth indication information and K_AMF_change_flag whose value is 1. The UE performs horizontal derivation on Kamf_new based on the fifth indication information, and generates Kamf_new' based on the current Kamf_new. The UE performs horizontal derivation on Kamf_new' based on K_AMF_change_flag whose value is 1, to obtain Kamf_new''. In this way, the keys on the UE and the second AMF are both Kamf_new'', and the keys are consistent.

Corresponding to the case 2 in S110 in the method procedure shown in FIG. 4A and FIG. 4B, after the initial AMF determines to use the AMF key, that is, Kamf', generated through the key derivation and the key identifier ngKSI of Kamf' that are sent by the first AMF, the NAS SMC message is used to enable the UE and the initial AMF to activate and use Kamf' and the identifier ngKSI corresponding to Kamf'. The initial AMF determines to perform AMF redirection. With reference to FIG. 5E to FIG. 5H, how the problem of inconsistent AMF keys on the UE and the second AMF is resolved in the embodiment shown in FIG. 4A and FIG. 4B is described below separately based on different cases of whether the initial AMF and the first AMF perform key derivation on the key after the initial AMF determines to perform AMF redirection.

Figure 5E:
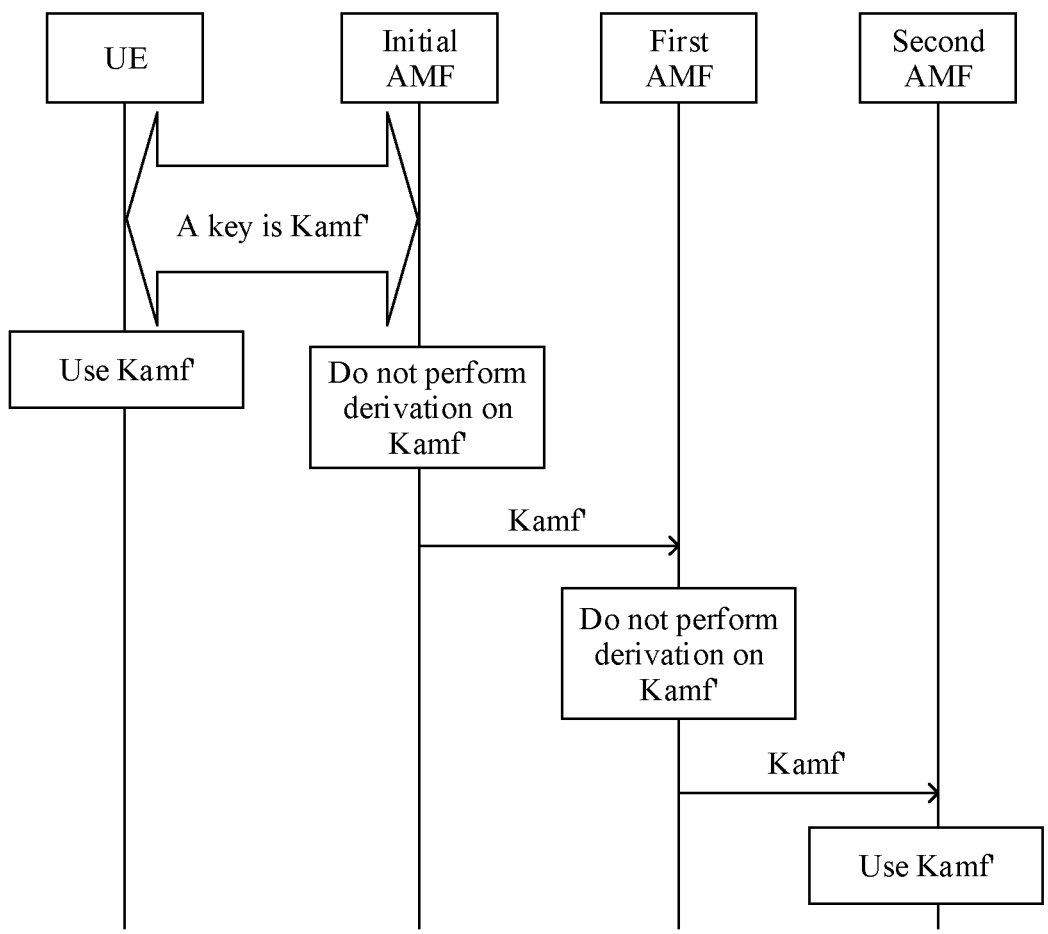

Case 1: As shown in FIG. 5E, the initial AMF does not perform key derivation on Kamf', sends the AMF key Kamf' to the first AMF, and may further send the key identifier ngKSI to the first AMF, and the first AMF does not perform key derivation on Kamf', and sends the key Kamf' and the key identifier ngKSI to the second AMF. In this case, the keys on the UE and the second AMF are both Kamf', and the keys are consistent.

Figure 5F:
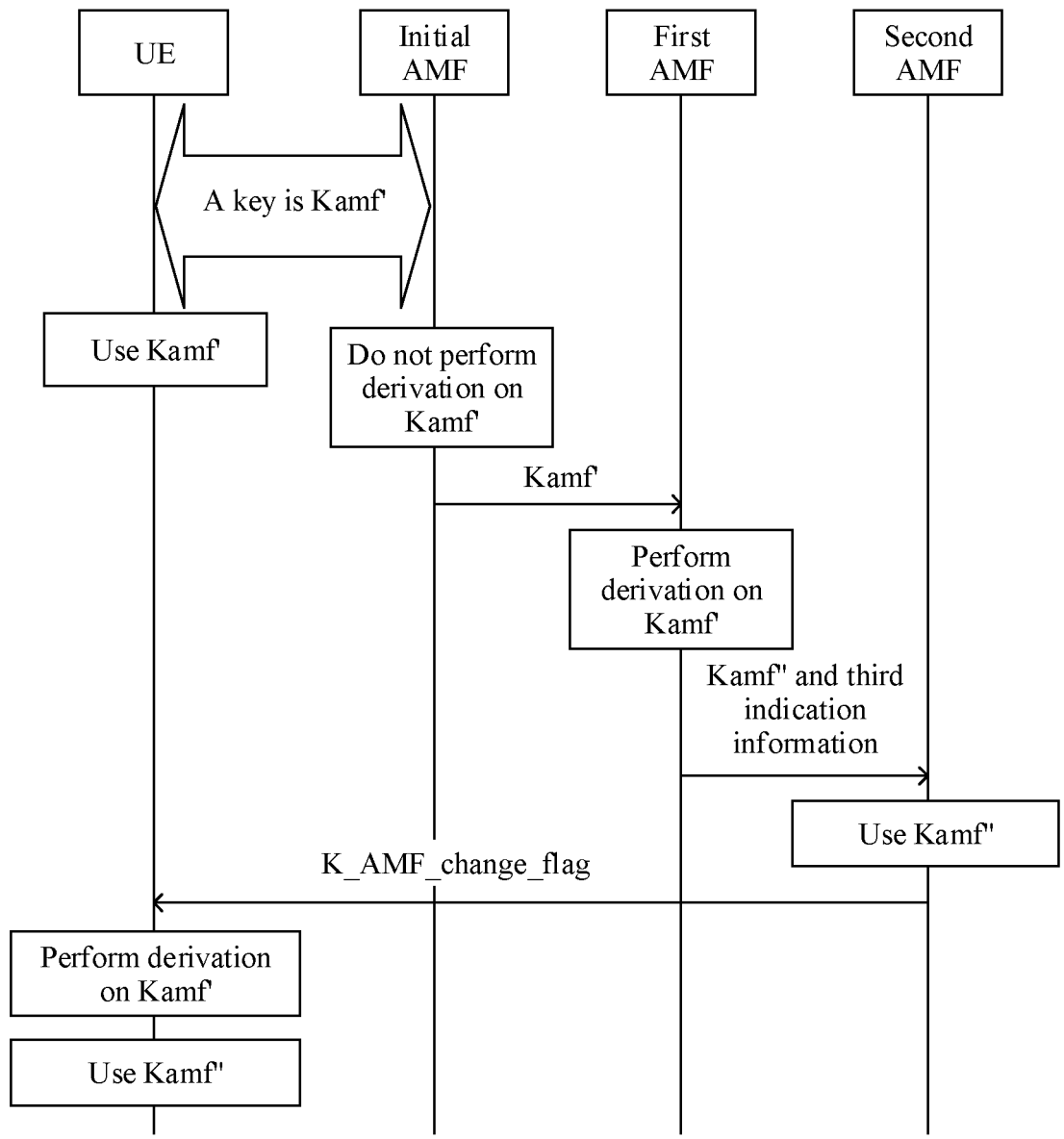

Case 2 As shown in FIG. 5F, the initial AMF does not perform key derivation on Kamf', sends the AMF key Kamf' to the first AMF, and may further send the key identifier ngKSI to the first AMF, and the first AMF performs key derivation on Kamf', and sends the key Kamf'' obtained through the derivation and the identifier ngKSI to the second AMF. According to the existing standard definition, the first AMF further sends the third indication information to the second AMF, where the third indication information is used to indicate that the key Kamf'' in the second key information is obtained by the first AMF by performing key derivation. According to the existing standard definition, the NAS SMC message sent by the second AMF to the UE further carries K_AMF_change_flag whose value is 1. After receiving K_AMF_change_flag whose value is 1, the UE performs key derivation on Kamf', and generates Kamf'' based on the current Kamf'. In this way, the keys on the UE and the second AMF are both Kamf'', and the keys are consistent.

Figure 5G:
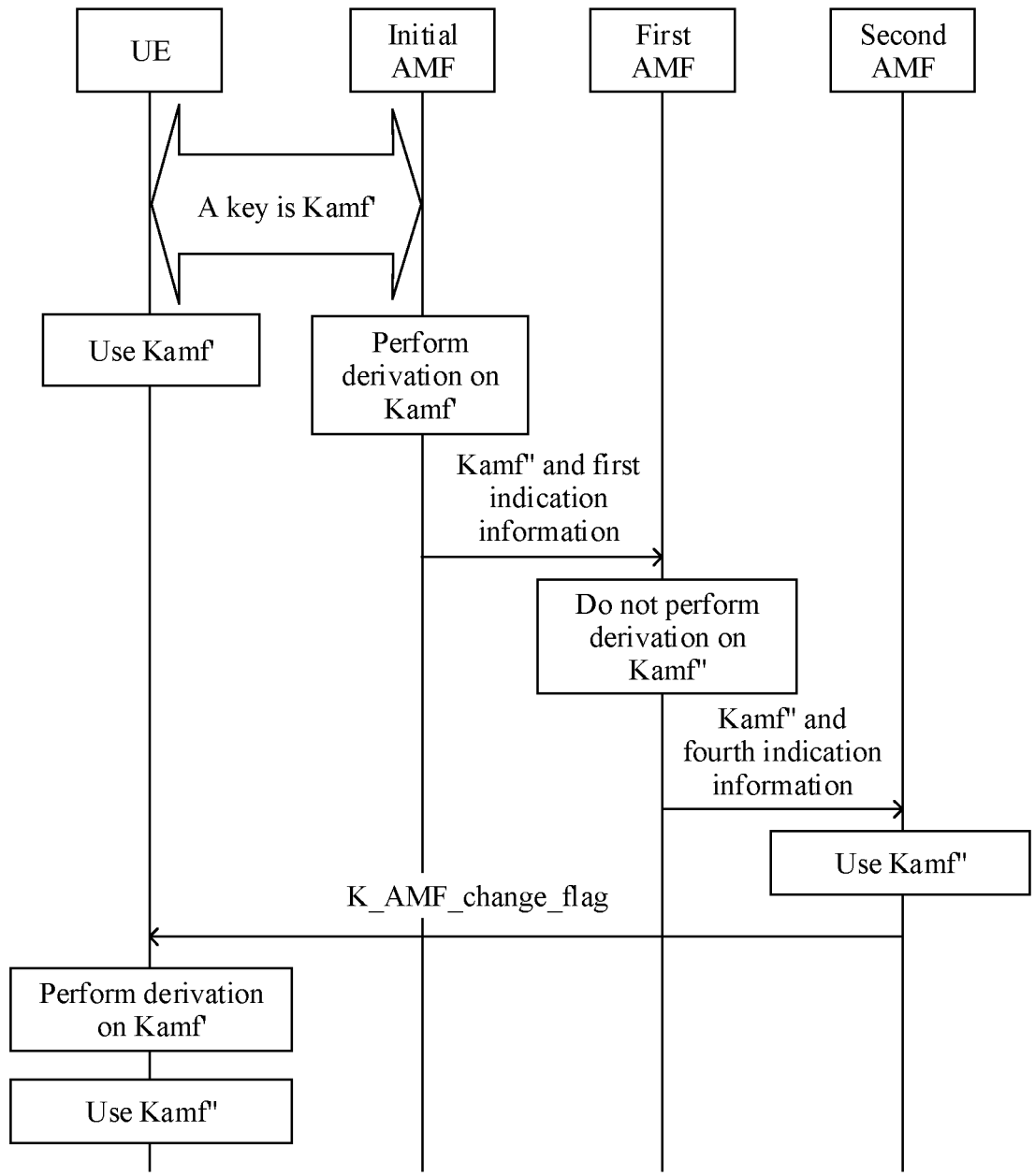

Case 3: As shown in FIG. 5G, the initial AMF performs key derivation on Kamf', sends the AMF key Kamf'' and the first indication information to the first AMF, and may further send the key identifier ngKSI to the first AMF, where the first indication information is used to indicate that the key Kamf'' in the first key information is obtained by the initial AMF by performing key derivation, and the first AMF does not perform key derivation on Kamf'', and sends the key Kamf'', the key identifier ngKSI, and the fourth indication information to the second AMF, where the fourth indication information is used to indicate that the key Kamf" in the second key information is obtained by the initial AMF by performing key derivation. The NAS SMC message sent by the second AMF to the UE carries the fifth indication information. After receiving the fifth indication information, the UE performs key derivation on Kamf', and generates Kamf" based on the current Kamf'. In this way, the keys on the UE and the second AMF are both Kamf", and the keys are consistent.

Figure 5H:
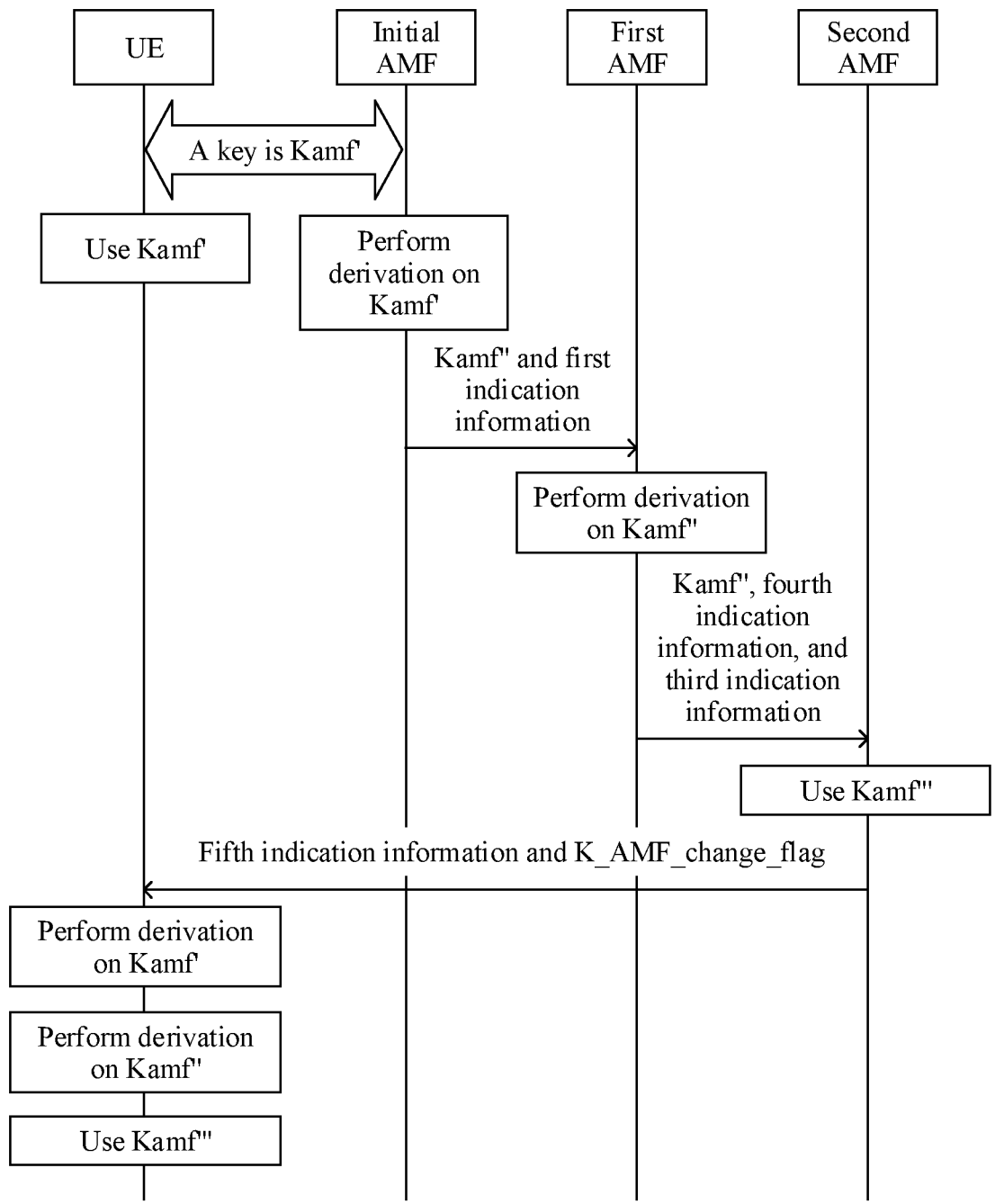

Case 4: As shown in FIG. 5H, the initial AMF performs key derivation on Kamf', sends the AMF key Kamf" and the first indication information to the first AMF, and may further send the key identifier ngKSI to the first AMF, where the first indication information is used to indicate that the key Kamf" in the first key information is obtained by the initial AMF by performing key derivation, and the first AMF performs horizontal derivation on Kamf", and sends the key Kamf"' obtained through horizontal derivation, the identifier ngKSI, and the fourth indication information to the second AMF. According to the existing standard definition, the first AMF further sends the third indication information to the second AMF, where the third indication information is used to indicate that the first AMF performs horizontal key derivation. The NAS SMC message sent by the second AMF to the UE carries the fifth indication information. According to the existing standard definition, the NAS SMC message sent by the second AMF to the UE further carries K_AMF_change_flag whose value is 1. The UE performs horizontal derivation on Kamf based on the fifth indication information, and generates Kamf" based on the current Kamf'. The UE performs horizontal derivation on Kamf" based on K_AMF_change_flag whose value is 1, to obtain Kamf"'. In this way, the keys on the UE and the second AMF are both Kamf"', and the keys are consistent.

Figure 5I:
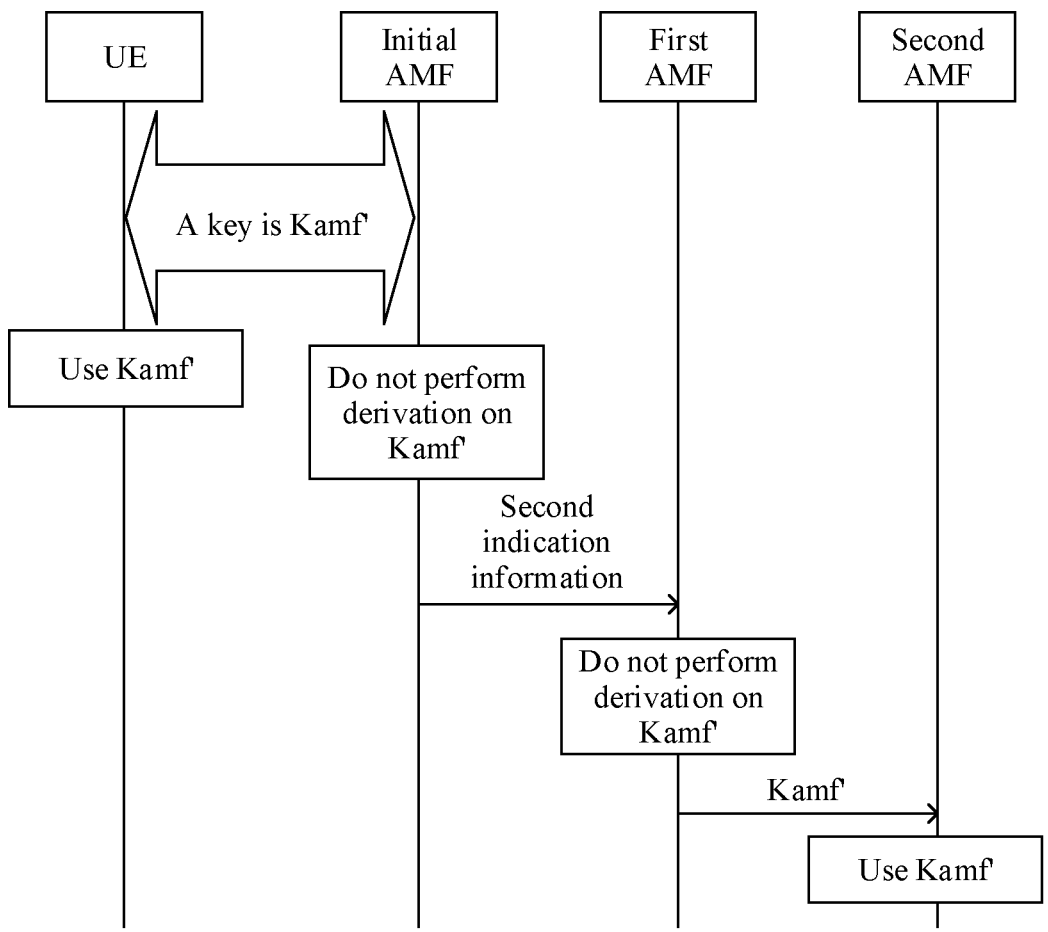

Case 5: As shown in FIG. 5I, the initial AMF does not perform key derivation on Kamf', sends the first key information carrying the second indication information to the first AMF, and may further send the key identifier ngKSI to the first AMF, and if the first AMF determines, based on the second indication information, that the key used by the initial AMF is Kamf', the first AMF generates Kamf', and the first AMF does not perform key derivation on Kamf', and sends the key Kamf' and the key identifier ngKSI to the second AMF. In this case, the keys on the UE and the second AMF are both Kamf', and the keys are consistent.

Figure 5J:
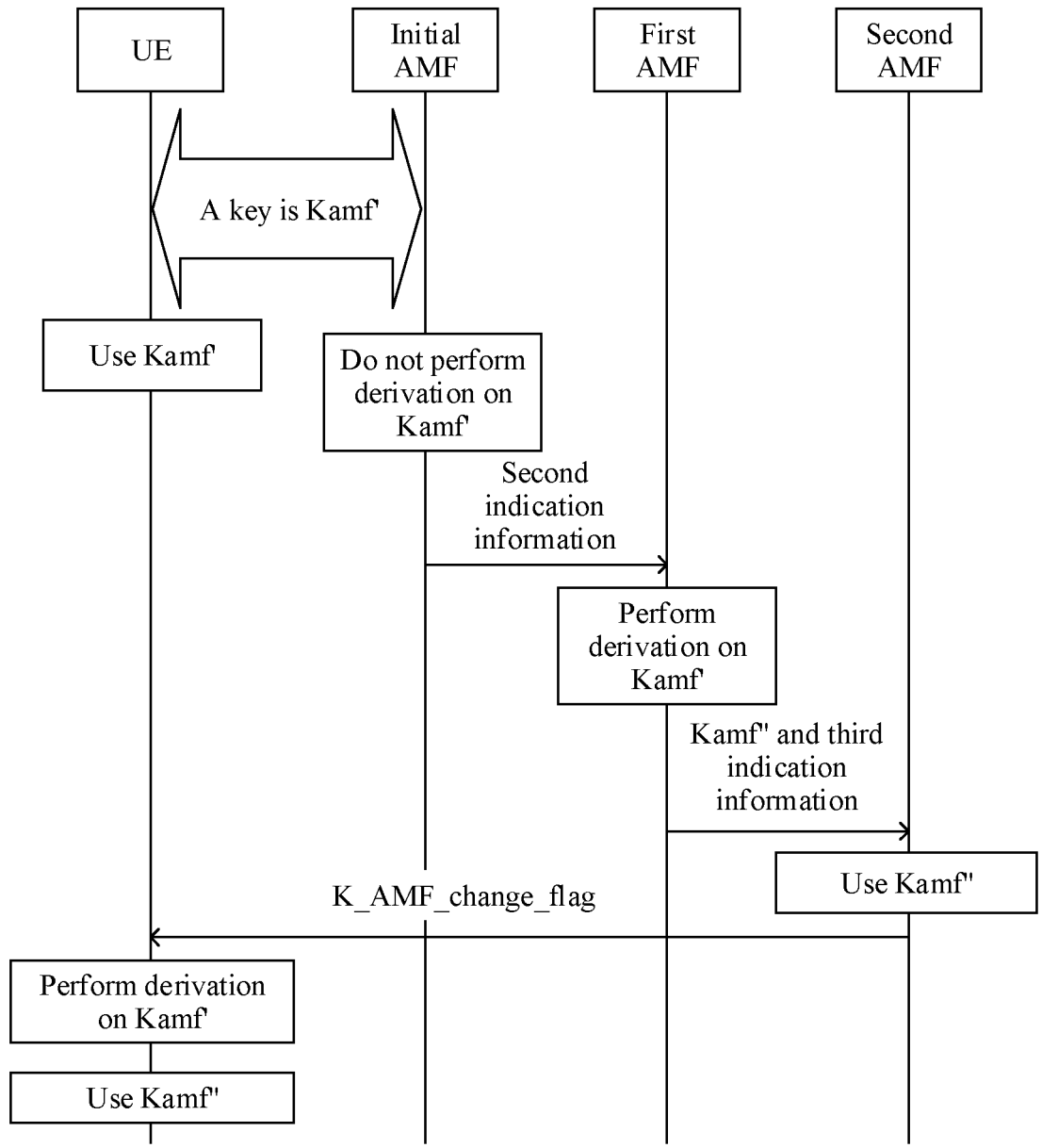

Case 6: As shown in FIG. 5J, the initial AMF does not perform key derivation on Kamf', sends the second indication information carrying the AMF key to the first AMF, and may further send the key identifier ngKSI to the first AMF, and if the first AMF determines, based on the second indication information, that the key used by the initial AMF is Kamf', the first AMF generates Kamf', and the first AMF performs key derivation on Kamf', and sends the key Kamf" obtained through derivation and the identifier ngKSI to the second AMF. According to the existing standard definition, the first AMF further sends the third indication information to the second AMF, where the third indication information is used to indicate that the key Kamf" in the second key information is obtained by the first AMF by performing key derivation. According to the existing standard definition, the NAS SMC message sent by the second AMF to the UE further carries K_AMF_change_flag whose value is 1. After receiving K_AMF_change_flag whose value is 1, the UE performs key derivation on Kamf', and generates Kamf" based on the current Kamf'. In this way, the keys on the UE and the second AMF are both Kamf", and the keys are consistent.

The method for registration provided in the embodiments of this application with reference to FIG. 4A and FIG. 4B and FIG. 5A to FIG. 5J are described in detail below, to resolve the problem of inconsistent keys on the UE and the second AMF in the method procedures shown in FIG. 2 and FIG. 3.

In the method procedure shown in FIG. 4A and FIG. 4B, the initial AMF includes, in the third service operation response sent to the first AMF, the AMF key used by the initial AMF and the indication information indicating whether the key carried in the third service operation is obtained through derivation, and the first AMF includes, in the second service operation response sent to the second AMF, the key information carried in the third service operation by the initial AMF or the derived key information in the key information, and includes, in the second service operation response, the indication information indicating whether the initial AMF and/or the first AMF perform/performs key derivation on the key, so that the keys on the UE and the second AMF are consistent.

Figure 6A:
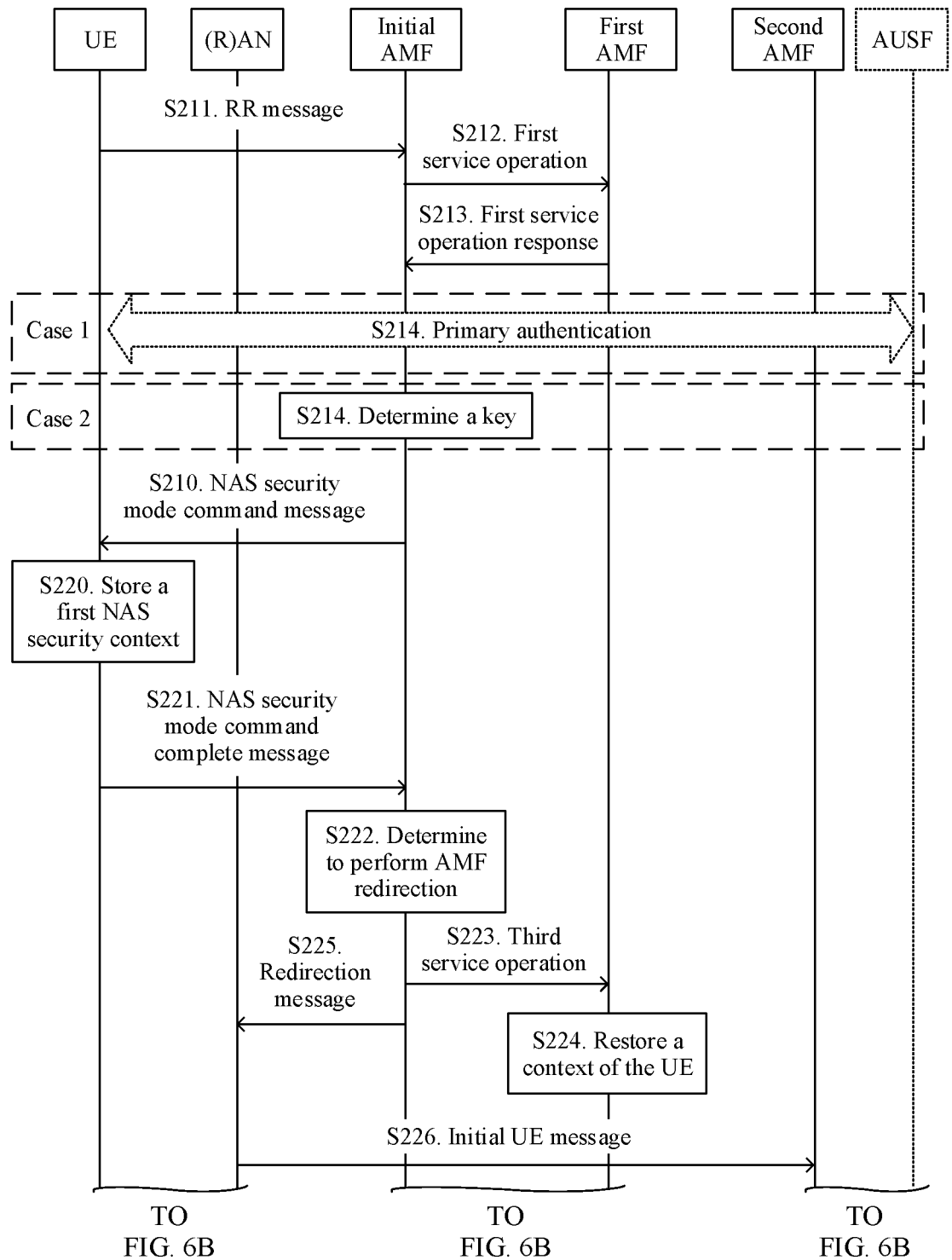
FIG. 6A and FIG. 6B are another schematic flowchart of a method for mobility registration according to an embodiment of this application.
Figure 6B:
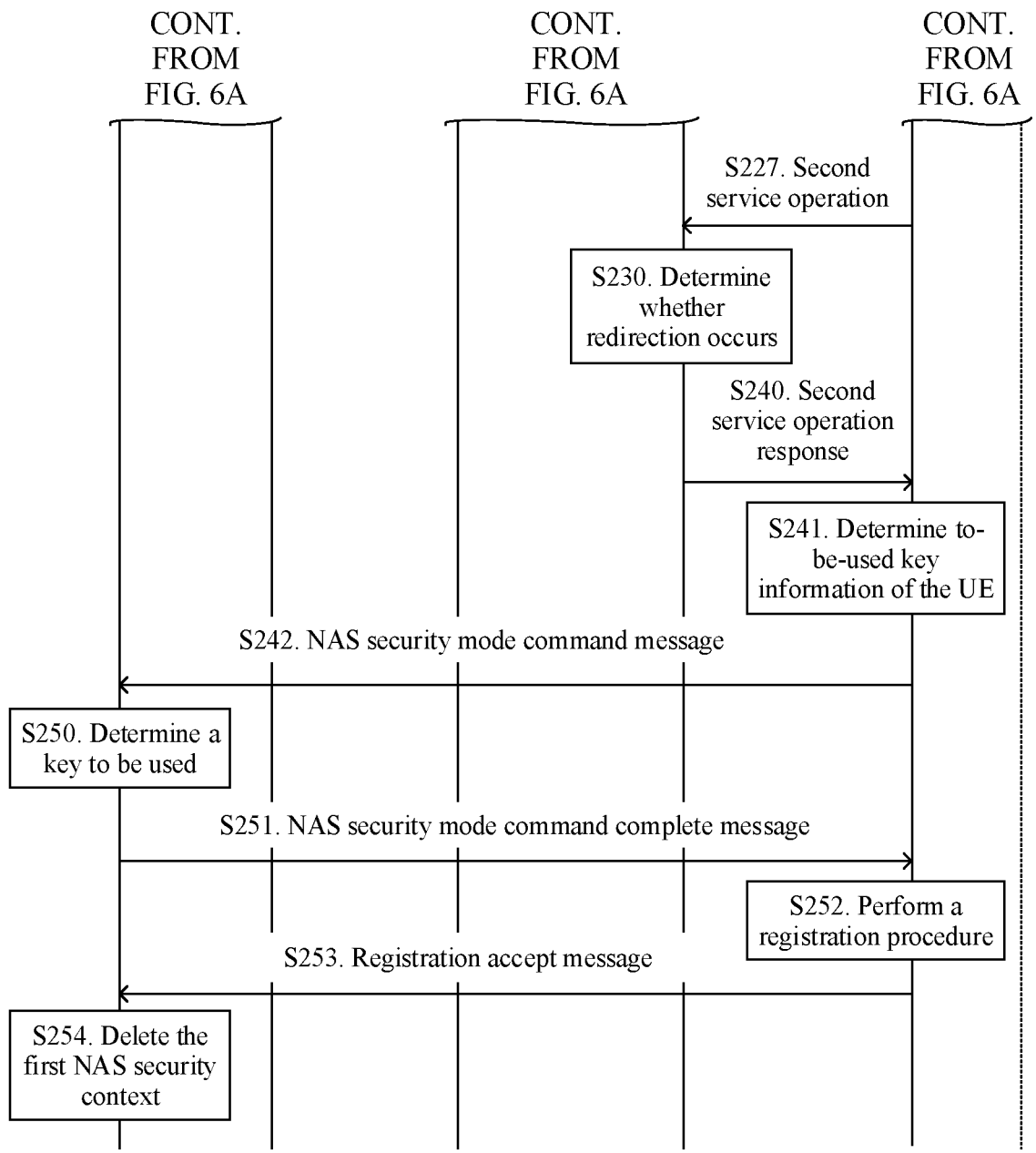

This application further provides another method for registration procedure. With reference to FIG. 6A and FIG. 6B, the following describes in detail another method for registration procedure provided in an embodiment of this application. FIG. 6A and FIG. 6B are another schematic flowchart of a method for mobility registration according to an embodiment of this application. In the figure, UE, a (R)AN, an initial AMF, a first AMF, a second AMF, an AUSF, and S210 to S260 are included. A security context is created by the UE and the first AMF that serves the UE last time, and the UE and the first AMF store a same AMF key, which is denoted as Kamf. The following describes S210 to S260 in detail from a perspective of signaling interaction.

S210. The UE receives a NAS SMC message sent by the initial AMF. Further, the NAS SMC message carries an indication for requesting a complete initial NAS message. In the embodiment shown in FIG. 6A and FIG. 6B, the NAS SMC message sent by the initial AMF to the UE may be referred to as a first NAS SMC message.

It should be noted that, different from the NAS SMC message sent by the initial AMF to the UE shown in FIG. 2 and FIG. 3, the NAS SMC message in the embodiment shown in FIG. 6A and FIG. 6B may carry a fourth indication. The fourth indication is used to indicate the UE to store a NAS security context created by the UE and the initial AMF, and further indicate the UE to store a NAS security context created after a registration message is sent, or indicate the UE to store a NAS security context created before the registration message is sent. It should be understood that in this application, the fourth indication that is used to indicate the UE to store the NAS security context created when sending the registration message and that is carried in the first NAS SMC message is merely an example, and does not constitute any limitation on this application. For example, the fourth indication may also be referred to as a storage indication, storage information, information, or the like. The NAS security context includes at least a key in the NAS security context created by the UE and the first AMF, and may further include a key identifier ngKSI and NAS counts. For ease of description, the NAS security context created by the UE and the first AMF is referred to as a first NAS security context for short below.

Further, in the embodiment shown in FIG. 6A and FIG. 6B, after receiving the NAS SMC message sent by the initial AMF, the UE performs a storage action to store the first NAS security context, instead of directly updating a local AMF key. That is, different from the foregoing method, in the method embodiment shown in FIG. 6A and FIG. 6B, the UE performs S220 of storing the first NAS security context. Further, the UE may store the first NAS security context in the following two possible manners:

Manner 1:

The UE receives the NAS SMC message sent by the initial AMF, and performs, based on the NAS SMC message, S220 of storing the first NAS security context. Then, the UE processes the NAS SMC message according to an existing standard definition, to update the key.

It should be understood that a sequence of processing the first NAS SMC message and storing the first NAS security context by the UE is not limited in this embodiment of this application. For example, after receiving the first NAS SMC message, the UE may first store the local first NAS security context without processing the first NAS SMC message, and then process the first NAS security context in a processing manner specified in an existing protocol. Alternatively, after receiving the first NAS SMC message, the UE may first process the first NAS SMC message. In this case, the UE can distinguish the local first NAS security context and a new NAS security context generated by processing the first NAS SMC message. The UE may process the first NAS SMC message after processing the first NAS SMC message.

Manner 2:

The UE receives the NAS SMC message sent by the initial AMF, where the NAS SMC message carries the fourth indication, and the fourth indication is used to indicate the UE to store information about the first NAS security context. The UE first stores the information about the first NAS security context based on the fourth indication, and then the UE processes the NAS SMC message according to an existing standard definition, to update the key.

That is, in the embodiment shown in FIG. 6A and FIG. 6B, in a possible implementation, the UE may determine, based on the NAS SMC message received from the initial AMF, to store the information about the first NAS security context. In another possible implementation, the NAS SMC message includes the fourth indication, and the UE may determine, based on the fourth indication, to store the information about the first NAS security context. To be specific, in a first possible implementation, the NAS SMC message has a function of indicating the UE to store the information about the first NAS security context. In a second possible implementation, a function of the NAS SMC message is the same as that specified in an existing protocol, and only the fourth indication newly added to the NAS SMC message has a function of indicating the UE to store the information about the first NAS security context. The UE stores the first NAS security context based on either of the foregoing possible implementations, and this is not limited in this application.

It should be understood that the UE further needs to process the first NAS SMC message. For example, the UE performs key derivation based on a key derivation indication in the first NAS SMC message, to generate a new AMF key. When the UE locally has both the new AMF key and a first key, the UE may set flag bits to separately identify the new AMF key and the first key. This is not limited in this application. It should be understood that, similar to the method procedures shown in FIG. 2 and FIG. 3, the NAS SMC message received by the UE from the initial AMF in the embodiment shown in FIG. 6A and FIG. 6B may also be used by the initial AMF and the UE to negotiate about an AMF key and a security algorithm to be used. Further, in the embodiment shown in FIG. 6A and FIG. 6B, that the UE updates the key Kamf based on the NAS SMC message includes the following two cases:

Case 1:

The UE updates, based on the NAS SMC message, Kamf to Kamf_new that is activated and used by the initial AMF after primary authentication.

Further, when the UE receives and processes the NAS SMC message, after integrity protection verification succeeds, the UE determines that an updated key of the UE and a corresponding identifier are Kamf_new and ngKSI_new. In this case, before updating, the UE stores the first AMF key and a corresponding identifier, that is, Kamf and ngKSI that are created by the UE and the first AMF.

Case 2:

The UE updates, based on the NAS SMC message, Kamf to a key Kamf' received by the initial AMF from the first AMF.

Further, when the UE receives and processes the NAS SMC message, after integrity protection verification succeeds, the UE determines that an updated key of the UE is Kamf'. In this case, before updating, the UE stores the first AMF key and a corresponding key identifier, that is, stores Kamf and ngKSI that are created by the UE and the first AMF.

Case 3:

The UE activates and uses Kamf based on the NAS SMC message and updates the used security algorithm.

It should be understood that signaling different from that in the procedures shown in FIG. 2 and FIG. 3 is mainly described in detail in the embodiment shown in FIG. 6A and FIG. 6B, and signaling similar to that in the procedures shown in FIG. 2 and FIG. 3 is simply described. For example, the method shown in FIG. 6A and FIG. 6B needs to further include the following steps.

S211. The UE sends an RR message to the initial AMF, where the RR message carries a 5G-GUTI of the UE.

S212. The initial AMF invokes a first service operation from the first AMF. Further, after receiving the RR message sent by the UE, the initial AMF determines, based on the 5G-GUTI in the RR message, the first AMF that serves the UE last time, and invokes the first service operation from the AMF. The first service operation may be referred to as Namf_Communication_UEContextTransfer, and is used to request a context of the UE from the first AMF.

S213. The first AMF sends a first service operation response to the initial AMF. Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransfer Response.

Corresponding to the case 1 in S220, the first service operation response includes Kamf or Kamf'.

Corresponding to the case 2 in S220, the first service operation response includes Kamf'.

Corresponding to the case 3 in S220, the first service operation response includes Kamf.

S214. Corresponding to the case 1 in S220, the initial AMF initiates a primary authentication procedure, and the initial AMF and the UE separately generate Kamf_new and ngKSI_new corresponding to Kamf_new, corresponding to the case 2 in S220, the initial AMF determines to use Kamf', or corresponding to the case 3 in S220, the initial AMF determines to use Kamf.

After S214 is performed, the initial AMF needs to send the NAS SMC message to the user equipment, that is, perform S210 of sending the NAS SMC message to the user equipment by the initial AMF.

S221. The UE sends a NAS security mode command complete (NAS security mode complete) message to the initial AMF. Further, the NAS security mode command complete message may carry a complete registration request message. Further, a difference between the complete registration request message in this application and the registration request message in S211 lies in that information carried in the complete registration request message is cleartext and is not encrypted, while some information is cleartext and some information is encrypted in the registration request message in S211.

Corresponding to the case 1 in S220, the UE stores the first NAS security context including Kamf, ngKSI, NAS counts, and the like, and activates and starts using Kamf_new and ngKSI_new.

Corresponding to the case 2 in S220, the UE stores the first NAS security context including Kamf, ngKSI, NAS counts, and the like, and activates and starts using Kamf and ngKSI.

Corresponding to the case 3 in S220, the UE stores the first NAS security context including Kamf, ngKSI, NAS counts, and the like, and activates and starts using Kamf and ngKSI.

S222. The initial AMF determines, based on requested NSSAIs carried in the complete registration request message in the security mode command complete message sent by the UE or requested NSSAIs obtained after the initial AMF decrypts the registration request message, to perform AMF redirection. In other words, the initial AMF determines to perform NAS reroute.

Further, in this embodiment of this application, a reason why the initial AMF determines to perform AMF redirection is not limited, and may be any reason for triggering AMF redirection specified in an existing protocol. For example, when the initial AMF cannot server a network slice of the UE, the initial AMF determines to perform AMF redirection, to select the second AMF that can serve the UE. An existing protocol defines the following two manners for implementation of redirection, and the initial AMF may select either of the following manners:

Manner 1: If a connection can be established between the initial AMF and the second AMF, the initial AMF invokes an Namf_Communication_N1 Message Notify service operation from the second AMF.

Manner 2: If there is no connection between the initial AMF and the second AMF (where a possible cause is that the initial AMF and the second AMF belong to different network slices, and interworking between the initial AMF and the second AMF is not allowed), the initial AMF sends the received registration request of the UE to the second AMF by using the (R)AN.

The foregoing manner 2 is considered in the registration procedure shown in FIG. 6A and FIG. 6B.

S223. The initial AMF invokes a third service operation from the first AMF. The third service operation indicates a registration failure of the UE with the initial AMF.

It should be noted that, different from the conventional technology, in the embodiment shown in FIG. 6A and FIG. 6B, the third service operation carries a cause value, and the cause value is used to indicate that the UE fails to be registered with the initial AMF because the AMF redirection occurs. That is, in the embodiment shown in FIG. 6A and FIG. 6B, the first AMF can learn, based on the third service operation, that the UE fails to be registered with the initial AMF and that the UE fails to be registered with the initial AMF because the AMF redirection occurs.

Further, the third service operation may be referred to as Namf_Communication_RegistrationStatusUpdate, and a registration status of the UE carried in the third service operation is "NOT_TRANSFERRED". The cause value may be referred to as AMF_Reallocation_Ind, or a first indication.

It should be understood that, that the initial AMF sends the first indication to the first AMF by invoking the third service operation from the first AMF by the initial AMF is merely an example, and does not constitute any limitation on this application. Alternatively, the first indication may be sent to the first AMF in other manners, for example, by using newly added signaling, where the signaling carries the first indication. The other manners are not listed herein one by one.

S224. After the first AMF receives the invocation for the third service operation, according to an existing standard definition, the first AMF restores a context of the UE on the first AMF as if the first AMF does not receive the invocation for the first service operation in S212.

In a possible implementation, if the invocation for the third service operation carries a cause value, the first AMF stores the cause value. The first AMF restores the NAS security context based on the cause value, that is, restores the NAS security context to a state existing before S212 is received.

S225. The initial AMF sends a redirection message to the (R)AN. The message is referred to as a NAS reroute message. The RR message received from the UE is carried in the NAS reroute message and sent to the (R)AN.

S226. The (R)AN sends an initial UE message to the second AMF, where the initial UE message carries the foregoing RR message.

Optionally, S225 and S226 may alternatively be as follows:

S225. The initial AMF sends a redirection message to the (R)AN. The message may be referred to as a NAS reroute message or a NAS reselection message.

Different from the NAS reroute message shown in FIG. 2 and FIG. 3, the NAS reroute message does not carry the RR message received from the UE, but carries the complete registration request message shown in S221 or a complete registration request message in cleartext that is obtained after the initial AMF decrypts the registration request message.

S226. The (R)AN sends an initial UE message to the second AMF, where the initial UE message carries the complete registration request message. The complete registration request message is used to indicate that the AMF redirection occurs on a network side.

Further, if the initial UE message sent by the (R)AN to the second AMF in S226 carries the complete registration request message, the second AMF does not need to request the complete registration request message from the UE, and the second AMF can determine, based on the complete registration request message, that the AMF redirection occurs on the network side, and that the second AMF can serve the UE. In addition, the second AMF does not need to perform the step of whether to perform AMF redirection again.

S227. The second AMF invokes a second service operation from the first AMF. The second service operation is an Namf_Communication_UEContextTransfer request message.

S230. The first AMF determines whether the AMF redirection occurs on the network side.

Further, after receiving the invocation for the second service operation sent by the second AMF, the first AMF first authenticates the UE. After the authentication succeeds, the first AMF determines whether the AMF redirection occurs on the network side, which is different from the conventional technology. If determining that the AMF redirection occurs, the first AMF determines that a second service operation response sent to the second AMF carries a second indication, where the second indication is used to indicate the second AMF to notify the UE that the AMF redirection occurs on the network side. The second indication may be referred to as Ind_UE_OldCntx.

A manner in which the first AMF determines whether the AMF redirection occurs includes the following.

If the first AMF previously receives the first indication, the first AMF may determine that the AMF redirection occurs on the network side.

S240. The first AMF sends the second service operation response to the second AMF. Further, the first AMF sends the second service operation response to the initial AMF after successfully authenticating the UE. Authentication of the UE by the first AMF means verification of integrity protection for the registration request message. The second service operation response is Namf_Communication_UE-ContextTransfer Response, and the second service operation response includes Kamf or Kamf'. Different from the conventional technology, if the first AMF determines that the AMF redirection occurs on the network side, the first AMF includes the second indication in the second service operation response.

It should be understood that, that the first AMF sends the second indication to the second AMF by sending the second service operation response to the second AMF is merely an example, and does not constitute any limitation on this application. Alternatively, the second indication may be sent to the second AMF in other manners, for example, by using newly added signaling, where the signaling carries the second indication. The other manners are not listed herein one by one.

S241. The second AMF determines to-be-used key information of the UE.

Further, the second AMF determines to use Kamf or Kamf' sent by the first AMF. If the second AMF receives the second indication, the second AMF sends a NAS SMC message. For other cases in which the NAS SMC message is to be sent, refer to the existing standard definition.

S242. The second AMF sends the NAS SMC message to the UE.

If the second AMF determines to use the key sent by the first AMF, and the second AMF receives the second indication from the first AMF, the second AMF adds one piece of indication information to the NAS SMC message, where the indication information is used to indicate the UE to use the first NAS security context. The indication information may be referred to as Ind_Oamf_OldCntx.

In a possible implementation, the NAS SMC message sent by the second AMF to the UE carries the indication for requesting the complete initial NAS message.

In another possible implementation, in S226, when the initial UE message sent by the (R)AN to the second AMF carries the complete registration request message, the NAS SMC message sent by the second AMF to the UE does not need to carry the indication for requesting the complete initial NAS message.

S250. The UE determines the key to be used.

After receiving the NAS SMC message, if the message carries the indication information, the UE uses the first NAS security context of the UE or uses the first NAS security context as a current NAS security context. Then, the UE processes the NAS SMC message according to the existing standard definition, and after the processing succeeds, sends a NAS security mode command complete message to the second AMF. That is, the method procedure shown in FIG. 6A and FIG. 6B further includes S251.

S252. The second AMF performs a registration procedure.

Further, the second AMF continues to perform a next procedure. After accepting the registration of the UE, the second AMF performs S253 The second AMF sends a registration accept message to the UE.

S254. Optionally, the UE deletes the first NAS security context.

Further, after the UE receives the registration accept message sent by the second AMF, optionally, if the UE stores the first NAS security context in the registration procedure in which the AMF redirection occurs, the UE deletes the first NAS security context stored in the registration procedure in which the AMF redirection occurs.

In S241 in FIG. 6A and FIG. 6B, the second AMF may further determine to initiate primary authentication, and the second AMF sends a NAS message related to primary authentication to the UE. Alternatively, in S241 in FIG. 6A and FIG. 6B, the second AMF determines to use Kamf and the security algorithm that are sent by the first AMF, and the second AMF sends another NAS message in the registration procedure to the UE. The NAS message sent by the second AMF to the UE carries indication information, where the indication information is used to indicate the UE to use the first NAS security context, indicate the UE to delete a new NAS security context, indicate the UE to delete the current NAS security context, and/or indicate the UE to generate an AMF. The indication information may be referred to as Ind_Oamf_OldCntx. If the second AMF performs security protection on the NAS message, the indication information needs to be used as a cleartext IE of the NAS message. When receiving the NAS message, the UE first uses the first NAS security context as the current security context based on the indication information, and then processes the NAS message according to an existing standard definition.

In the method procedure shown in FIG. 6A and FIG. 6B, the key obtained by the second AMF from the first AMF is Kamf, or Kamf' that is obtained by performing key derivation on Kamf. After receiving the indication information in the NAS SMC message sent by the second AMF, the UE resumes using the stored first NAS security context or uses the first NAS security context as the current security context.

In FIG. 6A and FIG. 6B, the UE stores the first NAS security context based on the NAS SMC message sent by the initial AMF or the fourth indication carried in the NAS SMC message. Another possible implementation used by the UE to store the first NAS security context is as follows:

After sending the RR message, the UE immediately stores the current security context, that is, the first NAS security context.

In the method procedure shown in FIG. 6A and FIG. 6B, the UE stores the first NAS security context (including at least the key Kamf and the corresponding key identifier ngKSI) between the UE and the first AMF, and the second AMF includes the indication information in the NAS SMC message sent by the second AMF, to indicate the UE whether to resume using the first NAS security context, so that the keys on the UE and the second AMF are consistent.

Figure 7A:
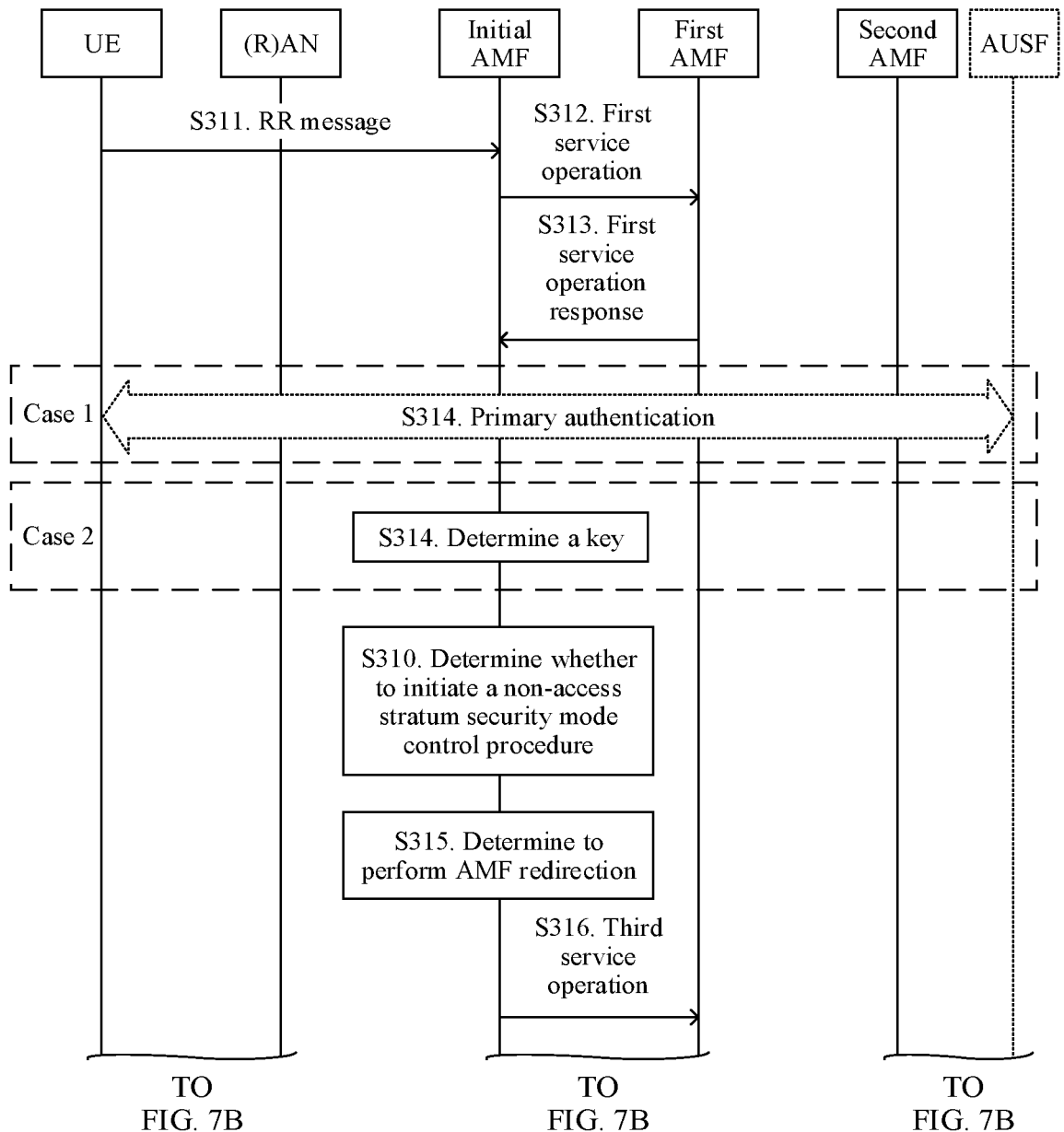
FIG. 7A and FIG. 7B are another schematic flowchart of a method for mobility registration according to an embodiment of this application.
Figure 7B:
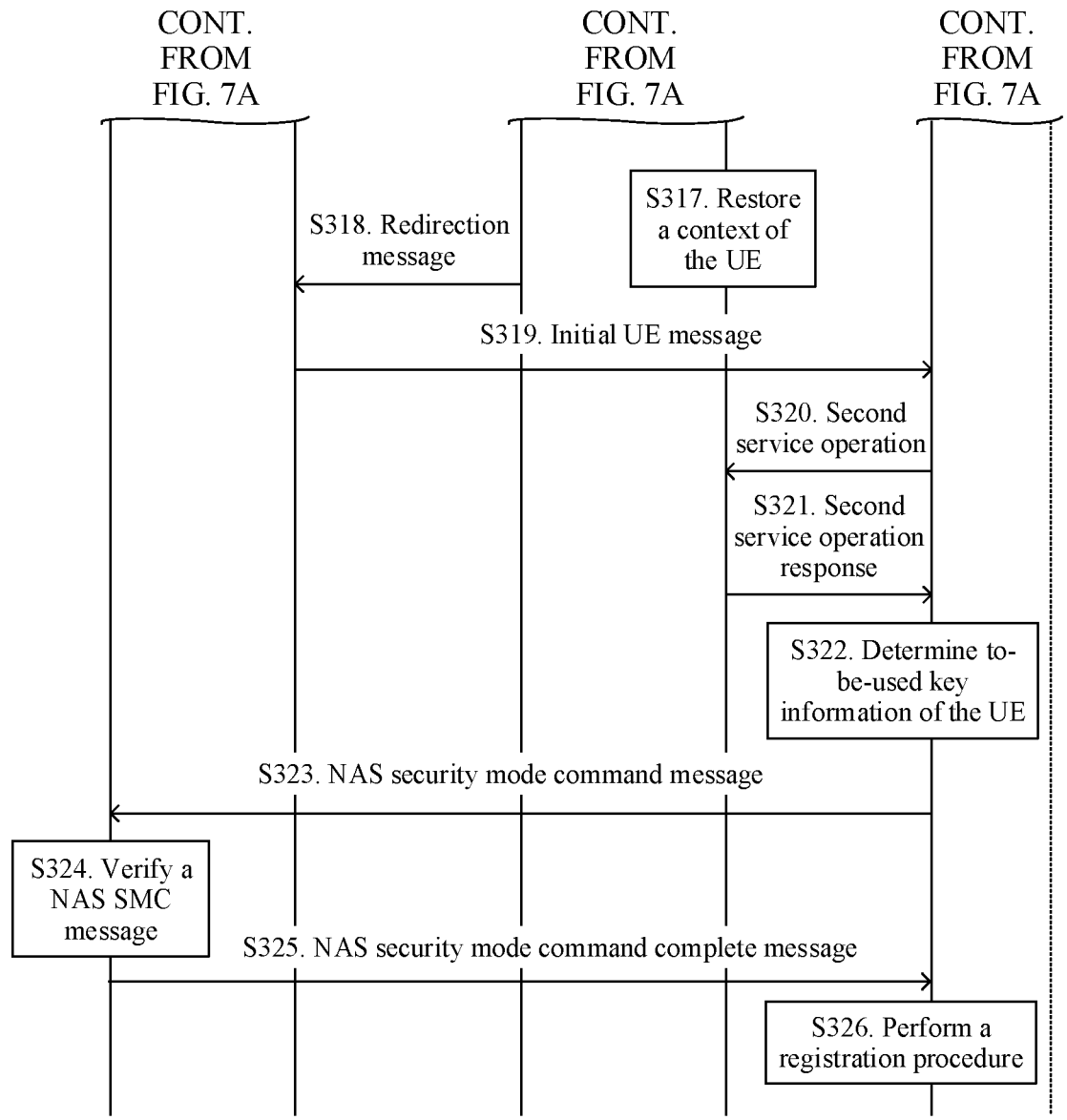

This application further provides another method for registration procedure. With reference to FIG. 7A and FIG. 7B, the following describes in detail another method for redirection provided in an embodiment of this application. FIG. 7A and FIG. 7B are another schematic flowchart of a method for registration procedure according to an embodiment of this application. In the figure, UE, a (R)AN, an initial AMF, a first AMF, a second AMF, an AUSF, and S310 to S360 are included. A security context is created by the UE and the first AMF that serves the UE last time, and the UE and the first AMF store a same AMF key, which is denoted as Kamf. The following describes S310 to S360 in detail from a perspective of signaling interaction.

S310. The initial AMF determines whether to initiate a NAS SMC procedure.

In the embodiment shown in FIG. 7A and FIG. 7B, the initial AMF sends a NAS SMC message to the UE only after determining that the initial AMF can serve the UE. Otherwise, the initial AMF does not send the NAS SMC message to the UE, but performs NAS reroute first.

Further, the embodiment shown in FIG. 7A and FIG. 7B includes the following two cases:

Case 1:

The initial AMF initiates a primary authentication procedure. The UE and the initial AMF separately generate a new key Kamf_new and ngKSI_new. The initial AMF determines whether to initiate the NAS security mode control procedure. A determining manner is as follows The initial AMF determines whether the initial AMF can serve the UE, and the initial AMF sends the NAS SMC message to the UE only if the initial AMF can serve the UE. Otherwise, if the initial AMF cannot serve the UE, the initial AMF does not send the NAS SMC message. Instead, the initial AMF first notifies the first AMF of a registration failure of the UE with the initial AMF and performs NAS reroute.

Case 2:

The initial AMF successfully obtains the context of the UE from the first AMF, and the first AMF returns Kamf'. After the initial AMF determines to use Kamf', the initial AMF determines whether to initiate the NAS security mode control procedure. A determining manner is as follows. The initial AMF determines whether the initial AMF can serve the UE, and only if the initial AMF can serve the UE, the initial AMF sends the NAS SMC message to the UE. Otherwise, if the initial AMF cannot serve the UE, the initial AMF does not send the NAS SMC message. Instead, the initial AMF notifies the first AMF of a registration failure of the UE with the initial AMF and performs NAS reroute first.

Further, the embodiment shown in FIG. 7A and FIG. 7B further includes the following one case:

Case 3: The initial AMF successfully obtains the context of the UE from the first AMF, and the first AMF returns Kamf. The initial AMF decrypts a registration request message based on Kamf, and then determines whether the initial AMF can serve the UE. If the initial AMF can serve the UE, the initial AMF sends the NAS SMC message or another NAS message to the UE. Otherwise, if the initial AMF cannot serve the UE, the initial AMF does not send the NAS SMC message or another other NAS message to the UE. Instead, the initial AMF notifies the first AMF of a registration failure of the UE with the initial AMF and performs NAS reroute.

It should be understood that signaling different from that in the procedures shown in FIG. 2 and FIG. 3 is mainly described in the embodiment shown in FIG. 7A and FIG. 7B, and signaling similar to that in the procedures shown in FIG. 2 and FIG. 3 is simply described. For example, the method shown in FIG. 7A and FIG. 7B needs to further include the following steps.

S311. The UE sends an RR message to the initial AMF, where the RR message carries a 5G-GUTI of the UE.

S312. The initial AMF invokes a first service operation from the first AMF. Further, after receiving the RR message sent by the UE, the initial AMF determines, based on the 5G-GUTI in the RR message, the first AMF that serves the UE last time, and invokes the first service operation from the first AMF. The first service operation may be referred to as Namf_Communication_UEContextTransfer, and is used to request a context of the UE from the first AMF.

S313. The first AMF sends a first service operation response to the initial AMF. Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransferResponse.

Corresponding to the foregoing case 1, the first service operation response includes Kamf or Kamf'.

Corresponding to the foregoing case 2, the first service operation response includes Kamf'.

Corresponding to the foregoing case 3, the first service operation response includes Kamf'.

S314. Corresponding to the foregoing case 1, the initial AMF initiates a primary authentication procedure, and the initial AMF and the UE separately generate Kamf_new and ngKSI_new corresponding to Kamf_new, corresponding to the foregoing case 2, the initial AMF determines to use Kamf', or corresponding to the foregoing case 3, the initial AMF determines to use Kamf'.

S315. The initial AMF determines to perform AMF redirection. In other words, the initial AMF determines to perform NAS reroute.

S316. The initial AMF invokes a third service operation from the first AMF. The third service operation indicates a registration failure of the UE with the initial AMF.

It should be noted that, different from the conventional technology, in the embodiment shown in FIG. 7A and FIG. 7B, the third service operation may carry a cause value, and the cause value is used to indicate that the UE fails to be registered with the initial AMF because the AMF redirection occurs. That is, in the embodiment shown in FIG. 7A and FIG. 7B, the first AMF can learn, based on the third service operation, that the UE fails to be registered with the initial AMF and that the UE fails to be registered with the initial AMF because the AMF redirection occurs. The cause value may be referred to as AMF_Reallocation_Ind.

Further, the third service operation may be referred to as an Namf_Communication_RegistrationStatusUpdate request message, and a registration status of the UE carried in the third service operation is "NOT_TRANSFERRED".

S317. After the first AMF receives the invocation for the third service operation, according to an existing standard definition, the first AMF restores the context of the UE on the first AMF as if the first AMF does not receive the invocation for the first service operation in S212.

In a possible implementation, if the invocation for the third service operation carries a cause value, the first AMF stores the cause value.

S318. The initial AMF sends a redirection message to the (R)AN. The message is referred to as a NAS reroute message. The RR message received from the UE is carried in the NAS reroute message and sent to the (R)AN.

S319. The (R)AN sends an initial UE message to the second AMF, where the initial UE message carries the foregoing RR message.

S320. The second AMF invokes a second service operation from the first AMF. The second service operation is an Namf_Communication_UE Context Transfer request message.

S321. The first AMF sends a second service operation response to the second AMF. Further, the first AMF sends the second service operation response to the initial AMF after successfully authenticating the UE. Authentication of the UE by the first AMF means verification of integrity protection for the registration request message. The second service operation response is Namf_Communication_UE-ContextTransfer Response, and the second service operation response includes Kamf or Kamf'.

S322. The second AMF determines to-be-used key information of the UE.

Further, the second AMF determines to use Kamf or Kamf' sent by the first AMF.

S323. The second AMF sends a NAS SMC message to the UE.

S324. The UE verifies integrity protection for the NAS SMC message.

After the UE receives the NAS SMC message, the UE processes the NAS SMC message according to an existing standard definition. After the processing succeeds, the UE sends a NAS SMC complete message to the target AMF, and the second AMF continues with the registration procedure. That is, the method procedure shown in FIG. 7A and FIG. 7B further includes S325 and S326.

In FIG. 7A and FIG. 7B, in S322, the second AMF may also determine to perform primary authentication. The second AMF sends a NAS message related to primary authentication, for example, an authentication request message, to the UE. In S322, the second AMF may alternatively send another NAS message in the registration procedure.

The UE processes the received NAS message according to an existing standard definition.

In the embodiment shown in FIG. 7A and FIG. 7B, after the initial AMF determines that the initial AMF cannot serve the UE, different from the foregoing embodiments, the initial AMF does not perform the NAS security mode control procedure, that is, a security context stored by the UE is consistent with that obtained by the second AMF from the first AMF after the redirection. This avoids inconsistency between keys on the UE and the second AMF.

Further, if the second AMF determines to use Kamf sent by the first AMF, because the key in the security context stored on the UE is Kamf, the keys on the UE and the second AMF are consistent. Alternatively, if the second AMF determines to use the Kamf' sent by the first AMF, the NAS SMC message sent by the second AMF to the UE carries a key derivation indication that is referred to as K_AMF_change_flag, where a value of K_AMF_change_flag in the NAS SMC message is 1, indicating the UE to perform key derivation. In this case, the UE performs key derivation on Kamf to obtain Kamf', so that the keys on the UE and the second AMF are consistent.

Figure 8A:
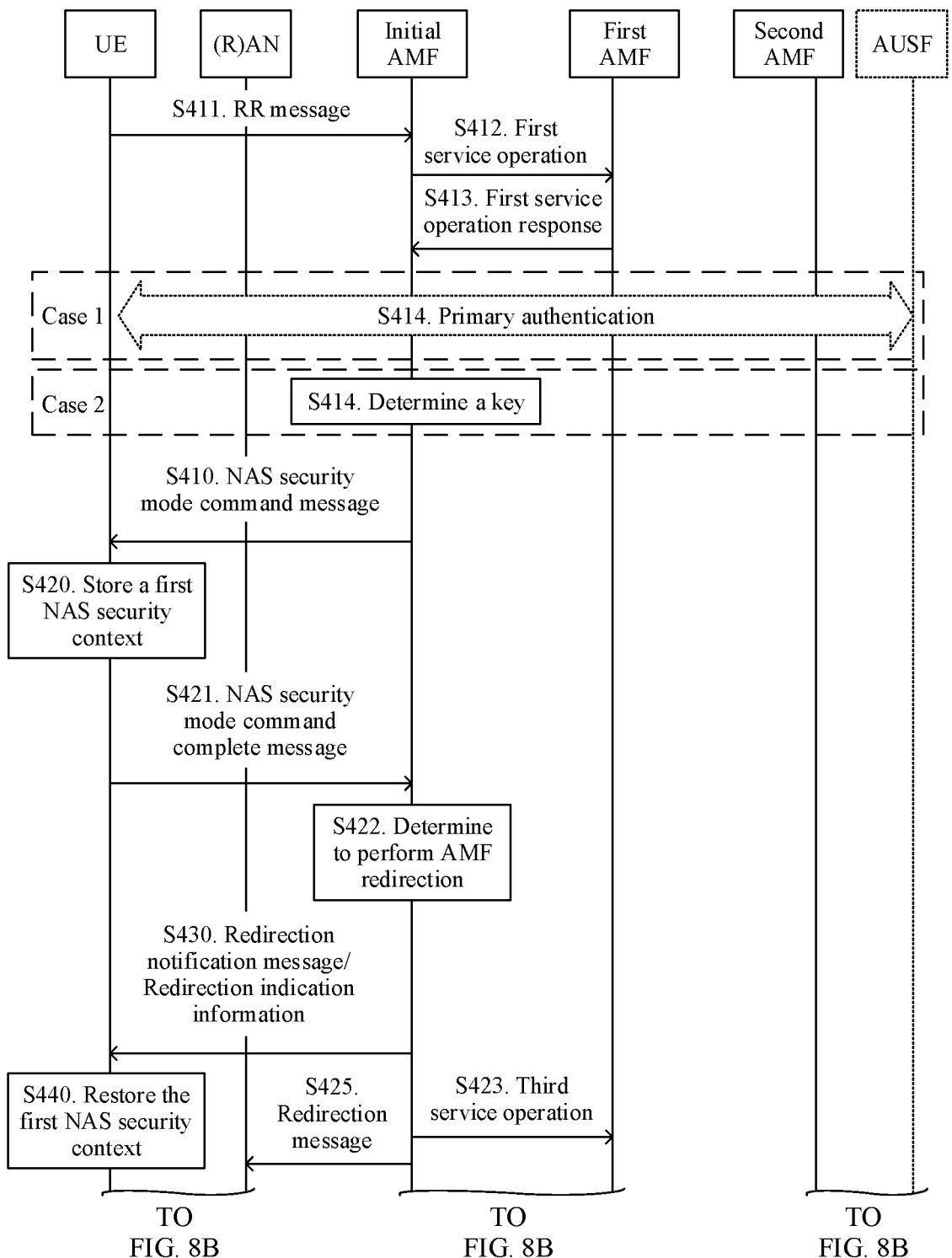
FIG. 8A and FIG. 8B are another schematic flowchart of a method for mobility registration according to an embodiment of this application.
Figure 8B:
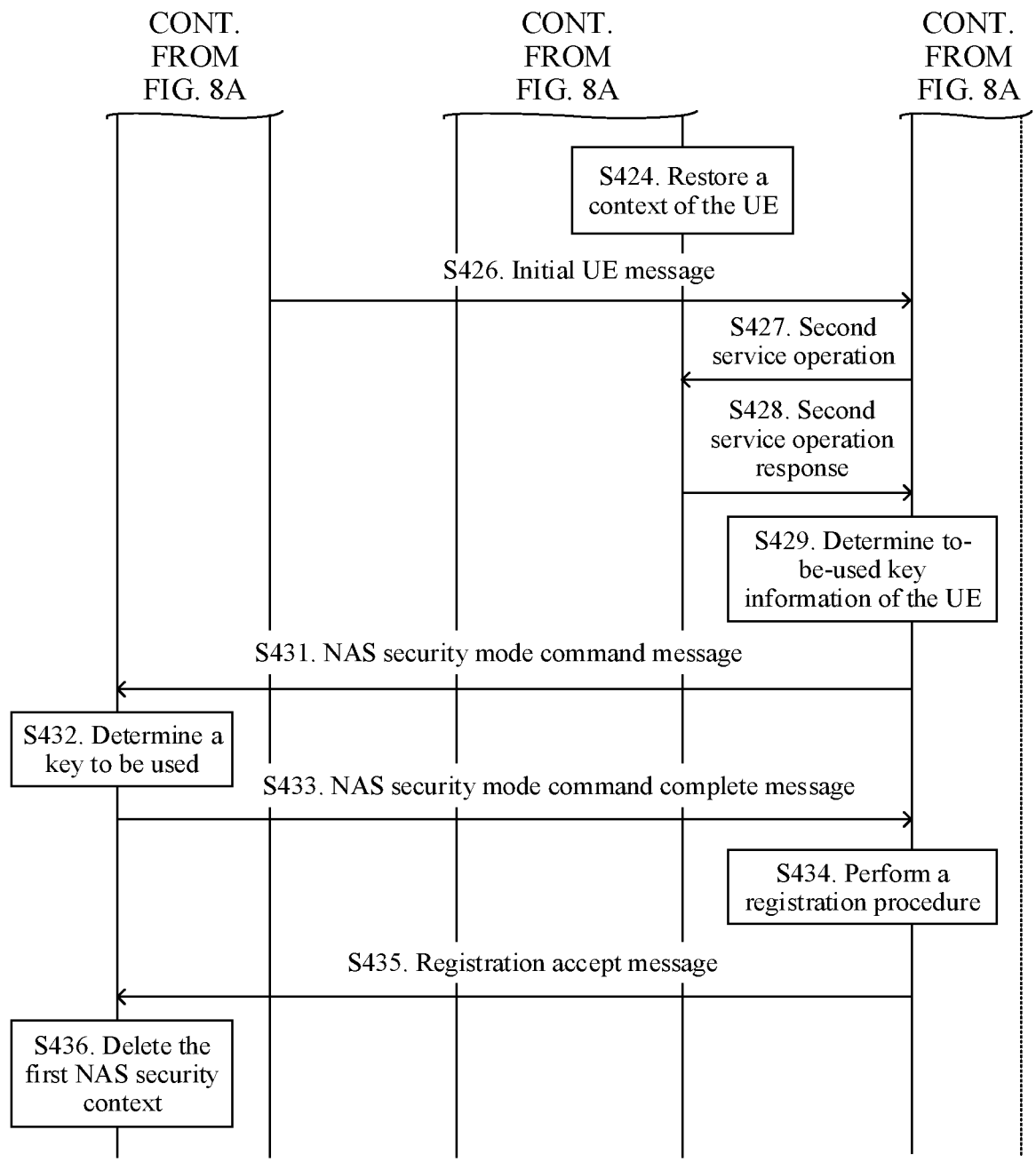

This application further provides another method for registration. With reference to FIG. 8A and FIG. 8B, the following describes in detail another method for registration provided in an embodiment of this application. FIG. 8A and FIG. 8B are another schematic flowchart of a method for a registration procedure in which redirection occurs according to an embodiment of this application. In the figure, UE, a (R)AN, an initial AMF, a first AMF, a second AMF, an AUSF, and S410 to S460 are included. A security context is created by the UE and the first AMF that serves the UE last time. AMF keys used by the UE and the first AMF are denoted as Kamf, and a corresponding key identifier of the AMF key is ngKSI. The following describes S410 to S460 in detail from a perspective of signaling interaction.

S410. The UE receives a NAS SMC message sent by the initial AMF. Further, the NAS SMC message carries an indication for requesting a complete initial NAS message, and the NAS SMC message sent by the initial AMF to the UE may be referred to as a first NAS SMC message. Alternatively, the NAS SMC message may not carry an indication for requesting a complete initial NAS message.

It should be noted that, different from the NAS SMC message sent by the initial AMF to the UE shown in FIG. 2 and FIG. 3, the NAS SMC message in the embodiment shown in FIG. 8A and FIG. 8B may carry a fourth indication. The fourth indication is used to indicate the UE to store the NAS security context created by the UE and the first AMF, and further, is used to indicate the UE to store a NAS security context created after the UE sends a registration request message or is used to indicate the UE to store a NAS security context created before the UE sends the registration request message. The first NAS security context includes at least an AMF key Kamf created by the UE and the first AMF, and may further include a key identifier ngKSI and NAS counts. For ease of description, the NAS security context created by the UE and the first AMF is referred to as a first NAS security context for short below.

Further, in the embodiment shown in FIG. 8A and FIG. 8B, after receiving the NAS SMC message sent by the initial AMF, the UE performs a storage action to store the first NAS security context, instead of directly updating information about a local AMF key. That is, different from the foregoing method, in the method embodiment shown in FIG. 8A and FIG. 8B, the UE performs S420 of storing the first NAS security context.

Further, the UE may store the first NAS security context in the following two possible manners:

Manner 1:

The UE receives the NAS SMC message sent by the initial AMF, and performs, based on the NAS SMC message, S420 of storing the first NAS security context. Then, the UE processes the NAS SMC message according to an existing standard definition, to update the key.

It should be understood that, after the UE receives the NAS SMC message sent by the initial AMF, the UE needs to store an old NAS security context, that is, the first NAS security context, if any, created by the UE and the first AMF.

Manner 2:

The UE receives the NAS SMC message sent by the initial AMF, where the NAS SMC message carries the fourth indication, and the fourth indication is used to indicate the UE to store information about the first NAS security context. The UE first stores the first NAS security context based on the fourth indication, and then the UE processes the NAS SMC message according to an existing standard definition, to update the key.

It should be understood that, after the UE receives the NAS SMC message that is sent by the initial AMF and that carries the fourth indication, the UE needs to store, based on the fourth indication, the old NAS security context, that is, the first NAS security context, created by the UE and the first AMF.

That is, in the embodiment shown in FIG. 8A and FIG. 8B, in a possible implementation, the UE stores the first NAS security context based on the NAS SMC message received from the initial AMF. In another possible implementation, the NAS SMC message includes the fourth indication, and the UE stores the first NAS security context based on the fourth indication. To be specific, in a first possible implementation, the NAS SMC message has a function of indicating the UE to store the information about the first NAS security context. In a second possible implementation, a function of the NAS SMC message is the same as that specified in an existing protocol, and only the fourth indication newly added to the NAS SMC message has a function of indicating the UE to store the first NAS security context. The UE stores the first NAS security context based on either of the foregoing possible implementations, and this is not limited in this application.

It should be understood that, similar to the method procedures shown in FIG. 2 and FIG. 3, the NAS SMC message received by the UE from the initial AMF in the embodiment shown in FIG. 8A and FIG. 8B may also be used by the initial AMF and the UE to negotiate about an AMF key to be used. Further, in the embodiment shown in FIG. 8A and FIG. 8B, that the UE updates the key Kamf based on the NAS SMC message includes the following three cases:

Case 1:

The UE updates, based on the NAS SMC message, Kamf to Kamf_new that is activated and used by the initial AMF after primary authentication.

Further, when the UE receives and processes the NAS SMC message, after integrity protection verification succeeds, the UE determines that an updated key of the UE and a corresponding identifier are Kamf_new and ngKSI_new, where Kamf_new and ngKSI_new may be referred to as first new key information. In this case, before updating, the UE stores the first AMF key and a corresponding identifier, that is, Kamf and ngKSI that are created by the UE and the first AMF.

Case 2:

The UE updates, based on the NAS SMC message, Kamf to a key Kamf' received by the initial AMF from the first AMF.

Further, when the UE receives and processes the NAS SMC message, after integrity protection verification succeeds, the UE determines that an updated key of the UE is Kamf', where Kamf' and a key identifier ngKSI corresponding to Kamf' may be referred to as second new key information. In this case, before updating, the UE stores the first AMF key and a corresponding key identifier, that is, stores Kamf and ngKSI that are created by the UE and the first AMF.

Case 3:

The key received by the initial AMF from the first AMF is Kamf. When the initial AMF determines to use Kamf, and a security algorithm selected by the initial AMF is different from a security algorithm selected by the first AMF, the initial AMF sends a NAS SMC to the UE, updates the security algorithm, and activates and uses Kamf. When receiving the NAS SMC message, the UE stores the first AMF key and the corresponding identifier ngKSI.

It should be understood that signaling different from that in the procedures shown in FIG. 2 and FIG. 3 is mainly described in detail in the embodiment shown in FIG. 8A and FIG. 8B, and signaling similar to that in the procedures shown in FIG. 2 and FIG. 3 is simply described. For example, the method shown in FIG. 8A and FIG. 8B needs to further include the following steps.

S411. The UE sends an RR message to the initial AMF, where the RR message carries a 5G-GUTI of the UE.

S412. The initial AMF invokes a first service operation from the first AMF. Further, after receiving the RR message sent by the UE, the initial AMF determines, based on the 5G-GUTI in the RR message, the first AMF that serves the UE last time, and invokes the first service operation from the AMF. The first service operation may be referred to as Namf_Communication_UEContextTransfer, and is used to request a context of the UE from the first AMF.

S413. The first AMF sends a first service operation response to the initial AMF. Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransferResponse.

Corresponding to the case 1 in S420, the first service operation response includes Kamf or Kamf'.

Corresponding to the case 2 in S420, the first service operation response includes Kamf'.

Corresponding to the case 3 in S420, the first service operation response includes Kamf.

S414. Corresponding to the case 1 in S420, the initial AMF initiates a primary authentication procedure, and the initial AMF and the UE separately generate Kamf_new and ngKSI_new corresponding to Kamf_new, corresponding to the case 2 in S420, the initial AMF determines to use Kamf', or corresponding to the case 3 in S420, the initial AMF determines to use Kamf.

After S414 is performed, the initial AMF needs to send the NAS SMC message to the user equipment, that is, perform S410 of sending the NAS SMC message to the user equipment by the initial AMF.

S421. The UE sends a NAS security mode command complete message to the initial AMF. Further, the NAS security mode command complete message may carry a complete registration request message. Further, a difference between the complete registration request message in this application and the registration request message in S411 lies in that information carried in the complete registration request message is cleartext and is not encrypted, while some information is cleartext and some information is encrypted in the registration request message in S411.

Corresponding to the case 1 in S420, the UE stores the first NAS security context including Kamf, ngKSI, NAS counts, and the like, and activates and starts using Kamf_new and ngKSI_new.

Corresponding to the case 2 in S420, the UE stores the first NAS security context including Kamf, ngKSI, NAS counts, and the like, and activates and starts using Kamf' and ngKSI.

Corresponding to the case 3 in S420, the UE stores the first NAS security context including Kamf, ngKSI, NAS counts, and the like, and activates and starts using Kamf and ngKSI.

S422. The initial AMF determines, based on requested NSSAIs carried in the complete registration request message in the security mode command complete message sent by the UE or requested NSSAIs obtained after the initial AMF decrypts the registration request message by using a result, to perform AMF redirection. In other words, the initial AMF determines to perform NAS reroute.

Further, in this embodiment of this application, a reason why the initial AMF determines to perform AMF redirection is not limited, and may be any reason for triggering AMF redirection specified in an existing protocol. For example, when the initial AMF cannot server a network slice of the UE, the initial AMF determines to perform AMF redirection, to select the second AMF that can serve the UE. An existing protocol defines the following two manners for implementation of redirection, and the initial AMF may select either of the following manners:

Manner 1: If a connection can be established between the initial AMF and the second AMF, the initial AMF invokes an Namf_Communication_N1 Message Notify service operation from the second AMF.

Manner 2: If there is no connection between the initial AMF and the second AMF (where a possible cause is that the initial AMF and the second AMF belong to different network slices, and interworking between the initial AMF and the second AMF is not allowed), the initial AMF sends the received registration request of the UE to the second AMF by using the (R)AN.

The foregoing manner 2 is considered in the registration procedure shown in FIG. 8A and FIG. 8B.

It should be noted that, different from the procedures shown in FIG. 2 and FIG. 3, in the method procedure shown in FIG. 8A and FIG. 8B, after determining to perform AMF redirection, the initial AMF notifies the UE that the AMF redirection is performed on a network side, that is, performs S430: The initial AMF notifies the UE that the redirection occurs. In S430, the initial AMF sends a third indication to the UE, to notify the UE that the AMF redirection occurs, indicate the UE to use the first NAS security context, indicate the UE to resume using the first NAS security context created by the UE and the first AMF, indicate the UE to use the old NAS security context created by the UE and the first AMF, indicate the UE to use the first NAS security context as a current NAS security context, indicate the UE to use the old security context created by the UE and the first AMF as the current NAS security context, indicate the UE to discard a new NAS security context created by the UE and the initial AMF, and/or indicate the UE to discard the current NAS security context created by the UE and the initial AMF.

In the embodiment shown in FIG. 8A and FIG. 8B, that the initial AMF notifies the UE that the redirection occurs, that is, S430, includes the following two possible manners:

Manner 1: After determining to perform AMF redirection via the (R)AN, the initial AMF sends an eighth NAS message, or referred to as a redirection notification message, to the UE, where the eighth NAS message, or referred to as the redirection notification message, is used to notify the UE that the AMF redirection occurs, indicate the UE to use the first NAS security context, indicate the UE to resume using the first NAS security context created by the UE and the first AMF, indicate the UE to use the old NAS security context created by the UE and the first AMF, indicate the UE to use the first NAS security context as the current NAS security context, indicate the UE to use the old security context created by the UE and the first AMF as the current NAS security context, indicate the UE to discard the new NAS security context created by the UE and the initial AMF, and/or indicate the UE to discard the current NAS security context created by the UE and the initial AMF. The redirection notification message may be referred to as NAS Reallocation Notification.

Manner 2: After determining to perform AMF redirection via the (R)AN, the initial AMF sends a NAS message to the UE, where the AMF message carries an eighth indication, or referred to as redirection indication information, and the eighth indication, or referred to as the redirection indication information, is used to notify the UE that the AMF redirection occurs, indicate the UE to use the first NAS security context, indicate the UE to resume using the first NAS security context created by the UE and the first AMF, indicate the UE to use the old NAS security context created by the UE and the first AMF, indicate the UE to use the first NAS security context as the current NAS security context, indicate the UE to use the old security context created by the UE and the first AMF as the current NAS security context, indicate the UE to discard the new NAS security context created by the UE and the initial AMF, and/or indicate the UE to discard the current NAS security context created by the UE and the initial AMF. For example, an existing NAS message carrying the eighth indication (or referred to as the redirection indication information) is not limited in this embodiment of this application. Possible options of the NAS message include a configuration update command message, a downlink NAS transport message, a 5GMM status message, a registration reject message, and the like. Examples of other NAS messages are not provided for description herein one by one.

It should be understood that, when the initial AMF reuses the existing NAS message, and an IE is added to the existing NAS message to notify the UE that the AMF redirection occurs on the network side, a function of processing the existing NAS message to which the IE is added needs to be granted to the UE side, so that the UE can correctly learn that the NAS message carries the eighth indication, or referred to as the redirection indication information, and determine that the AMF redirection occurs on the network side.

S440. The UE restores the first NAS security context.

Further, after receiving, the eighth NAS message, or referred to as the redirection notification message, or the NAS message carrying the eighth indication in S430, the UE uses the first NAS security context stored in S410.

It should be understood that, based on the eighth NAS message that is also referred to as the redirection notification message, or based on the NAS message that carries the eighth indication, the UE uses the first NAS security context, resumes using the first NAS security context created by the UE and the first AMF, uses the old NAS security context created by the UE and the first AMF, uses the first NAS security context as the current NAS security context, uses the old security context created by the UE and the first AMF as the current NAS security context, discards the new NAS security context created by the UE and the initial AMF, and/or discards the current NAS security context created by the UE and the initial AMF.

It should be understood that if the UE does not have a NAS security context when receiving the security mode command message sent by the initial AMF, after receiving the eighth NAS message or the NAS message carrying the eighth indication, the UE needs to discard the new NAS security context, and restore to a state of having no NAS security context. The new NAS security context is a NAS security context created by the UE and the initial AMF by using a security mode control procedure.

After the initial AMF notifies the UE that the AMF redirection occurs on the network side, the initial AMF continues with the AMF redirection procedure, for example, performs S423: The initial AMF invokes a third service operation from the first AMF. The third service operation indicates a registration failure of the UE with the initial AMF.

It should be noted that, different from the conventional technology, in the embodiment shown in FIG. 8A and FIG. 8B, the third service operation may carry a cause value, and the cause value is used to indicate that the UE fails to be registered with the initial AMF because the AMF redirection occurs. That is, in the embodiment shown in FIG. 8A and FIG. 8B, the first AMF can learn, based on the third service operation, that the UE fails to be registered with the initial AMF and that the UE fails to be registered with the initial AMF because the AMF redirection occurs.

Further, the third service operation may be referred to as Namf_Communication_RegistrationStatusUpdate, and a registration status of the UE carried in the third service operation is "NOT_TRANSFERRED". The cause value may be referred to as AMF_Reallocation_Ind.

S424. After the first AMF receives the invocation for the third service operation, according to an existing standard definition, the first AMF restores a context of the UE on the first AMF as if the first AMF does not receive the invocation for the first service operation in S412.

In a possible implementation, if the invocation for the third service operation carries a cause value, the first AMF stores the cause value.

S425. The initial AMF sends a redirection message to the (R)AN. The message is referred to as a NAS reroute message. The RR message received from the UE is carried in the NAS reroute message and sent to the (R)AN.

S426. The (R)AN sends an initial UE message to the second AMF, where the initial UE message carries the foregoing RR message.

Optionally, S425 and S426 may alternatively be as follows:

S425. The initial AMF sends a redirection message to the (R)AN. The message may be referred to as a NAS reroute message.

Different from the NAS reroute message shown in FIG. 2 and FIG. 3, the NAS reroute message does not carry the RR message received from the UE, but carries the complete registration request message shown in S421.

S426. The (R)AN sends an initial UE message to the second AMF, where the initial UE message carries the complete registration request message. The complete registration request message is used to indicate that the AMF redirection occurs on a network side, and the second AMF is selected to serve the UE.

Further, if the initial UE message sent by the (R)AN to the second AMF in S426 carries the complete registration request message, the second AMF does not need to request the complete registration request message from the UE, and the second AMF can determine, based on the complete registration request message, that the AMF redirection occurs on the network side, and that the second AMF can serve the UE. In addition, the second AMF does not need to perform the step of whether to perform AMF redirection again.

S427. The second AMF invokes a second service operation from the first AMF. The second service operation is an Namf_Communication_UEContextTransfer request message.

S428. The first AMF sends a second service operation response to the second AMF. Further, the first AMF sends the second service operation response to the initial AMF after successfully authenticating the UE. Authentication of the UE by the first AMF means verification of integrity protection for the registration request message. The second service operation response is Namf_Communication_UEContextTransfer Response, and the second service operation response includes Kamf or Kamf'.

S429. The second AMF determines to-be-used key information of the UE.

Further, the second AMF determines to use Kamf or Kamf' sent by the first AMF.

S431. The second AMF sends a NAS SMC message to the UE.

The NAS SMC message sent by the second AMF to the UE may be referred to as a second NAS SMC message.

S432. The UE determines the key to be used.

The UE processes the NAS SMC message according to an existing standard definition.

For example, if the second AMF determines to use Kamf sent by the first AMF, and the NAS SMC message sent by the second AMF to the UE does not carry K_AMF_change_flag whose value is 1, the UE processes the NAS SMC message according to the existing standard definition, and determines that the key to be used is Kamf, if the second AMF determines to use Kamf' sent by the first AMF, and the NAS SMC message sent by the second AMF to the UE carries K_AMF_change_flag whose value is 1, the UE processes the NAS SMC message according to the existing standard definition, performs key derivation on Kamf, and determines that the key to be used is Kamf'.

After the UE successfully processes the NAS SMC message according to the existing standard definition, the UE sends a NAS security mode command complete message to the second AMF. That is, the method procedure shown in 8 further includes S433.

S434. The second AMF performs a registration procedure.

Further, the second AMF continues to perform a next procedure. After accepting the registration of the UE, the second AMF performs S435: The second AMF sends a registration accept message to the UE.

S436. The UE deletes the first NAS security context.

Further, after the UE receives the registration accept message sent by the second AMF, if the UE stores the first NAS security context in the registration procedure in which the AMF redirection occurs, the UE deletes the first NAS security context stored in the registration procedure in which the AMF redirection occurs.

In the method procedure shown in FIG. 8A and FIG. 8B, the key obtained by the second AMF from the first AMF is Kamf, or Kamf' that is obtained by performing key derivation on Kamf. After receiving the eighth NAS message, for example, the redirection notification message, or the NAS message that carries the eighth indication (or referred to as the redirection indication information), sent by the initial AMF, the UE restores the stored first NAS security context.

In the method procedure shown in FIG. 8A and FIG. 8B, the UE stores the first NAS security context (including at least the key Kamf and the corresponding key identifier ngKSI) between the UE and the first AMF, and the initial AMF sends a NAS SMC message, for example, the redirection notification message or the redirection indication information, to indicate the UE whether to resume using the first NAS security context, so that the keys on the UE and the second AMF are consistent.

It should be understood that sequence numbers of the foregoing processes do not mean an execution sequence in the foregoing method embodiments. The execution sequence of the processes should be determined based on functions and internal logic of the processes, and should not be construed as any limitation on the implementation processes of the embodiments of this application.

In the method procedure shown in FIG. 8A and FIG. 8B, the initial AMF may initiate S430 at any time after the initial AMF determines to perform AMF redirection via the (radio) access network ((R)AN) and before the initial AMF sends the NAS reroute message to the (R)AN.

In FIG. 8A and FIG. 8B, the UE stores the first NAS security context based on the NAS SMC message sent by the initial AMF or the fourth indication carried in the NAS SMC message. Another possible implementation used by the UE to store the first security context is as follows.

S411. After sending the RR message, the UE stores the current security context, that is, the first security context.

Figure 9:
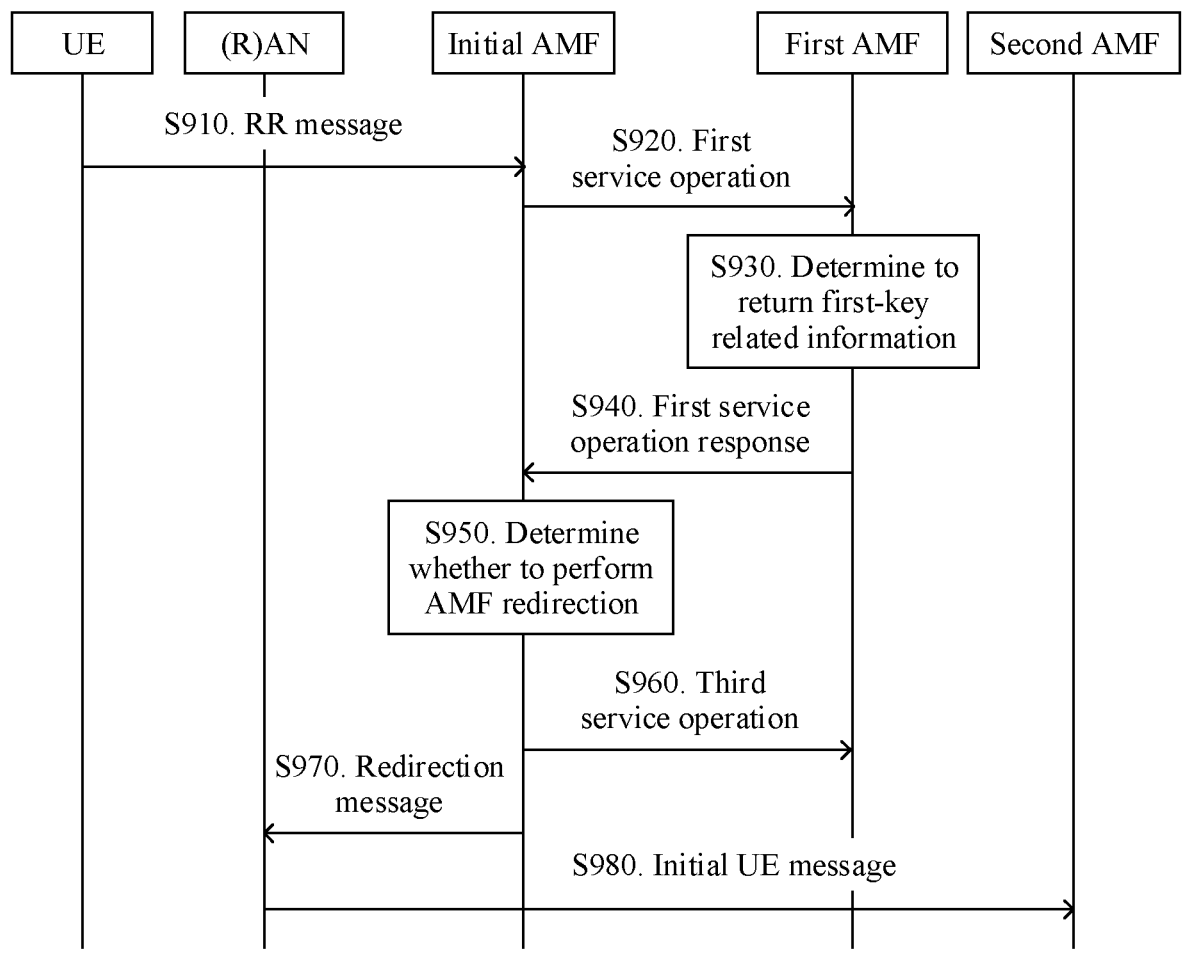
FIG. 9 is still another schematic flowchart of a method for mobility registration according to an embodiment of this application.

FIG. 9 is still another schematic flowchart of a method for a registration procedure in which AMF redirection occurs according to an embodiment of this application. Execution bodies include UE, a (R)AN, an initial AMF, a first AMF, and a second AMF. A security context is created by the UE and the first AMF that serves the UE last time, and the UE and the first AMF store a same AMF key, which is denoted as Kamf.

The method for the registration procedure in which the AMF redirection occurs includes the following steps.

S910. The UE sends an RR message to the initial AMF, where the RR message carries a 5G-GUTI of the UE.

It should be understood that in this embodiment of this application, that the UE sends the RR message to the initial AMF means that the UE sends the RR message to the (R)AN, and then the (R)AN sends the RR message to the initial AMF. Because the (R)AN can perform transparent transmission, in this step, for brevity of description, that the UE sends the RR message to the initial AMF is directly described in this embodiment of this application and the accompanying drawing.

Optionally, the RR message needs to carry sixth indication information, where the sixth indication information is used to indicate at least one of the following. The UE is UE in release 16 or a release later than release 16, the UE is not UE in release 15, the UE has a function of UE in release 16 or a release later than release 16, the UE has a capability of performing NAS redirection via the (R)AN, the UE has a capability of performing AMF redirection via the (R)AN, the UE has a NAS security context rollback capability, the UE has a capability of using a first NAS security context, the UE has a capability of restoring to a state of having no NAS security context, or the UE has a NAS security context processing capability.

In this application, the sixth indication information may further be used to indicate that the UE can process or accept an authentication request message without security protection, indicate that the UE can process or accept an authentication request message without security protection after NAS security activation, indicate that the UE can process or accept an authentication request message without security protection after performing secure NAS message exchange with the AMF, and/or indicate that the UE has a capability of resume using a stored NAS security context.

It should be understood that a specific form of the sixth indication information is not limited in this embodiment of this application.

It should be further understood that, in the embodiments shown in FIG. 4A to FIG. 8B, the RR message sent by the UE to the initial AMF needs to optionally carry the sixth indication information.

S920. The initial AMF invokes a first service operation from the first AMF.

Further, after receiving the RR message sent by the UE, the initial AMF determines, based on the 5G-GUTI in the RR message, the first AMF that serves the UE last time, and invokes the first service operation from the first AMF. The first service operation may be referred to as Namf_Communication_UEContextTransfer, and is used to request a context of the UE from the first AMF. The context of the UE includes the security context of the UE, and the security context of the UE includes a first key created by the UE and the first AMF and a first key identifier corresponding to the first key.

In a possible implementation, the initial AMF needs to include seventh indication information in the first service operation if the initial AMF does not receive the sixth indication information. Alternatively, the initial AMF needs to include the seventh indication information in the first service operation if the initial AMF determines at least one of the following based on the RR message. The UE is UE in release 15, the UE is not UE in release 16 or the release later than release 16, the UE does not have the function of the UE in release 16 or the release later than release 16, the UE does not have the capability of performing NAS redirection via the (R)AN, the UE does not have the capability of performing AMF redirection via the (R)AN, the UE does not have the NAS security context rollback capability, the UE does not have the capability of using the first NAS security context, the UE does not have the capability of restoring to the state of having no NAS security context, or the UE does not have the NAS security context processing capability. Alternatively, the initial AMF needs to include the seventh indication information in the first service operation. (For example, the initial AMF directly determines that the seventh indication information needs to be carried in the first service operation without determining whether the UE is the UE in release 15 or determining whether the sixth indication information is received.)

The seventh indication information is used to indicate at least one of the following: indicate the first AMF to send the first key and the first key identifier to the initial AMF, indicate that the first AMF does not need to perform key derivation on the first key, indicate the first AMF to return the first key, indicate the first AMF to return a key that has not undergone key derivation, indicate the first AMF to return an old key, or indicate the first AMF not to perform key derivation.

It should be understood that a specific form of the seventh indication information is not limited in this embodiment of this application.

It should be further understood that the key derivation in this embodiment of this application may be replaced with "horizontal Kamf derivation".

In another possible implementation, if the initial AMF receives the sixth indication information, the initial AMF determines that the UE is the UE in release 16 or the release later than release 16, that the UE has the function of the UE in release 16 or the release later than release 16, that the UE has the capability of performing NAS redirection via the (R)AN, that the UE has the capability of performing AMF redirection via the (R)AN, that the UE has the NAS security context rollback capability, that the UE has the capability of using the first NAS security context, that the UE has the capability of restoring to the state of having no NAS security context, or that the UE has the NAS security context processing capability. Alternatively, the initial AMF determines at least one of the following based on the RR message. The UE is not the UE in release 15, the UE is not the UE in release 16 or the release later than release 16, the UE does not have the function of the UE in release 16 or the release later than release 16, the UE does not have the capability of performing NAS redirection via the (R)AN, the UE does not have the capability of performing AMF redirection via the (R)AN, the UE does not have the NAS security context rollback capability, the UE does not have the capability of using the first NAS security context, the UE does not have the capability of restoring to the state of having no NAS security context, or the UE does not have the NAS security context processing capability. In this possible implementation, the initial AMF needs to perform steps performed by the initial AMF in the embodiment shown in FIG. 4A and FIG. 4B, FIG. 6A and FIG. 6B, FIG. 7A and FIG. 7B, or FIG. 8A and FIG. 8B. Details are not described herein again.

S930. The initial AMF determines whether to perform key derivation.

In a possible implementation, if the first AMF receives the seventh indication information, the first AMF performs at least one of the following possible steps.

The first AMF needs to return the first key and the first key identifier, the first AMF determines not to perform key derivation on the first key, the first AMF determines to return the first key, the first AMF determines to return the key that has not undergone key derivation, the first AMF determines to return the old key, or the first AMF determines not to perform key derivation. The first key and the first key identifier are referred to as first-key related information for short.

In another possible implementation, if the first AMF does not receive the seventh indication information, the first AMF needs to determine, based on a local policy of the first AMF, whether to perform key derivation.

S940. The first AMF sends a first service operation response to the initial AMF.

Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransfer Response. Further, if the first AMF receives the seventh indication, the first service operation response needs to include at least one of the key that has not undergone key derivation, the old key, the first key, or the first key and the first key identifier.

S950. The initial AMF determines whether to perform AMF redirection.

The initial AMF determines whether to perform NAS reroute via the (R)AN or whether to perform AMF redirection via the (R)AN.

In a possible implementation, the initial AMF determines to perform NAS reroute via the (R)AN or AMF redirection via the (R)AN. The initial AMF does not receive the sixth indication information, or the initial AMF determines at least one of the following based on the RR message. The UE is the UE in release 15, the UE is not the UE in release 16 or the release later than release 16, the UE does not have the function of the UE in release 16 or the release later than release 16, the UE does not have the capability of performing NAS redirection via the (R)AN, the UE does not have the capability of performing AMF redirection via the (R)AN, the UE does not have the NAS security context rollback capability, the UE does not have the capability of using the first NAS security context, the UE does not have the capability of restoring to the state of having no NAS security context, or the UE does not have the NAS security context processing capability.

In this case, the initial AMF needs to skip at least one of the following operations a primary authentication procedure, a procedure of creating a new NAS security context with the UE, a procedure of updating the NAS security context of the UE, a procedure of signaling exchange with the UE, a NAS security mode command procedure, or security algorithm selection.

Further, the initial AMF needs to invoke a third service operation provided by the first AMF, to notify the first AMF that the UE fails to be registered with the initial AMF, or that the initial AMF performs NAS reroute via the (R)AN or performs AMF redirection via the (R)AN.

S960. The initial AMF invokes the third service operation from the first AMF. The third service operation indicates a registration failure of the UE with the initial AMF.

Further, the third service operation may be referred to as Namf_Communication_RegistrationStatusUpdate, and a registration status of the UE carried in the third service operation is "NOT_TRANSFERRED".

S970. The initial AMF sends a redirection message to the (R)AN. The message may be referred to as a NAS reroute message. The RR message received from the UE in S910 is carried in the NAS reroute message and sent to the (R)AN. Alternatively, when the initial AMF obtains a complete registration request message in S950, the initial AMF needs to include the complete registration request message in the NAS reroute message and send the NAS reroute message to the (R)AN.

S980. The (R)AN sends an initial UE message to the second AMF, where the initial UE message carries the RR message obtained in S970 or the complete registration request message.

Further, after obtaining the RR message or the complete registration request message, the second AMF may perform a UE registration procedure according to a specification in a current protocol.

In the method procedure shown in FIG. 9, after the initial AMF determines to perform NAS reroute via the (R)AN, the NAS security context of the UE is not updated. The NAS security context on the UE is the first NAS security context. In addition, after the second AMF receives the registration request message forwarded by using the (R)AN, a NAS security context obtained by the second AMF from the first AMF is also the first NAS security context. The NAS security contexts on the UE and the second AMF are consistent, avoiding a registration failure caused by inconsistent NAS security contexts.

Figure 10:
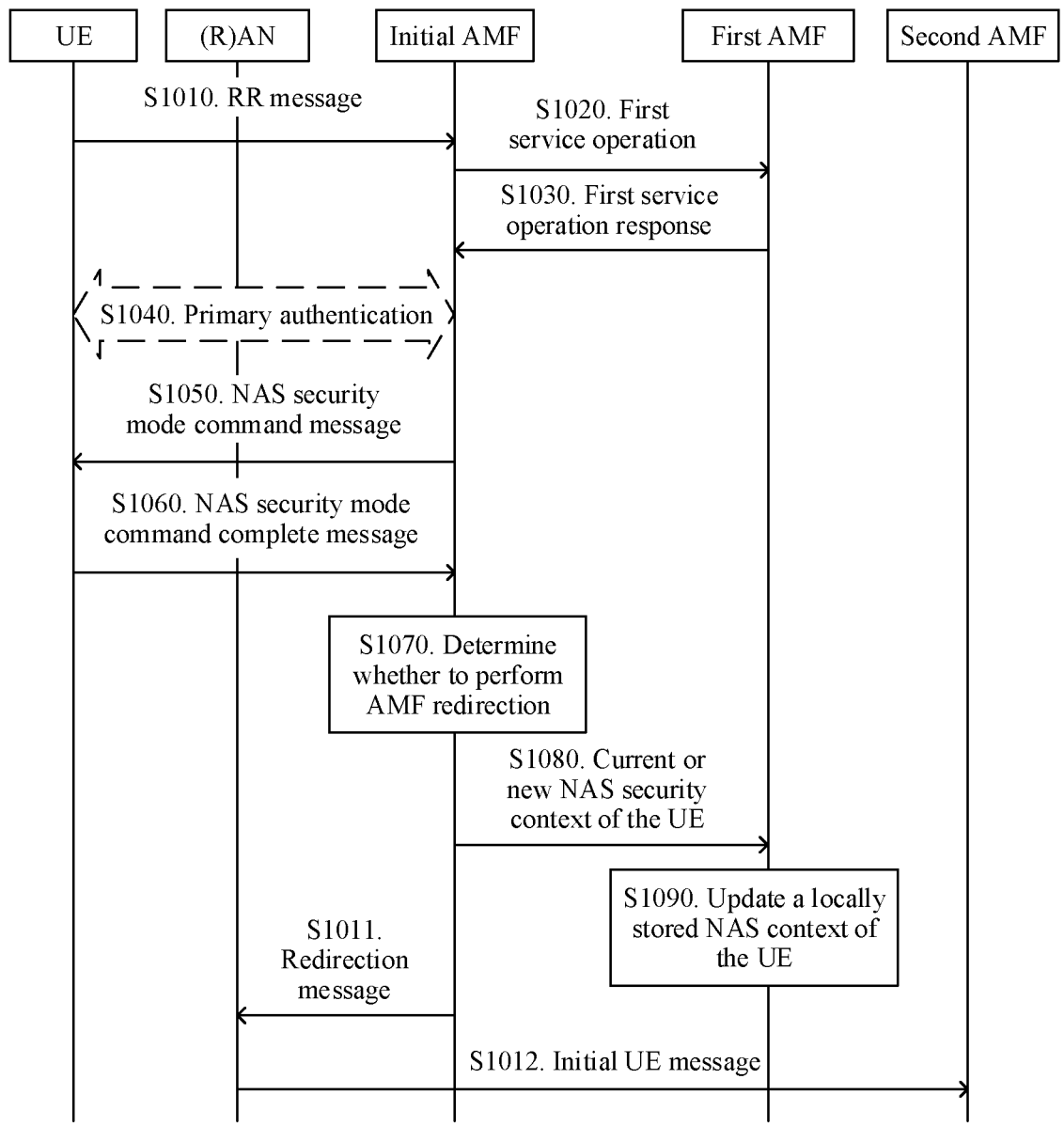
FIG. 10 is still another schematic flowchart of a method for mobility registration according to an embodiment of this application.

FIG. 10 is still another schematic flowchart of a method for a registration procedure in which AMF redirection occurs according to an embodiment of this application. Execution bodies include UE, a (R)AN, an initial AMF, a first AMF, and a second AMF. A security context is created by the UE and the first AMF that serves the UE last time, and the UE and the first AMF store a same AMF key, which is denoted as Kamf.

The method for the registration procedure in which the AMF redirection occurs includes the following steps.

S1010. The UE sends an RR message to the initial AMF, where the RR message carries a 5G-GUTI of the UE.

It should be understood that in this embodiment of this application, that the UE sends the RR message to the initial AMF means that the UE sends the RR message to the (R)AN, and then the (R)AN sends the RR message to the initial AMF. Because the (R)AN can perform transparent transmission, in this step, for brevity of description, that the UE sends the RR message to the initial AMF is directly described in this embodiment of this application and the accompanying drawing.

S1020. The initial AMF invokes a first service operation from the first AMF.

Further, after receiving the RR message sent by the UE, the initial AMF determines, based on the 5G-GUTI in the RR message, the first AMF that serves the UE last time, and invokes the first service operation from the first AMF. The first service operation may be referred to as Namf_Communication_UEContextTransfer, and is used to request a context of the UE from the first AMF. The context of the UE includes the security context of the UE.

Optionally, before performing S1020, the initial AMF determines that the RR message does not carry the sixth indication information shown in FIG. 9.

S1030. The first AMF sends a first service operation response to the initial AMF.

Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransfer Response.

S1040. The initial AMF may initiate a primary authentication procedure.

According to a local policy, the initial AMF does not use a key obtained from the first AMF, but initiates a primary authentication procedure to generate a new AMF key Kamf_new and a new key identifier ngKSI_new.

S1050. The initial AMF sends a NAS SMC message to the UE. Further, the NAS SMC message carries an indication for requesting a complete initial NAS message. The initial AMF activates and starts using a new NAS security context.

S1060. The UE sends a NAS security mode command complete message to the initial AMF. The UE includes the complete initial NAS message in the NAS security mode complete message based on the indication for requesting the complete initial NAS message in the NAS SMC message. In the embodiments of this application, the complete initial NAS message mainly refers to the complete registration request message. The UE activates and starts using a new NAS security context.

S1070. The initial AMF determines whether to perform AMF redirection.

The initial AMF determines whether to perform NAS reroute via the (R)AN or whether to perform AMF redirection via the (R)AN. If the initial AMF determines to perform NAS reroute via the (R)AN or AMF redirection via the (R)AN:

In a possible implementation, the initial AMF does not receive the sixth indication information, or the initial AMF determines at least one of the following based on the RR message: The UE is UE in release 15, the UE is not UE in release 16 or a release later than release 16, the UE does not have a function of UE in release 16 or the release later than release 16, the UE does not have a capability of performing NAS redirection via the (R)AN, the UE does not have a capability of performing AMF redirection via the (R)AN, the UE does not have a NAS security context rollback capability, the UE does not have a capability of using the first NAS security context, the UE does not have a capability of restoring to a state of having no NAS security context, or the UE does not have a NAS security context processing capability. In this case, the initial AMF sends the current NAS security context of the UE to the first AMF after determining that NAS reroute using the (R)AN needs to be performed and before NAS reroute using the (R)AN is performed.

In another possible implementation, the initial AMF receives the sixth indication information, or the initial AMF determines at least one of the following based on the RR message. The UE is not UE in release 15, the UE is not UE in release 16 or a release later than release 16, the UE does not have a function of UE in release 16 or the release later than release 16, the UE does not have a capability of performing NAS redirection via the (R)AN, the UE does not have a capability of performing AMF redirection via the (R)AN, the UE does not have a NAS security context rollback capability, the UE does not have a capability of using the first NAS security context, the UE does not have a capability of restoring to a state of having no NAS security context, or the UE does not have a NAS security context processing capability. In this case, the initial AMF needs to perform steps performed by the initial AMF in the embodiment shown in FIG. 4A and FIG. 4B, FIG. 6A and FIG. 6B, FIG. 7A and FIG. 7B, or FIG. 8A and FIG. 8B. Details are not described herein again.

In still another possible implementation, a new NAS security context is created by the initial AMF and the UE, and the initial AMF does not receive the sixth indication information, or the initial AMF determines at least one of the following based on the RR message. The UE is UE in release 15, the UE is not UE in release 16 or a release later than release 16, the UE does not have a function of UE in release 16 or the release later than release 16, the UE does not have the capability of performing NAS redirection via the (R)AN, the UE does not have a capability of performing AMF redirection via the (R)AN, the UE does not have a NAS security context rollback capability, the UE does not have a capability of using the first NAS security context, the UE does not have a capability of restoring to a state of having no NAS security context, or the UE does not have a NAS security context processing capability. In this case, after determining that NAS reroute using the (R)AN needs to be performed and before NAS reroute using the (R)AN is performed, the initial AMF sends the current NAS security context of the UE to the first AMF. Otherwise, the initial AMF needs to perform steps performed by the initial AMF in the embodiment shown in FIG. 4A and FIG. 4B, FIG. 6A and FIG. 6B, FIG. 7A and FIG. 7B, or FIG. 8A and FIG. 8B. Details are not described herein again.

In still another possible implementation, after determining that NAS reroute using the (R)AN needs to be performed and before NAS reroute using the (R)AN is performed, the initial AMF sends the current NAS security context of the UE to the first AMF.

S1080. The initial AMF sends the current or new NAS security context of the UE to the first AMF.

Optionally, the initial AMF sends the current or new NAS security context of the UE to the first AMF, and may invoke an existing Namf_Communication_RegistrationStatusUpdate service. The service invocation carries the current or new NAS security context of the UE. The current NAS security context of the UE may be understood as a NAS security context currently used by the UE. The new NAS security context of the UE may be understood as a new NAS security context generated between the UE and the initial AMF.

Optionally, the initial AMF sends the new or current NAS security context of the UE to the first AMF, or may invoke a new service, and send the new or current NAS security context of the UE to the first AMF by including the new or current NAS security context in the new service.

Optionally, the initial AMF needs to notify the first AMF that the AMF redirection occurs (or notify the first AMF that NAS reroute using the (R)AN occurs), may invoke an Namf_Communication_RegistrationStatusUpdate service. The service needs to carry eighth indication information, and the eighth indication information is used to notify the first AMF that the AMF redirection occurs, or notify the first AMF that NAS reroute using the (R)AN occurs.

Optionally, the initial AMF notifies the first AMF that the AMF redirection occurs (or notifies the first AMF that NAS reroute using the (R)AN occurs), or may invoke a new service, where the service is used to notify the first AMF that the AMF redirection occurs or notify the first AMF that NAS reroute using the (R)AN occurs.

After the first AMF receives the new or current NAS security context of the UE sent by the initial AMF, the first AMF replaces the NAS security context, of the UE, locally stored by the first AMF with the received new NAS security context of the UE, the first AMF updates, by using the received new NAS security context of the UE, the NAS security context, of the UE, locally stored by the first AMF, or the first AMF deletes the NAS security context, of the UE, locally stored by the first AMF and stores the received new NAS security context of the UE.

The method procedure shown in FIG. 10 further includes: S1090. After receiving the NAS security context of the UE sent by the initial AMF, the first AMF needs to update the locally stored NAS security context of the UE.

S1011. The initial AMF sends a redirection message to the (R)AN. The message may be referred to as a NAS reroute message. The RR message received from the UE in S1010 is carried in the NAS reroute message and sent to the (R)AN. Alternatively, when the initial AMF obtains a complete registration request message in S950, the initial AMF includes the complete registration request message in the NAS reroute message and send the NAS reroute message to the (R)AN.

S1012. The (R)AN sends an initial UE message to the second AMF, where the initial UE message carries the RR message obtained in S1090 or the complete registration request message.

Further, after obtaining the RR message or the complete registration request message, the second AMF may perform a UE registration procedure according to a specification in a current protocol.

In the method procedure shown in FIG. 10, if the new NAS security context is created by the initial AMF and the UE before the initial AMF performs NAS reroute using the (R)AN, the initial AMF updates the NAS security context of the UE on the first AMF.

After NAS reroute using the (R)AN occurs, the NAS security context of the UE obtained by the second AMF from the first AMF is the new NAS security context of the UE. This avoids inconsistency between the NAS security contexts on the UE and the second AMF, thereby avoiding a registration failure caused by the inconsistency.

Figure 11A:
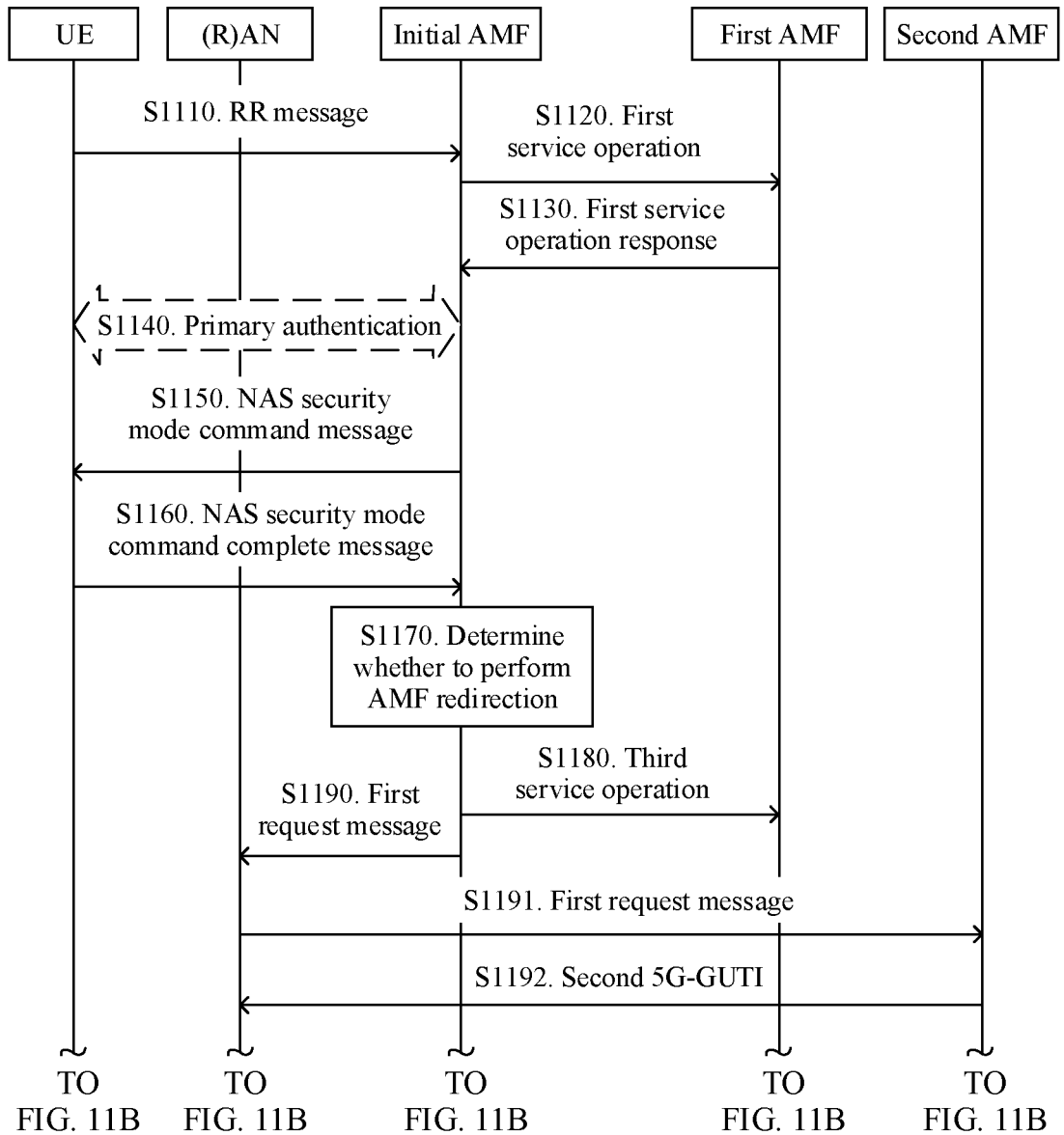
FIG. 11A and FIG. 11B are still another schematic flowchart of a method for mobility registration according to an embodiment of this application.
Figure 11B:
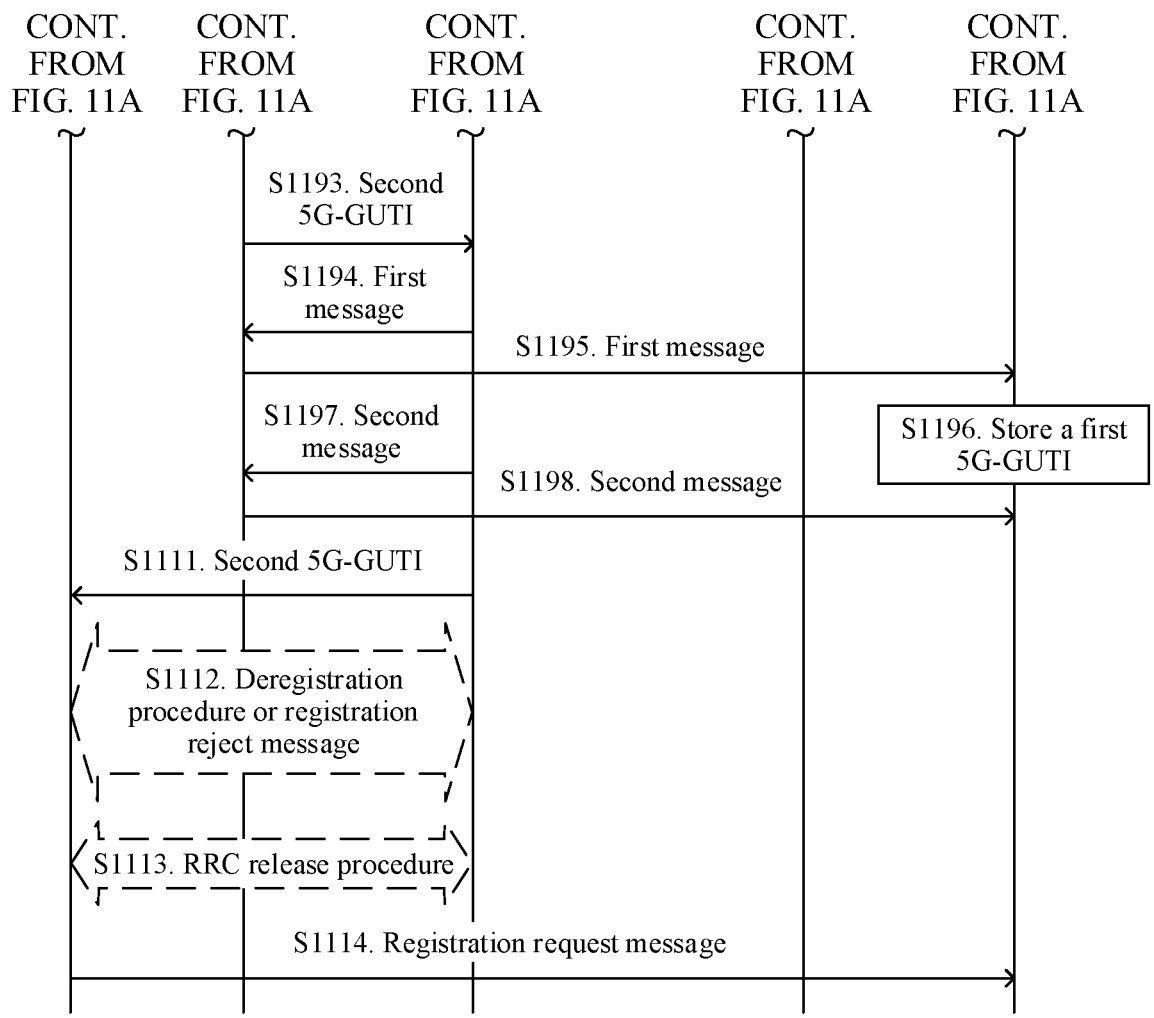

FIG. 11A and FIG. 11B are still another schematic flowchart of a method for a registration procedure in which AMF redirection occurs according to an embodiment of this application. Execution bodies include UE, a (R)AN, an initial AMF, a first AMF, and a second AMF. A security context is created by the UE and the first AMF that serves the UE last time, and the UE and the first AMF store a same AMF key, which is denoted as Kamf.

The method for the registration procedure in which the AMF redirection occurs includes the following steps.

S1110. The UE sends an RR message to the initial AMF, where the RR message carries a 5G-GUTI of the UE.

It should be understood that in this embodiment of this application, that the UE sends the RR message to the initial AMF means that the UE sends the RR message to the (R)AN, and then the (R)AN sends the RR message to the initial AMF. Because the (R)AN can perform transparent transmission, in this step, for brevity of description, that the UE sends the RR message to the initial AMF is directly described in this embodiment of this application and the accompanying drawing.

Further, in this embodiment, the 5G-GUTI of the UE carried in the RR message is allocated by the first AMF to the UE, and is referred to as a first 5G-GUTI in this embodiment.

S1120. The initial AMF invokes a first service operation from the first AMF.

Further, after receiving the RR message sent by the UE, the initial AMF determines, based on the 5G-GUTI in the RR message, the first AMF that serves the UE last time, and invokes the first service operation from the first AMF. The first service operation may be referred to as Namf_Communication_UEContextTransfer, and is used to request a context of the UE from the first AMF. The context of the UE includes the security context of the UE.

Optionally, before performing S1120, the initial AMF determines that the RR message does not carry the sixth indication information shown in FIG. 9.

S1130. The first AMF sends a first service operation response to the initial AMF.

Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransfer Response.

S1140. The initial AMF may initiate a primary authentication procedure.

According to a local policy, the initial AMF does not use a first key and a first key identifier corresponding to the first key that are obtained from the first AMF, but initiates the primary authentication procedure to generate a new AMF key Kamf_new and a new key identifier ngKSI_new.

S1150. The initial AMF sends a NAS SMC message to the UE. Further, the NAS SMC message carries an indication for requesting a complete initial NAS message. The initial AMF activates and starts using a new NAS security context.

S1160. The UE sends a NAS security mode command complete message to the initial AMF. The UE includes the complete initial NAS message in the NAS security mode complete message based on the indication for requesting the complete initial NAS message in the NAS SMC message. In the embodiments of this application, the complete initial NAS message mainly refers to the complete registration request message. The UE activates and starts using a new NAS security context.

S1170. The initial AMF determines whether to perform AMF redirection.

If the initial AMF determines that the initial AMF cannot serve the UE, the method procedure shown in FIG. 11A and FIG. 11B further includes: S1180. The initial AMF invokes a third service operation from the first AMF. The third service operation indicates a registration failure of the UE with the initial AMF.

Further, the third service operation may be referred to as Namf_Communication_RegistrationStatusUpdate, and a registration status of the UE carried in the third service operation is "NOT_TRANSFERRED".

If the initial AMF determines to perform NAS reroute via the (R)AN or AMF redirection via the (R)AN:

In a possible implementation, if the initial AMF does not receive the sixth indication information, or if the initial AMF determines, based on the RR message, that the UE is UE in release 15, and if the initial AMF creates the new NAS security context of the UE with the UE and starts using the new NAS security context (or the AMF and the UE perform a NAS security mode control or NAS security mode command procedure), the initial AMF needs to skip the NAS reroute that uses the (R)AN, and the initial AMF needs to request the second AMF to allocate a second 5G-GUTI or request the second AMF to allocate a special 5G-GUTI used for the AMF redirection (where the special 5G-GUTI for the AMF redirection in this embodiment is also referred to as the second 5G-GUTI).

Optionally, the initial AMF needs to send, to the second AMF, the 5G-GUTI (the first 5G-GUTI) carried in the registration request message.

Alternatively, optionally, the initial AMF needs to notify the second AMF that the AMF redirection using the (R)AN or the NAS reroute using the (R)AN occurs.

In another possible implementation, the initial AMF receives the sixth indication information, or the initial AMF determines at least one of the following based on the RR message: The UE is not UE in release 15, the UE is not UE in release 16 or a release later than release 16, the UE does not have a function of UE in release 16 or the release later than release 16, the UE does not have a capability of performing NAS redirection via the (R)AN, the UE does not have a capability of performing AMF redirection via the (R)AN, the UE does not have a NAS security context rollback capability, the UE does not have a capability of using the first NAS security context, the UE does not have a capability of restoring to a state of having no NAS security context, or the UE does not have a NAS security context processing capability. In this case, the initial AMF needs to perform steps performed by the initial AMF in the embodiment shown in FIG. 4A and FIG. 4B, FIG. 6A and FIG. 6B, FIG. 7A and FIG. 7B, or FIG. 8A and FIG. 8B. Details are not described herein again.

In still another possible implementation, if the initial AMF does not receive the sixth indication information, or if the initial AMF determines, based on the RR message, that the UE is UE in release 15, and if the initial AMF creates the new NAS security context of the UE with the UE and starts using the new NAS security context (or the AMF and the UE perform a NAS security mode control or NAS security mode command procedure), the initial AMF needs to skip the NAS reroute that uses the (R)AN, and the initial AMF needs to request the second AMF to allocate a second 5G-GUTI or request the second AMF to allocate a special 5G-GUTI used for the AMF redirection (where the special 5G-GUTI for the AMF redirection in this embodiment is also referred to as the second 5G-GUTI).

Optionally, the initial AMF needs to send, to the second AMF, the 5G-GUTI (the first 5G-GUTI) carried in the registration request message.

Alternatively, optionally, the initial AMF needs to notify the second AMF that the AMF redirection using the (R)AN or the NAS reroute using the (R)AN occurs.

In still another possible implementation, the initial AMF needs to skip the NAS reroute through the (R)AN, and the initial AMF needs to request the second AMF to allocate a second 5G-GUTI or request the second AMF to allocate a special 5G-GUTI used for the AMF redirection (where the special 5G-GUTI used for the AMF redirection in this embodiment is also referred to as the second 5G-GUTI).

Optionally, the initial AMF needs to send, to the second AMF, the 5G-GUTI (the first 5G-GUTI) carried in the registration request message.

Alternatively, optionally, the initial AMF needs to notify the second AMF that the AMF redirection using the (R)AN or the NAS reroute using the (R)AN occurs.

When receiving the request sent by the initial AMF for requesting the second AMF to allocate the second 5G-GUTI, the second AMF needs to allocate the second 5G-GUTI, and optionally, the second AMF needs to determine that the redirection occurs, where it should be understood that, the request that is received by the second AMF and that is for requesting to allocate the second 5G-GUTI may be any one of the foregoing possible implementations.

Alternatively, when the second AMF receives the request sent by the initial AMF for requesting the second AMF to allocate the second 5G-GUTI, the second AMF needs to allocate the special 5G-GUTI used for the AMF redirection, where the special 5G-GUTI used for the AMF redirection needs to be used in AMF redirection scenarios. The second AMF needs to send the second 5G-GUTI to the initial AMF. Further, the second AMF needs to send, to the initial AMF by using the (R)AN, a message that carries the second 5G-GUTI. The message carrying the second 5G-GUTI is not limited in this embodiment.

Optionally, that the initial AMF requests the second AMF to allocate the second 5G-GUTI may be that the initial AMF needs to send a first request message to the second AMF by using the (R)AN, where the first request message is used to request the second AMF to allocate the second 5G-GUTI.

It should be understood that a specific form of the first request message is not limited in this embodiment.

The method procedure shown in FIG. 11A and FIG. 11B further includes: S1190. The initial AMF needs to send the first request message to the (R)AN. S1191. The (R)AN needs to forward the first request message to the second AMF, where the first request message is used to request the second AMF to allocate the second 5G-GUTI, and the second 5G-GUTI is used to identify the UE. A difference from the first 5G-GUTI lies in that the first 5G-GUTI is allocated by the first AMF to the UE and the second 5G-GUTI is allocated by the second AMF to the UE. S1192. The second AMF needs to send the second 5G-GUTI to the (R)AN. S1193. The (R)AN needs to forward the second 5G-GUTI to the first AMF.

If the second AMF receives the first 5G-GUTI carried in the registration request message sent by the initial AMF, the second AMF needs to store the first 5G-GUTI.

Optionally, that the initial AMF sends, to the second AMF, the first 5G-GUTI carried in the registration request message may be that the initial AMF needs to send a first message to the second AMF by using the (R)AN. The first message needs to include the first 5G-GUTI carried in the registration request message.

It should be understood that a specific form of the first message is not limited in this embodiment.

The method procedure shown in FIG. 11A and FIG. 11B further optionally includes: S1194. The initial AMF needs to send the first message to the (R)AN. S1195. The (R)AN needs to forward the first message to the second AMF, where the first message needs to include the first 5G-GUTI. S1196. The second AMF needs to store the first 5G-GUTI.

Optionally, that the initial AMF needs to notify the second AMF that the AMF redirection using the (R)AN or the NAS reroute using the (R)AN occurs may be that the initial AMF needs to send ninth indication information to the second AMF by using the (R)AN. The ninth indication information is used to notify the second AMF that the AMF redirection using the (R)AN or the NAS reroute using the (R)AN occurs.

It should be understood that a message carrying the ninth indication information is not limited in this embodiment.

Optionally, that the initial AMF needs to notify the second AMF that the AMF redirection using the (R)AN or the NAS reroute using the (R)AN occurs may alternatively be that the initial AMF needs to send a second message to the second AMF by using the (R)AN. The second message is used to notify the second AMF that the AMF redirection using the (R)AN or the NAS reroute using the (R)AN occurs.

It should be understood that a type of the second message is not limited in this embodiment.

The method procedure shown in FIG. 11A and FIG. 11B further optionally includes: S1197. The initial AMF needs to send the second message to the (R)AN. S1198. The (R)AN forwards the second message to the second AMF.

When the second AMF receives the first 5G-GUTI and the request for requesting the second AMF to allocate the second 5G-GUTI that are sent by the initial AMF, the second AMF stores the first 5G-GUTI, allocates the second 5G-GUTI, and locally establishes a correspondence between the first 5G-GUTI and the second 5G-GUTI.

S1111. The initial AMF needs to send the second 5G-GUTI to the UE.

Case 1:

The initial AMF needs to include the second 5G-GUTI in a registration accept message sent to the UE.

Case 2:

The initial AMF needs to include the second 5G-GUTI in a configuration update command sent to the UE.

S1112. For the case 1 in S1111, the initial AMF needs to initiate a deregistration procedure, and indicate the UE to perform re-registration, or for the case 2 in S1111, the initial AMF needs to send a registration reject message to the UE, and indicate the UE to perform re-registration.

S1113. Optionally, the initial AMF needs to release a Radio Resource Control (RRC) connection.

S1114. The UE needs to re-initiate a registration request message, where the message carries the received second 5G-GUTI.

The second AMF determines whether the first 5G-GUTI is previously received. If the second AMF previously receives the first 5G-GUTI, the second AMF obtains the context of the UE from the first AMF based on the first 5G-GUTI.

If there is no UE context, the second AMF initiates an identity request procedure, and then initiates a registration procedure.

In the method procedure shown in FIG. 11A and FIG. 11B, after the initial AMF determines that the initial AMF cannot serve the UE, if the initial AMF and the UE have created and used the new NAS security context, the initial AMF obtains the second 5G-GUTI from the second AMF, and sends the second 5G-GUTI to the UE. The initial AMF deregisters the UE and indicates the UE to perform re-registration. The initial AMF may further send the first 5G-GUTI to the second AMF.

After receiving the request, the second AMF generates the second 5G-GUTI, and sends the second 5G-GUTI to the initial AMF.

The UE re-initiates the registration request by using the second 5G-GUTI, and the (R)AN may directly send the registration request of the UE to the second AMF based on the second 5G-GUTI.

Figure 12A:
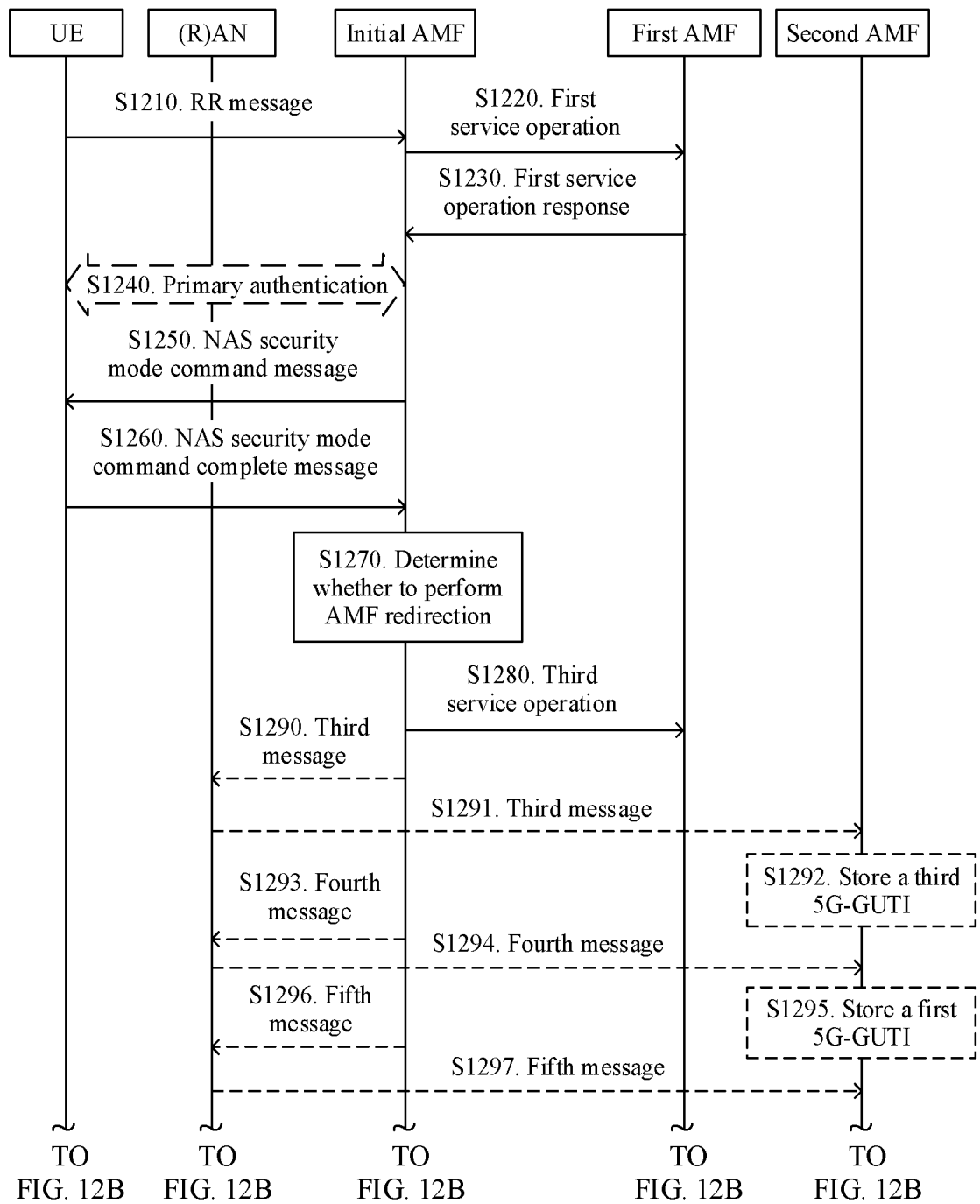
FIG. 12A and FIG. 12B are still another schematic flowchart of a method for mobility registration according to an embodiment of this application.
Figure 12B:
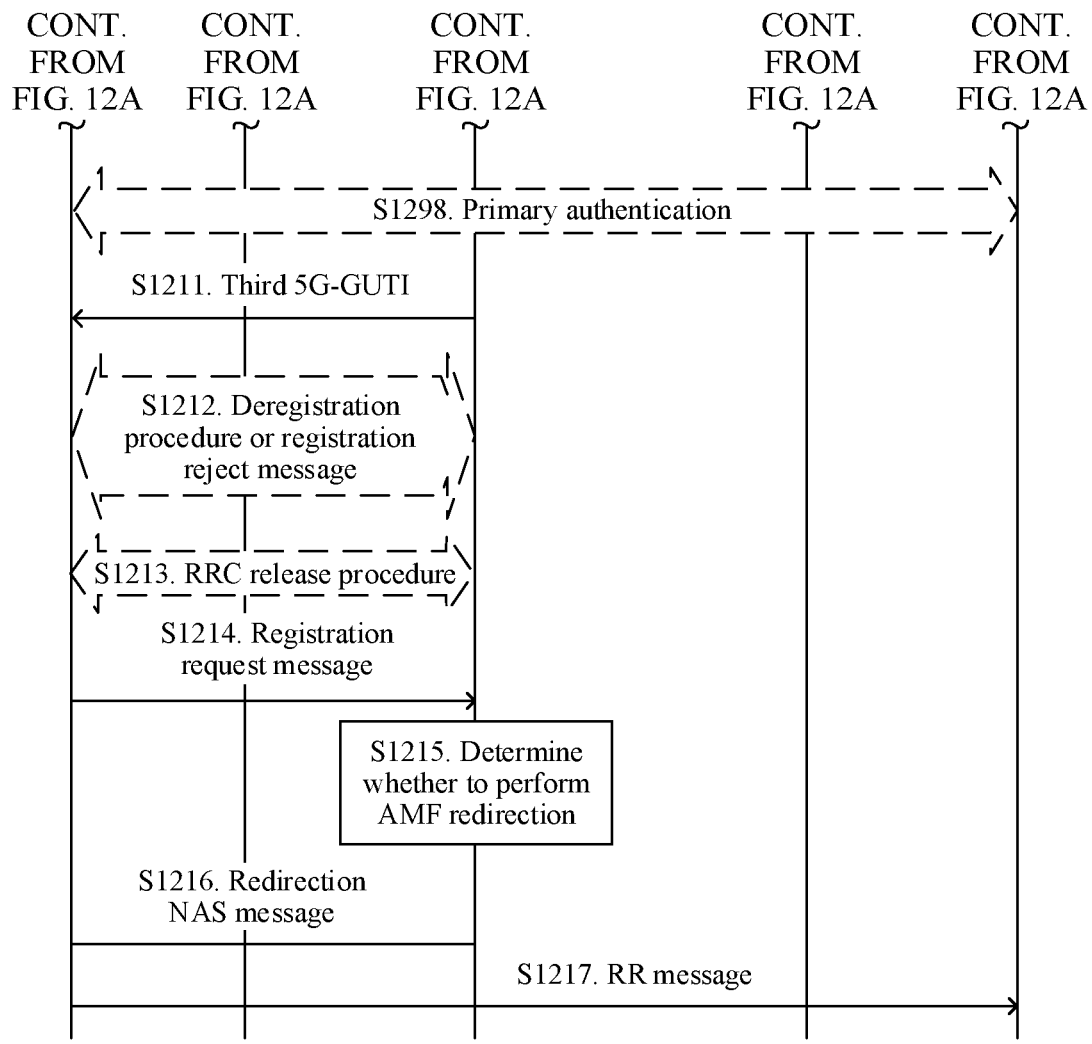

FIG. 12A and FIG. 12B are still another schematic flowchart of a method for a registration procedure in which AMF redirection occurs according to an embodiment of this application. Execution bodies include UE, a (R)AN, an initial AMF, a first AMF, and a second AMF. A security context is created by the UE and the first AMF that serves the UE last time, and the first AMF store a same AMF key, which is denoted as Kamf.

The method for the registration procedure in which the AMF redirection occurs includes the following steps.

S1210. The UE sends an RR message to the initial AMF, where the RR message carries a 5G-GUTI of the UE.

It should be understood that in this embodiment of this application, that the UE sends the RR message to the initial AMF means that the UE sends the RR message to the (R)AN, and then the (R)AN sends the RR message to the initial AMF. Because the (R)AN can perform transparent transmission, in this step, for brevity of description, that the UE sends the RR message to the initial AMF is directly described in this embodiment of this application and the accompanying drawing.

Further, in this embodiment, the 5G-GUTI of the UE carried in the RR message is allocated by the first AMF to the UE, and is referred to as a first 5G-GUTI in this embodiment.

S1220. The initial AMF invokes a first service operation from the first AMF.

Further, after receiving the RR message sent by the UE, the initial AMF determines, based on the 5G-GUTI in the RR message, the first AMF that serves the UE last time, and invokes the first service operation from the first AMF. The first service operation may be referred to as Namf_Communication_UEContextTransfer, and is used to request a context of the UE from the first AMF. The context of the UE includes the security context of the UE.

Optionally, before performing S1220, the initial AMF determines that the RR message does not carry the sixth indication information shown in FIG. 9.

S1230. The first AMF sends a first service operation response to the initial AMF.

Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransfer Response. Further, the first service operation response includes a first key and a first key identifier.

S1240. The initial AMF may initiate a primary authentication procedure.

According to a local policy, the initial AMF does not use the first key and the first key identifier corresponding to the first key that are obtained from the first AMF, but initiates the primary authentication procedure to generate a new AMF key Kamf_new and a new key identifier ngKSI_new.

S1250. The initial AMF sends a NAS SMC message to the UE. Further, the NAS SMC message carries an indication for requesting a complete initial NAS message. The initial AMF activates and starts using a new security context.

S1260. The UE sends a NAS security mode command complete message to the initial AMF. The UE includes the complete initial NAS message in the NAS security mode complete message based on the indication for requesting the complete initial NAS message in the NAS SMC message. In the embodiments of this application, the complete initial NAS message mainly refers to the complete registration request message. The UE activates and starts using a new security context.

S1270. The initial AMF determines whether to perform AMF redirection.

If the initial AMF determines to perform NAS reroute via the (R)AN or AMF redirection via the (R)AN:

In a possible implementation, the initial AMF does not receive the sixth indication information, or the initial AMF determines at least one of the following based on the RR message: The UE is UE in release 15, the UE is not UE in release 16 or a release later than release 16, the UE does not have a function of UE in release 16 or the release later than release 16, the UE does not have a capability of performing NAS redirection via the (R)AN, the UE does not have a capability of performing AMF redirection via the (R)AN, the UE does not have a NAS security context rollback capability, the UE does not have a capability of using the first NAS security context, the UE does not have a capability of restoring to a state of having no NAS security context, or the UE does not have a NAS security context processing capability. In addition, the initial AMF and the UE create and start using the new NAS security context of the UE, or the initial AMF and the UE perform a NAS security mode control or NAS security mode command procedure. In this case, the initial AMF needs to skip the NAS reroute procedure, and the initial AMF allocates a third 5G-GUTI to the UE and marks the UE (or the third 5G-GUTI indicates that the redirection occurs), or allocates a special 5G-GUTI used for the AMF redirection to the UE (where the special 5G-GUTI used for the AMF redirection in this embodiment is also referred to as the third 5G-GUTI).

Optionally, the initial AMF needs to send, to the second AMF, the 5G-GUTI (the first 5G-GUTI) carried in the registration request message. Alternatively, optionally, the initial AMF needs to notify the second AMF that the AMF redirection using the (R)AN or the NAS reroute using the (R)AN occurs.

In another possible implementation, the initial AMF receives the sixth indication information, or the initial AMF determines at least one of the following based on the RR message The UE is not UE in release 15, the UE is not UE in release 16 or a release later than release 16, the UE does not have a function of UE in release 16 or the release later than release 16, the UE does not have a capability of performing NAS redirection via the (R)AN, the UE does not have a capability of performing AMF redirection via the (R)AN, the UE does not have a NAS security context rollback capability, the UE does not have a capability of using the first NAS security context, the UE does not have a capability of restoring to a state of having no NAS security context, or the UE does not have a NAS security context processing capability. In this case, the initial AMF needs to perform steps performed by the initial AMF in the embodiment shown in FIG. 4A and FIG. 4B, FIG. 6A and FIG. 6B, FIG. 7A and FIG. 7B, or FIG. 8A and FIG. 8B. Details are not described herein again.

In still another possible implementation, if the initial AMF does not receive the sixth indication information, or if the initial AMF determines, based on the RR message, that the UE is UE in release 15, and if the initial AMF creates the new NAS security context of the UE with the UE and starts using the new NAS security context (or the AMF and the UE perform a NAS security mode control or NAS security mode command procedure), the initial AMF needs to skip the NAS reroute via the (R)AN, and the initial AMF allocates a third 5G-GUTI to the UE and marks the UE (or the third 5G-GUTI indicates that the redirection occurs), or allocates a special 5G-GUTI used for the AMF redirection to the UE (where the special 5G-GUTI used for the AMF redirection in this embodiment is also referred to as the third 5G-GUTI).

Optionally, the initial AMF needs to send, to the second AMF, the 5G-GUTI (the first 5G-GUTI) carried in the registration request message. Alternatively, optionally, the initial AMF needs to notify the second AMF that the AMF redirection using the (R)AN or the NAS reroute using the (R)AN occurs.

In still another possible implementation, the initial AMF needs to skip the NAS reroute that uses the (R)AN, and allocate a third 5G-GUTI to the UE, and mark the UE (or the third 5G-GUTI indicates that the redirection occurs), or allocate a special 5G-GUTI used for the AMF redirection to the UE (where the special 5G-GUTI used for the AMF redirection in this embodiment is also referred to as the third 5G-GUTI).

Optionally, the initial AMF needs to send, to the second AMF, the 5G-GUTI (the first 5G-GUTI) carried in the registration request message. Alternatively, optionally, the initial AMF needs to notify the second AMF that the AMF redirection using the (R)AN or the NAS reroute using the (R)AN occurs.

If the initial AMF determines that the initial AMF cannot serve the UE, the method procedure shown in FIG. 12A and FIG. 12B further includes: S1280. The initial AMF invokes a third service operation from the first AMF. The third service operation indicates a registration failure of the UE with the initial AMF.

Further, the third service operation may be referred to as Namf_Communication_RegistrationStatusUpdate, and a registration status of the UE carried in the third service operation is "NOT_TRANSFERRED".

Optionally, the initial AMF needs to send the third 5G-GUTI to the second AMF. In addition, if the second AMF receives the third 5G-GUTI sent by the initial AMF, the second AMF stores the third 5G-GUTI, and the third 5G-GUTI is used to indicate that the redirection occurs.

Optionally, that the initial AMF needs to send the third 5G-GUTI to the second AMF may be that the initial AMF sends a third message by using the (R)AN, where the third message includes the third 5G-GUTI.

It should be understood that a specific form of the third request message is not limited in this embodiment.

In this implementation, the method procedure shown in FIG. 12A and FIG. 12B further includes: S1290. The initial AMF sends the third message to the (R)AN. S1291. The (R)AN sends the third message to the second AMF, where the third message includes the third 5G-GUTI. S1292. The second AMF stores the third 5G-GUTI, where the third 5G-GUTI indicates that the redirection occurs.

Optionally, the initial AMF needs to send the first 5G-GUTI to the second AMF. In addition, if the second AMF receives the first 5G-GUTI sent by the initial AMF, the second AMF stores the first 5G-GUTI.

Optionally, that the initial AMF sends, to the second AMF, the first 5G-GUTI carried in the registration request message may be that the initial AMF sends a fourth message to the second AMF by using the (R)AN. The fourth message includes the first 5G-GUTI carried in the registration request message.

It should be understood that a specific form of the fourth message is not limited in this embodiment.

In this implementation, the method procedure shown in FIG. 12A and FIG. 12B further includes: S1293. The initial AMF sends the fourth message to the (R)AN. S1294. The (R)AN sends the fourth message to the second AMF, where the fourth message includes the first 5G-GUTI. S1295. The second AMF stores the first 5G-GUTI.

Optionally, that the initial AMF needs to notify the second AMF that the AMF redirection using the (R)AN or the NAS reroute using the (R)AN occurs may be that the initial AMF needs to send tenth indication information to the second AMF by using the (R)AN. The tenth indication information is used to notify the second AMF that the AMF redirection using the (R)AN or the NAS reroute using the (R)AN occurs.

It should be understood that a message carrying the tenth indication information is not limited in this embodiment.

Optionally, that the initial AMF needs to notify the second AMF that the AMF redirection using the (R)AN or the NAS reroute using the (R)AN occurs may alternatively be that the initial AMF needs to send a fifth message to the second AMF by using the (R)AN. The fifth message is used to notify the second AMF that the AMF redirection using the (R)AN or the NAS reroute using the (R)AN occurs.

It should be understood that a type of the fifth message is not limited in this embodiment.

In this implementation, the method procedure shown in FIG. 12A and FIG. 12B further includes: S1296. The initial AMF sends the fifth message to the (R)AN. S1297. The (R)AN sends the fifth message to the second AMF.

When the second AMF receives the first 5G-GUTI and the request for the third 5G-GUTI that are sent by the initial AMF, the second AMF stores the first 5G-GUTI and the third 5G-GUTI, and locally establishes a correspondence between the first 5G-GUTI and a third 5G-GUTI.

In another possible implementation, the second AMF does not receive the first 5G-GUTI, the third 5G-GUTI, or a redirection indication.

In this implementation, the method procedure shown in FIG. 12A and FIG. 12B further includes: S1298. The second AMF initiates a primary authentication procedure.

S1211. The initial AMF sends the third 5G-GUTI to the UE.

Case 1:

The initial AMF needs to include the third 5G-GUTI in a registration accept message sent to the UE.

Case 2:

The initial AMF needs to include the third 5G-GUTI in a configuration update command sent to the UE.

S1212. For the case 1 in S1211, the initial AMF needs to initiate a deregistration procedure, and indicate the UE to perform re-registration, or for the case 2 in S1211, the initial AMF needs to send a registration reject message to the UE, and indicate the UE to perform re-registration.

S1213. Optionally, the initial AMF needs to release an RRC connection.

S1214. The UE re-initiates a registration request message, where the message carries the received third 5G-GUTI.

S1215. The initial AMF determines whether to perform AMF redirection.

Further, the initial AMF receives the registration request message of the UE, and checks whether the UE is marked, whether the third 5G-GUTI in the registration request message indicates that the redirection occurs, or whether the third 5G-GUTI is a special 5G-GUTI used for the AMF redirection. If yes, the initial AMF initiates the NAS reroute that uses the (R)AN.

S1216. The initial AMF sends a redirection NAS message to the UE.

Further, the redirection NAS message includes the third 5G-GUTI.

S1217. The UE sends an RR message to the second AMF by using the (R)AN, where the message carries the received third 5G-GUTI or carries the first 5G-GUTI.

The second AMF determines whether the first 5G-GUTI is previously received. If the second AMF previously receives the first 5G-GUTI, the second AMF obtains the context of the UE from the first AMF based on the first 5G-GUTI.

If there is no UE context, the second AMF initiates an identity request procedure, and then initiates a registration procedure.

In the method procedure shown in FIG. 12A and FIG. 12B, after the initial AMF determines that the initial AMF cannot serve the UE, if the initial AMF and the UE have created and used the new NAS security context, the initial AMF configures a new third 5G-GUTI for the UE, and sends the third 5G-GUTI to the UE and the second AMF. The initial AMF deregisters the UE and indicates the UE to perform re-registration. The initial AMF may further send the first 5G-GUTI to the second AMF.

The UE re-initiates the registration request by using the third 5G-GUTI, and the (R)AN may directly send the registration request of the UE to the second AMF based on the third 5G-GUTI.

Figure 13:
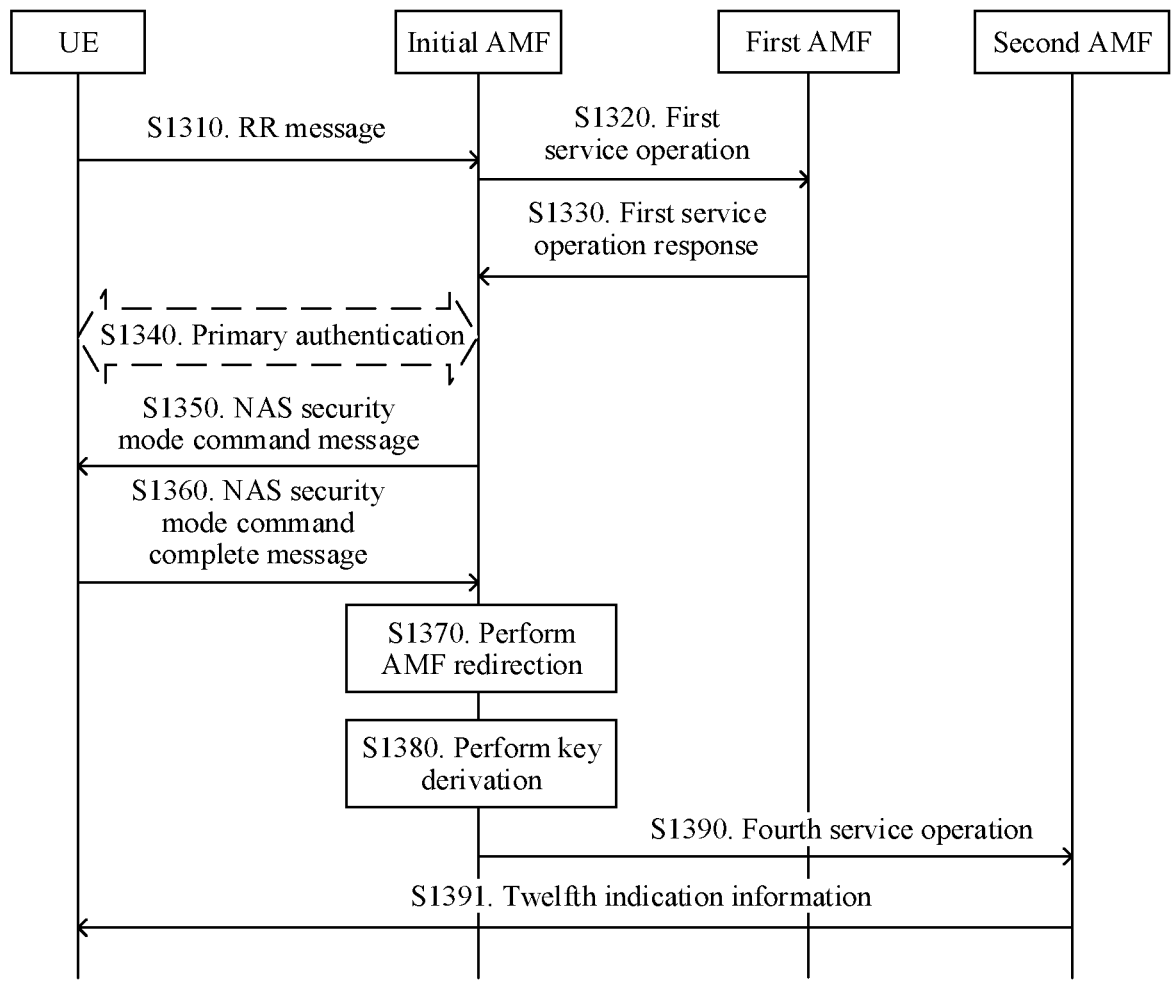
FIG. 13 is still another schematic flowchart of a method for mobility registration according to an embodiment of this application.

FIG. 13 is still another schematic flowchart of a method for a registration procedure in which AMF redirection occurs according to an embodiment of this application. Execution bodies include UE, an initial AMF, a first AMF, and a second AMF. A security context is created by the UE and the first AMF that serves the UE last time, and the UE and the first AMF store a same AMF key, which is denoted as Kamf.

In this embodiment, signaling exchange may be directly performed between the initial AMF and the second AMF, which is different from the signaling exchange that is performed between the initial AMF and the second AMF by using the (R)AN in the embodiments shown in FIG. 4A to FIG. 12B.

The method for the registration procedure in which the AMF redirection occurs includes the following steps.

S1310. The UE sends an RR message to the initial AMF, where the RR message carries a 5G-GUTI of the UE.

It should be understood that in this embodiment of this application, that the UE sends the RR message to the initial AMF means that the UE sends the RR message to the (R)AN, and then the (R)AN sends the RR message to the initial AMF. Because the (R)AN can perform transparent transmission, in this step, for brevity of description, that the UE sends the RR message to the initial AMF is directly described in this embodiment of this application and the accompanying drawing.

S1320. The initial AMF invokes a first service operation from the first AMF.

Further, after receiving the RR message sent by the UE, the initial AMF determines, based on the 5G-GUTI in the RR message, the first AMF that serves the UE last time, and invokes the first service operation from the first AMF. The first service operation may be referred to as Namf_Communication_UEContextTransfer, and is used to request a context of the UE from the first AMF. The context of the UE includes the security context of the UE.

Optionally, before performing S1320, the initial AMF determines that the RR message does not carry the sixth indication information shown in FIG. 9.

S1330. The first AMF sends a first service operation response to the initial AMF.

Further, the first AMF sends the first service operation response to the initial AMF after successfully authenticating the UE. Authentication of the UE by the first AMF means verification of integrity protection for the RR message. The first service operation response may be referred to as Namf_Communication_UEContextTransfer Response. Further, the first service operation response includes a first key and a first key identifier.

S1340. The initial AMF may initiate a primary authentication procedure.

According to a local policy, the initial AMF does not use the first key and the first key identifier corresponding to the first key that are obtained from the first AMF, but initiates the primary authentication procedure to generate a new AMF key Kamf_new and a new key identifier ngKSI_new.

S1350. The initial AMF sends a NAS SMC message to the UE. Further, the NAS SMC message carries an indication for requesting a complete initial NAS message. The initial AMF activates and starts using a new NAS security context.

S1360. The UE sends a NAS security mode command complete message to the initial AMF. The UE includes the complete initial NAS message in the NAS security mode complete message based on the indication for requesting the complete initial NAS message in the NAS SMC message. In the embodiments of this application, the complete initial NAS message mainly refers to the complete registration request message. The UE activates and starts using a new NAS security context.

S1370. The initial AMF determines whether to perform AMF redirection.

The initial AMF determines whether to perform direct AMF redirection, or the initial AMF determines whether to perform direct NAS reroute. If the initial AMF determines to directly perform AMF redirection or NAS reroute, the initial AMF performs the steps described in one of the following three manners.

Manner 1:

The initial AMF needs to send a current NAS security context of the UE to the second AMF.

Manner 2:

The initial AMF determines, according to a local policy of the initial AMF, to perform key derivation or not to perform key derivation.

Manner 3:

That the initial AMF determines, based on whether the first AMF performs key derivation, whether the initial AMF performs key derivation further includes the following several possible procedures:

Possible procedure 1:

If the first AMF does not perform key derivation, the initial AMF determines, according to the local policy, whether to perform key derivation.

For example, if the initial AMF does not receive thirteenth indication information that is from the first AMF and that is used to indicate that a new key is generated, or if the initial AMF does not receive a key derivation indication sent by the first AMF, where the key derivation indication may be referred to as keyAMFHDerivationInd and is used to indicate that the first AMF performs key derivation, the initial AMF determines, according to the local policy, whether to perform key derivation.

Possible procedure 2:

If the first AMF performs key derivation, the initial AMF sends a current NAS security context of the UE to the UE.

For example, if the initial AMF receives thirteenth indication information that is from the first AMF and that is used to indicate that a new key is generated, or if the initial AMF receives a key derivation indication sent by the first AMF, the initial AMF sends the current security context of the UE to the UE.

Manner 4: The initial AMF determines, based on a first preset condition, whether to perform key derivation.

Further, when the first preset condition is met, the initial AMF determines not to perform key derivation, that is, the initial AMF sends a current security context to the second AMF.

Otherwise, when the first preset condition is not met, the initial AMF may determine, according to a local policy, whether to perform key derivation, including the initial AMF determines, according to the local policy, to perform key derivation. Alternatively, the initial AMF determines, according to the local policy, not to perform key derivation, that is, to send the current security context to the second AMF.

The first preset condition includes that the initial AMF and the UE have successfully performed a NAS security mode control procedure, the initial AMF and the UE have created a security context, the initial AMF and the UE have performed secure NAS message exchange, the initial AMF and the UE have successfully performed NAS SMC, or the UE has activated NAS security.

In this application, key derivation, horizontal derivation, and horizontal $K_{AMF}$ derivation may all express a same key derivation manner, and may be used interactively.

Optionally, when the initial AMF determines to perform key derivation, the method procedure shown in FIG. 13 further includes: S1380. The initial AMF performs key derivation.

When the initial AMF performs key derivation, the initial AMF needs to notify the second AMF that the key derivation occurs. In this case, the method procedure shown in FIG. 13 further includes: S1390. The initial AMF needs to invoke a fourth service operation from the second AMF, where the fourth service operation needs to include eleventh indication information, and the eleventh indication information indicates that the initial AMF has performed key derivation, or indicates that the initial AMF has generated a new key. The fourth service operation further includes a key and a key identifier that are obtained after the derivation. A key derived from the first key is referred to as a fourth key. If a key generated after key derivation has a key identifier consistent with that corresponding to a derived key, a key identifier corresponding to the fourth key is also the first key identifier. The fourth service operation further needs to include an indication indicating that access stratum (AS) key re-keying needs to be performed.

The fourth service operation may be referred to as Namf_Communication_N1MessageNotify, and is used to communicate with the second AMF.

Further, after the second AMF receives the eleventh indication information, the method procedure shown in FIG. 13 further includes: S1391. The second AMF needs to send twelfth indication information to the UE, where the twelfth indication information indicates the UE to perform key derivation, or indicates the UE to generate a new key. The twelfth indication information may be K_AMF_change_flag whose value is 1.

Optionally, when the initial AMF determines not to perform key derivation, the initial AMF sends the current NAS security context of the UE to the second AMF. In this case, the method procedure shown in FIG. 13 further includes: S1390. The initial AMF invokes the fourth service operation from the second AMF, where the fourth service operation needs to include the current NAS security context of the UE.

The initial AMF needs to generate the new key in one of the following manners:

Manner 1:

The initial AMF needs to generate the new key by using the current key and an uplink NAS count value in the received RR message.

Manner 2:

The initial AMF needs to generate the new key by using the current key and an uplink NAS count in a recently received N1 message. For example, if the initial AMF receives the NAS security mode complete message sent by the UE, the initial AMF needs to generate the new key by using the current key and an uplink NAS count in the received NAS security mode complete message. Otherwise, the initial AMF needs to generate the new key by using the current key and an uplink NAS count in the received RR message.

Manner 3:

The initial AMF needs to generate the new key using the current key and a current downlink NAS count value.

Manner 4:

If the initial AMF and the UE do not activate, use, generate, or create a new NAS security context, if the initial AMF receives only one NAS message, that is, the registration request message, or if the initial AMF and the UE do not perform the NAS security mode command/control procedure, or if the NAS message received by the initial AMF is only the registration request message, the initial AMF needs to generate the new key by using the current key and an uplink NAS count in the registration request message. Otherwise, the initial AMF needs to generate the new key by using the current key and a current downlink NAS count.

Manner 5:

If the initial AMF receives a NAS message other than the registration request message, the initial AMF needs to generate the new key by using the current key and a current downlink NAS count. Otherwise, the AMF needs to generate the new key by using the current key and an uplink NAS count in the registration request message.

It should be understood that when the initial AMF generates the new key, or when the initial AMF performs key derivation, the initial AMF needs to send the newly generated key, the new key identifier, the eleventh indication information, and fourteenth indication information to the second AMF. The eleventh indication information is used to indicate that the initial AMF has performed key derivation, or indicate that the initial AMF has generated the new key, and the fourteenth indication information is used to indicate that AS key re-keying needs to be performed.

Optionally, the newly generated key, the new key identifier, the eleventh indication information, and the fourteenth indication information need to be carried in the fourth service operation.

It should be understood that when the initial AMF generates the new key by using the current downlink NAS count, the initial AMF needs to send the downlink NAS count to the second AMF. Further, the initial AMF needs to include the downlink NAS count used to generate the new key in Namf_Communication_N1MessageNotify.

Optionally, the initial AMF may send, to the second AMF, the uplink NAS count used to generate the new key.

Optionally, when the initial AMF uses the uplink NAS count in the registration request message when generating the new key, the initial AMF includes fifteenth indication information in Namf_Communication_N1MessageNotify. The fifteenth indication information is used to indicate that the new key is generated by using the uplink NAS count in the registration request message.

Optionally, when the initial AMF uses the uplink NAS count in the NAS security mode complete message when generating the new key, the initial AMF includes sixteenth indication information in Namf_Communication_N1MessageNotify. The sixteenth indication information is used to indicate that the new key is generated by using the uplink NAS count in the NAS security mode complete message.

Optionally, the initial AMF further includes seventeenth indication information in Namf_Communication_N1MessageNotify. The seventeenth indication information is used to indicate that the UE is valid UE, the seventeenth indication information is used to indicate that the registration request message is from authenticated UE, the seventeenth indication information is used to indicate that the registration message has been verified, or the seventeenth indication information is used to indicate that the registration message does not need to be verified.

It should be understood that, in this embodiment, Namf_Communication_N1MessageNotify does not definitely carry the seventeenth indication information. When the initial AMF and the UE create a new NAS security context, the initial AMF needs to send the seventeenth indication information to the second AMF.

Optionally, when the second AMF receives the downlink NAS count, the second AMF needs to send the downlink NAS count to the UE. Optionally, the second AMF needs to include the downlink NAS count in a NAS container and send the NAS container to the UE.

Optionally, when the second AMF receives the uplink NAS count, the second AMF needs to send the uplink NAS count to the UE. Optionally, the second AMF needs to include the uplink NAS count in a NAS security mode command message and send the NAS security mode command message to the UE.

Optionally, when the second AMF receives the fifteenth indication information, the second AMF sends eighteenth indication information to the UE, where the eighteenth indication information is used to indicate that the new key is generated by using the uplink NAS count in the registration request message. For example, the second AMF includes the eighteenth indication information in a NAS security mode command message and sends the NAS security mode command message to the UE.

Optionally, when the second AMF receives the sixteenth indication information, the second AMF sends nineteenth indication information to the UE, where the nineteenth indication information is used to indicate that the new key is generated by using the uplink NAS count in the NAS security mode complete message. Optionally, the second AMF needs to include the nineteenth indication information in a NAS security mode command message and send the NAS security mode command message to the UE.

Optionally, when the second AMF receives the seventeenth indication information, the second AMF does not verify the received registration request message, or the second AMF does not verify the UE.

Optionally, if the UE receives K_AMF_change_flag whose value is 1, and the UE receives the downlink NAS count, the UE needs to generate a new key by using the downlink NAS count.

Optionally, if the UE receives K_AMF_change_flag whose value is 1, and the UE receives the uplink NAS count, the UE needs to generate a new key by using the uplink NAS count.

Optionally, if the UE receives K_AMF_change_flag whose value is 1, and the UE receives the eighteenth indication information, the UE needs to generate a new key by using the uplink NAS count in the registration request message.

Optionally, if the UE receives K_AMF_change_flag whose value is 1, and the UE receives the nineteenth indication information, the UE needs to generate a new key by using the uplink NAS count in the NAS security mode complete message.

Otherwise, if the UE receives K_AMF_change_flag whose value is 1, the UE needs to generate a new key by using an uplink NAS count in a recently sent N1 message.

Further, if the UE sends a NAS security command message, the UE generates the new key by using an uplink NAS count in the NAS security command message. Otherwise, the UE uses the uplink NAS count carried in the sent registration request message.

In the method procedure shown in FIG. 13, the initial AMF and the second AMF may establish a connection, that is, the initial AMF may notify the second AMF whether key derivation is performed or a new key is generated, and then the second AMF may indicate the UE to perform the same step, to ensure that NAS security contexts on the UE and the second AMF are consistent, thereby avoiding a registration failure caused by inconsistency between NAS security contexts.

In this application, Kamf, KAMF, and $K_{AMF}$ all represent an AMF key, and may be used interchangeably. The context of the UE includes a security context, the security context includes a NAS security context, and the NAS security context includes a KANT. In this application, scenarios and manners in which the security context and the NAS security context are used are the same, and no ambiguity is caused when they are used interchangeably. Therefore, in this application, the security context and the NAS security context may be used interchangeably.

Figure 22:
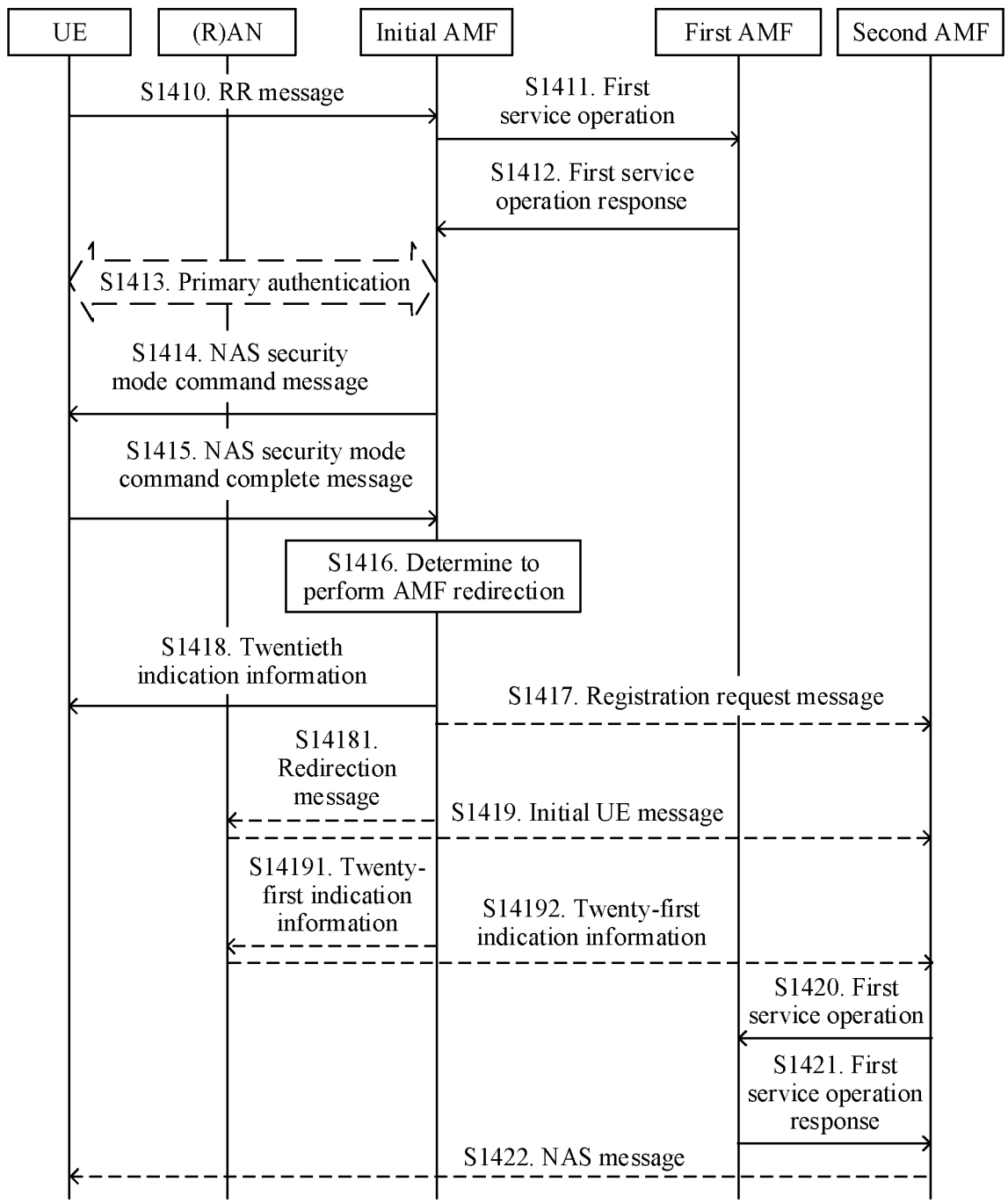
FIG. 22 is still another schematic flowchart of a method for mobility registration according to an embodiment of this application.

This application further provides another method for registration procedure. With reference to FIG. 22, the following describes in detail another method for registration procedure provided in an embodiment of this application. FIG. 22 is another schematic flowchart of a method for mobility registration according to an embodiment of this application. Execution bodies include UE, a (R)AN, an initial AMF, a first AMF, and a second AMF. If the UE has a security context and a 5G-GUTI when initiating a registration procedure, the security context is a security context created by the UE and the first AMF that serves the UE last time, and the 5G-GUTI is allocated by the first AMF to the UE. The UE and the first AMF separately store same Kamf. The method for mobility registration includes at least the following some steps.

S1410. The UE sends an RR message to the initial AMF, where the RR message carries a 5G-GUTI or a subscription concealed identifier (SUCI) of the UE.

It should be understood that in this embodiment of this application, that the UE sends the RR message to the initial AMF means that the UE sends the RR message to the (R)AN, and then the (R)AN sends the RR message to the initial AMF. Because the (R)AN can perform transparent transmission, in this step, for brevity of description, that the UE sends the RR message to the initial AMF is directly described in this embodiment of this application and the accompanying drawing.

If the UE has a security context and/or the 5G-GUTI when initiating a registration procedure, the RR message sent by the UE includes cleartext IEs and a NAS container. In addition, integrity protection is provided for the RR message. The NAS container includes an encrypted complete RR message.

If the UE does not have a security context when initiating a registration procedure, the RR message sent by the UE includes only cleartext IEs. In addition, integrity protection is not provided for the RR message.

If the RR message includes the 5G-GUTI, the initial AMF obtains, from the first AMF, a context of the UE including a security context, that is, the registration procedure further includes S1411 and S1412.

S1411. The initial AMF invokes a first service operation from the first AMF. This step is similar to S22 in FIG. 3, and details are not described herein again.

S1412. The first AMF sends a first service operation response to the initial AMF. This step is similar to S23 in FIG. 3, and details are not described herein again.

If the RR message received by the initial AMF carries the SUCI, the initial AMF fails in obtaining the context from the first AMF, or the initial AMF determines, according to a local policy, to initiate primary authentication, the registration procedure further includes S1413.

S1413. The initial AMF and the UE perform a primary authentication procedure, and the UE and the initial AMF separately generate Kamf_new and an identifier ngKSI_new corresponding to Kamf_new. This step is similar to S4 in FIG. 2, and details are not described herein again.

S1414. The initial AMF sends a NAS SMC message to the UE. The initial AMF may include an initial NAS message retransmission indication in the NAS SMC, to indicate the UE to retransmit an initial NAS message. Herein, the initial NAS message is the RR message. A case in which the initial AMF includes the initial NAS message retransmission indication in the NAS SMC includes the following.

The initial AMF cannot decrypt the NAS container in the RR message, the initial AMF fails in obtaining the context from the first AMF, or the RR message received by the initial AMF includes only the cleartext IEs. Other content is similar to S5 in FIG. 2, and details are not described herein again.

S1415. The UE sends a NAS security mode complete (SMP) message to the initial AMF. If the UE receives the initial NAS message retransmission indication in the NAS SMC, the UE includes the complete registration request message in the SMP message. Other content is similar to S6 in FIG. 2, and details are not described herein again.

S1416. The initial AMF determines to perform AMF redirection. Based on a local policy and a subscription message, the initial AMF may determine to perform one of the following redirection options.

Option A: Direct NAS reroute, that is, the initial AMF directly sends a NAS message, that is, a registration request message, to the second AMF. If the initial AMF has the context of the UE, the initial AMF sends the context of the UE to the second AMF. The initial AMF sends the RR message and the context by invoking a fifth service operation (which may be referred to as an Namf_Communication_RegistrationStatusUpdate service operation) from the second AMF.

Option B: NAS reroute via the (R)AN, that is, the initial AMF sends a registration request message to the second AMF by using the (R)AN. This option is similar to S10 and S11 in FIG. 2, and details are not described herein again.

S1418. The initial AMF sends twentieth indication information to the UE, to indicate the UE to accept or process an authentication request message without security protection, and/or indicate the UE to resume using the stored security context. Correspondingly, the UE receives the twentieth indication information.

In a possible implementation, before the initial AMF sends the twentieth indication information to the UE, the initial AMF determines to send the twentieth indication information to the UE. When the initial AMF determines that a twentieth preset condition is met, the initial AMF sends the twentieth indication information to the UE. The twentieth preset condition is any one or more of the following conditions.

The initial AMF determines that the AMF redirection needs to be performed, the initial AMF determines that the NAS reroute needs be performed, the initial AMF and the UE perform secure NAS message exchange, the initial AMF and the UE successfully perform NAS SMC, the UE and the initial AMF establish a security association, the UE and the initial AMF activate security protection, the UE and the initial AMF create a new NAS security context, the UE and the initial AMF perform primary authentication, the initial AMF selects a security algorithm different from a security algorithm selected by the first AMF, the initial AMF uses KAMF that is received from the first AMF and that is generated after horizontal KAMF derivation is performed, or the initial AMF receives a horizontal KAMF derivation indication from the first AMF and the initial AMF determines to use KAMF received from the first AMF.

That the initial AMF may send the twentieth indication information to the UE by using either of the following two options.

Option 1: The initial AMF may send a first notification message to the UE, where the first notification message is used to indicate the UE to accept or process the authentication request message without security protection, and/or indicate the UE to resume using the stored security context. The first notification message may be a newly added NAS message, and the newly added NAS message may be named AMF Reallocation Notification.

Option 2: The initial AMF may send a first NAS message to the UE, where the first NAS message carries the twentieth indication information. The twentieth indication information may be newly added indication information. For example, the twentieth indication information may be named AMF_Reallocation_Ind. For example, the first NAS message may be an existing NAS message, for example, including but not limited to the following NAS messages: a configuration update command, a downlink NAS transport message, a 5GMM status, a registration reject message, and the like.

Both the twentieth indication information and the first notification message may further indicate any one or more of the following: indicate the UE to delete or discard the NAS security context, indicate the UE to deactivate a current NAS security context of the UE, indicate the UE to process the authentication request message without security protection, indicate, to the UE, that the AMF redirection occurs on a network side, indicate the UE to restore to a state of having no NAS security context, indicate the UE to delete or discard the new NAS security context created by the UE and the initial AMF, indicate the UE to delete or discard the NAS security context created by the UE and the initial AMF, indicate the UE to delete or discard the new NAS security context, indicate the UE to deactivate the current NAS security context created by the UE and the initial AMF, indicate the UE to resume using the stored NAS security context, indicate the UE to resume using a security context used by the UE before a secure NAS message is received, indicate the UE to resume using a security context used before the security activation, indicate the UE to resume using a security context used before the NAS SMC is received, indicate the UE to resume using a security context used after the UE sends the RR message and before the secure NAS message is received, indicate the UE to resume using a security context used after the UE sends the RR message and before the NAS SMC is received, indicate the AMF redirection, indicate NAS reroute, indicate direct NAS reroute, indicate the NAS reroute via the RAN, and/or indicate the UE to discard other authentication request messages without security protection that are different from the unprotected authentication request message.

After the UE receives the twentieth indication information or the first notification message, the UE performs any one or more of the following operations based on the twentieth indication information or the first notification message.

If the UE receives the authentication request message without security protection, the UE needs to accept or process the authentication request message without security protection, discard or delete the NAS security context, deactivate the current NAS security context of the UE, restore to the state of having no NAS security context, delete or discard the new NAS security context created by the UE and the initial AMF, delete or discard the NAS security context created by the UE and the initial AMF, delete or discard the new NAS security context, deactivate the current NAS security context created by the UE and the initial AMF, use the stored NAS security context, use the security context used by the UE before the secure NAS message is received, resume using the security context used after the UE sends the RR message and before the secure NAS message is received, indicate the UE to resume using the security context used after the UE sends the RR message and before the NAS SMC is received, resume using the security context used before the security activation, resume using the security context used before the NAS SMC is received, resume using an N1 message (including the authentication request message) without a security context, and accepts or processes the N1 message without security protection, if the UE has no security context when sending the RR message, and/or resume using no security context, and accepts or processes the N1 message without security protection (including the authentication request message), if the UE has no security context when initiating the registration procedure.

After receiving the twentieth indication information or the first notification message, the UE may further perform any one or more of the following operations based on the twentieth indication information or the first notification message: If the UE receives the authentication request message without security protection, the UE needs to accept or process the authentication request message without security protection, if the UE receives an N1 message without security protection, where the N1 message is any other N1 message that is not an authentication request message, the UE needs to discard the N1 message, and if the UE receives a protected N1 message, the UE needs to resume using the stored security context to process the protected N1 message.

In this application, the following security contexts are a same security context, and may be used interactively: a security context stored by the UE when the UE receives the twentieth indication information or the first notification message, a security context created after the UE sends the registration request message and before the UE receives the NAS SMC, and a security context created by the UE after the UE sends the registration request message and before the NAS security activation.

After the UE receives the twentieth indication information or the first notification message, in a possible implementation, the UE sends the registration request message to the initial AMF. Correspondingly, the initial AMF receives the registration request message. The registration request message may be any one of the following: a first registration request message, which is a registration request message sent by the UE when the UE initiates the registration procedure, that is, the RR message in S1410, a second registration request message, where the second registration request message includes cleartext IEs and a NAS container, the NAS container includes a complete registration request message, and the UE encrypts the NAS container, a content part of the NAS container, or a value part of the NAS container by using the current security context, and a third registration request message, where the third registration request message includes only cleartext IEs, or the third registration request message includes cleartext IEs and a NAS container, where the NAS container includes a complete registration request message, and the UE encrypts the NAS container, a content part of the NAS container, or a value part of the NAS container. During the encryption, the UE needs to use the security context created with the first AMF, the stored security context, the old security context, the first security context, or the security context used when the UE initiates the registration procedure. If the UE has no security context or 5G-GUTI when initiating the registration procedure, the UE includes only the cleartext IEs in the third registration request message.

That the UE sends the registration request message to the initial AMF may include that the UE sends the first registration request message to the initial AMF, the UE sends the second registration request message with integrity protection to the initial AMF, or the UE sends the third registration request message to the initial AMF. If the UE has no security context when initiating the registration procedure, integrity protection is not provided for the first registration request information or the third registration request message. If the UE has a security context when initiating the registration procedure, integrity protection is provided for the first registration request information and the third registration request message.

In a possible implementation, the UE may send the registration request message to the initial AMF by using an existing NAS message such as a configuration update complete message or an uplink NAS transport message. The UE may alternatively send the registration request message to the initial AMF by using a newly added NAS message. The application does not limit the message.

S1417. If the initial AMF determines to perform direct NAS reroute, the initial AMF directly sends the registration request message to the second AMF. The initial AMF sends the registration request message to the second AMF by invoking the fifth service operation from the second AMF. The initial AMF further includes the context of the UE in the fifth service operation. The fifth service operation may be an Namf_Communication_RegistrationStatusUpdate service operation.

S14181. If the initial AMF determines to perform NAS reroute via the RAN, the initial AMF sends the registration request message to the second AMF via the RAN. Further, the initial AMF sends a redirection message (NAS reroute message) to the RAN, and includes the registration request message in the redirection message. Correspondingly, the RAN receives the redirection message. After receiving the redirection message, the RAN sends an initial UE message to the second AMF, and includes the received registration request message in the initial UE message. That is, the registration procedure includes S1419.

In a possible implementation, the initial AMF sends twenty-first indication information to the second AMF via the RAN. That is, the registration procedure includes S14191 and S14192. The twenty-first indication information is used to indicate one or more of the following AMF redirection, NAS reroute, NAS reroute via the RAN, the initial AMF and the UE have performed secure NAS message exchange, the initial AMF and the UE have successfully performed NAS SMC, the UE and the initial AMF have established the security association, the UE and the initial AMF have activated security protection, the UE and the initial AMF have created the new NAS security context, the UE and the initial AMF have performed primary authentication, the initial AMF has selected the security algorithm different from a security algorithm selected by the second AMF, the initial AMF has used KAMF that is received from the first AMF and that is generated after horizontal KAMF derivation is performed, the initial AMF has received the horizontal KAMF derivation indication from the first AMF and the initial AMF has determined to use KAMF received from the first AMF, the second AMF to send an authentication request message with security protection, the second AMF to send an authentication request message with security protection, or the second AMF to send a NAS message with security protection, including an authentication request message.

In a possible implementation, before the initial AMF sends the twenty-first indication information to the UE, the initial AMF determines to send the twenty-first indication information to the UE. When the initial AMF determines that a twenty-first preset condition is met, the initial AMF sends the twenty-first indication information to the UE. The twenty-first preset condition is any one or more of the following conditions.

AMF redirection needs to be performed, NAS reroute needs to be performed, NAS reroute via the RAN needs to be performed, the initial AMF and the UE have performed secure NAS message exchange, the initial AMF and the UE have successfully performed NAS SMC, the UE and the initial AMF have established the security association, the UE and the initial AMF have activated security protection, the UE and the initial AMF have created the new NAS security context, the UE and the initial AMF perform primary authentication, the initial AMF selects a security algorithm different from a security algorithm selected by the first AMF, the initial AMF uses KAMF that is received from the first AMF and that is generated after horizontal KAMF derivation is performed, or the initial AMF receives a horizontal KAMF derivation indication from the first AMF and the initial AMF determines to use KAMF received from the first AMF.

That the initial AMF sends the twenty-first indication information to the second AMF via the RAN includes that the initial AMF sends the twenty-first indication information to the RAN. Correspondingly, the RAN receives the twenty-first indication information. The RAN sends the received twenty-first indication information to the second AMF. The initial AMF may send the twenty-first indication information to the RAN by using the redirection message, and the RAN sends the received twenty-first indication information to the second AMF by using the initial UE message.

In S1417 and S14181, the registration request message sent by the initial AMF may be any one of the following registration request messages: the first registration request message, the second registration request message, the third registration request message, a fourth registration request message, which is obtained by the initial AMF from the NAS SMP message, and a fifth registration request message, which is obtained by the initial AMF by decrypting the NAS container in the registration request message.

That the initial AMF obtains the registration request message from the NAS SMP message means that the initial AMF decrypts the NAS SMP to obtain the registration request message included in the NAS SMP message. The registration request message obtained by the initial AMF decrypting the NAS container in the registration request message is a registration request message obtained by the initial AMF by decrypting the NAS container, the value part of the NAS container, or the content part of the NAS container carried in the registration request message.

S1420. After receiving the initial UE message, the second AMF may invoke the first service operation from the first AMF to obtain the context of the UE.

In a possible implementation, the second AMF sends the 5G-GUTI of the UE and/or twenty-second indication information to the first AMF, where the twenty-second indication information is used to indicate AMF redirection or is used to indicate that the UE has been verified.

After the first AMF receives the twenty-second indication information, the first AMF skips integrity verification based on the twenty-second indication information.

After the first AMF receives the 5G-GUTI and the twenty-second indication information, the first AMF skips integrity verification based on the twenty-second indication information, finds the context of the UE based on the 5G-GUTI, and returns the context of the UE.

In a possible implementation, before the second AMF sends the 5G-GUTI of the UE and/or the twenty-second indication information to the first AMF, the second AMF determines to send the 5G-GUTI and/or the twenty-second indication information to the first AMF. Further, if the second AMF determines that a twenty-second preset condition is met, the second AMF determines to send the 5G-GUTI and/or the twenty-second indication information to the first AMF. The twenty-second preset condition is any one or more of the following conditions.

The second AMF receives the twenty-first indication information, the registration request message received by the second AMF is a complete registration request message without integrity protection, the second AMF receives a complete registration request message, the second AMF receives a registration request message without integrity protection, the initial UE message received by the second AMF includes a source to target AMF information reroute IE, the initial UE message received by the second AMF includes NSSAI, or the initial UE message received by the second AMF includes configured NSSAI and/or rejected NSSAI.

In a possible implementation, the second AMF sends the 5G-GUTI and/or the twenty-second indication information to the first AMF by using the first service operation.

S1421. The first AMF sends a second service operation response to the second AMF.

The first service operation response may include the context of the UE.

S1422. The second AMF sends a NAS message to the UE.

In a possible implementation, if the second AMF determines to initiate primary authentication, and if the second AMF receives the twenty-first indication information, the second AMF sends, based on the twenty-first indication information, the authentication request message with security protection. The second AMF needs to protect the authentication request message by using the security context received from the first AMF.

In a possible implementation, if the second AMF determines to initiate primary authentication, the second AMF sends the authentication request message with security protection. The second AMF needs to protect the authentication request message by using the security context received from the second AMF.

In a possible implementation, the second AMF sends a NAS message with security protection, including the authentication request message. The second AMF needs to protect the NAS message by using the security context received from the second AMF.

The foregoing describes in detail the method for mobility registration provided in the embodiments of this application with reference to FIG. 4A to FIG. 13, and FIG. 22. The following describes in detail an apparatus for mobility registration provided in the embodiments of this application with reference to FIG. 14 to FIG. 21.

Figure 14:
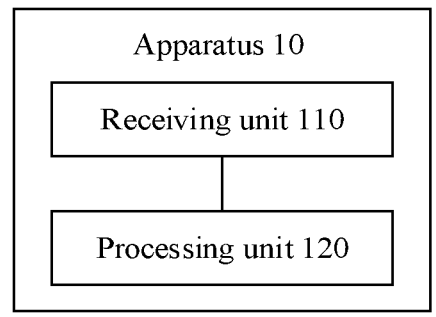
FIG. 14 is a schematic diagram of an apparatus 10 for mobility registration according to an embodiment of this application.

FIG. 14 is a schematic diagram of an apparatus 10 for mobility registration according to this application. As shown in FIG. 14, the apparatus 10 includes a receiving unit 110 and a processing unit 120.

The receiving unit 110 is configured to receive a first NAS SMC message sent by an initial AMF.

The receiving unit 110 is further configured to receive a second NAS SMC message sent by a second AMF, where the second NAS SMC message carries indication information, and the indication information is used to indicate the UE to use the first NAS security context.

The processing unit 120 is configured to resume using the first NAS security context.

The apparatus 10 completely corresponds to the user equipment in the method embodiments. The apparatus 10 may be the user equipment in the method embodiments, or a chip or a function module in the user equipment in the method embodiments. The corresponding units of the apparatus 10 are configured to perform corresponding steps performed by the user equipment in the method embodiments shown in FIG. 4A to FIG. 13, and FIG. 22.

The receiving unit 110 of the apparatus 10 performs the receiving step performed by the user equipment in the method embodiments, for example, performs step 115 of receiving the NAS security mode command message sent by the initial AMF in FIG. 4A and FIG. 4B, step 150 of receiving the NAS message sent by the second AMF in FIG. 4A and FIG. 4B, step 210 of receiving the NAS security mode command message sent by the initial AMF in FIG. 6A and FIG. 6B, step 242 of receiving the NAS security mode command message sent by the second AMF in FIG. 6A and FIG. 6B, step 253 of receiving the registration accept message sent by the second AMF in FIG. 6A and FIG. 6B, step 323 of receiving the NAS security mode command message sent by the second AMF in FIG. 7A and FIG. 7B, step 410 of receiving the NAS security mode command message sent by the initial AMF in FIG. 8A and FIG. 8B, step 430 of receiving the NAS message, for example, the redirection notification message or the redirection indication, sent by the initial AMF in FIG. 8A and FIG. 8B, step 431 of receiving the NAS security mode command message sent by the second AMF in FIG. 8A and FIG. 8B, step 1480 of receiving the twentieth indication information sent by the initial AMF in FIG. 22, and step 1422 of receiving the NAS message sent by the second AMF in FIG. 22.

The processing unit 120 performs a step implemented or processed internally by the user equipment in the method embodiments, for example, performs step 160 of verifying the NAS message in FIG. 4A and FIG. 4B, step 220 of storing the first NAS security context in FIG. 6A and FIG. 6B, step 250 of determining the key to be used in FIG. 6A and FIG. 6B, step 254 of deleting the first NAS security context in FIG. 6A and FIG. 6B, step 324 of verifying the NAS SMC message in FIG. 7A and FIG. 7B, step 420 of storing the first NAS security context in FIG. 8A and FIG. 8B, step 440 of restoring the first NAS security context in FIG. 8A and FIG. 8B, step 432 of determining the key to be used in FIG. 8A and FIG. 8B, and step 436 of deleting the first NAS security context in FIG. 8A and FIG. 8B.

The apparatus for mobility registration shown in the apparatus 10 may further include a sending unit (not shown in FIG. 14). The sending unit is configured to perform a function of sending a message to another device, for example, sending an RR message to the initial AMF. The receiving unit 110 and the sending unit may form a transceiver unit that has both receiving and sending functions. The processing unit 120 may be a processor. The sending unit may be a transmitter, the receiving unit 110 may be a receiver, and the receiver and the transmitter may be integrated to form a transceiver.

Figure 15:
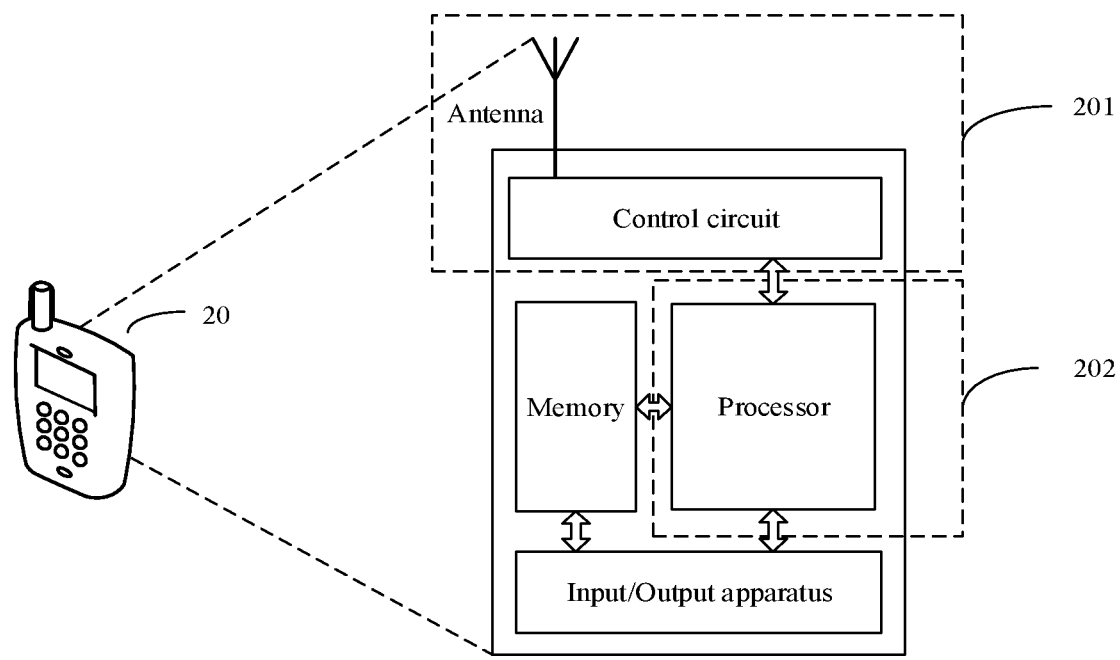
FIG. 15 is a schematic diagram of a structure of user equipment 20 applicable to an embodiment of this application.

FIG. 15 is a schematic diagram of a structure of user equipment 20 applicable to an embodiment of this application. The user equipment 20 may be applied to the system shown in FIG. 1. For ease of description, FIG. 15 shows only main components of the user equipment. As shown in FIG. 15, the user equipment 20 includes a processor, a memory, a control circuit, an antenna, and an input/output apparatus. The processor is configured to control the antenna and the input/output apparatus to send or receive a signal. The memory is configured to store a computer program. The processor is configured to invoke the computer program from the memory and run the computer program, to perform a corresponding procedure and/or operation performed by the user equipment in the method for mobility registration provided in this application. Details are not described herein again.

A person skilled in the art may understand that for ease of description, FIG. 15 shows only one memory and one processor. In actual user equipment, there may be a plurality of processors and a plurality of memories. The memory may also be referred to as a storage medium, a storage device, or the like. This is not limited in the embodiments of this application.

Figure 16:
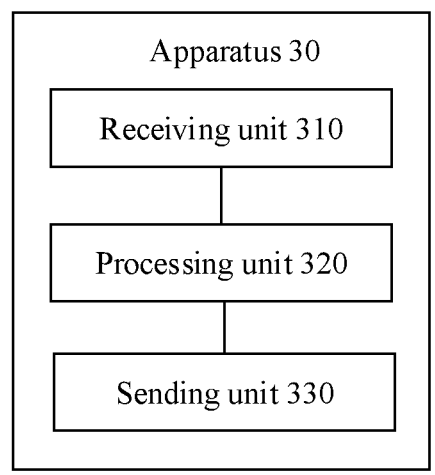
FIG. 16 is a schematic diagram of an apparatus 30 for mobility registration according to an embodiment of this application.

FIG. 16 is a schematic diagram of an apparatus 30 for mobility registration according to this application. As shown in FIG. 16, the apparatus 30 includes a receiving unit 310, a processing unit 320, and a sending unit 330.

The receiving unit 310 is configured to receive a first service operation response sent by a first AMF.

The processing unit 320 is configured to perform primary authentication.

The sending unit 330 is configured to send a first NAS security mode command message to UE.

The apparatus 30 completely corresponds to the initial AMF in the method embodiments. The apparatus 30 may be the initial AMF in the method embodiments, or a chip or a function module in the initial AMF in the method embodiments. The corresponding units of the apparatus 30 are configured to perform corresponding steps performed by the initial AMF in the method embodiments shown in FIG. 4A to FIG. 13, and FIG. 22.

The receiving unit 310 of the apparatus 30 performs a receiving step performed by the initial AMF in the method embodiments, for example, performs step 111 of receiving the RR message sent by the UE in FIG. 4A and FIG. 4B, step 113 of receiving the first service operation response sent by the first AMF in FIG. 4A and FIG. 4B, step 116 of receiving the NAS security mode command complete message sent by the UE in FIG. 4A and FIG. 4B, step 211 of receiving the RR message sent by the UE in FIG. 6A and FIG. 6B, step 213 of receiving the first service operation response sent by the first AMF in FIG. 6A and FIG. 6B, step 221 of receiving the NAS security mode command complete message sent by the UE in FIG. 6A and FIG. 6B, step 311 of receiving the RR message sent by the UE in FIG. 7A and FIG. 7B, step 313 of receiving the first service operation response sent by the first AMF in FIG. 7A and FIG. 7B, step 411 of receiving the RR message sent by the UE in FIG. 8A and FIG. 8B, step 413 of receiving the first service operation response sent by the first AMF in FIG. 8A and FIG. 8B, step 421 of receiving the NAS security mode command complete message sent by the UE in FIG. 8A and FIG. 8B, step 910 of receiving the RR message sent by the UE in FIG. 9, step 940 of receiving the first service operation response sent by the first AMF in FIG. 9, step 1010 of receiving the RR message sent by the UE in FIG. 10, step 1030 of receiving the first service operation response sent by the first AMF in FIG. 10, step 1110 of receiving the RR message sent by the UE in FIG. 11A and FIG. 11B, step 1130 of receiving the first service operation response sent by the first AMF in FIG. 11A and FIG. 11B, step 1110 of receiving the first 5G-GUTI sent by the (R)AN in FIG. 11A and FIG. 11B, step 1210 of receiving the RR message sent by the UE in FIG. 12A and FIG. 12B, step 1230 of receiving the first service operation response sent by the first AMF in FIG. 12A and FIG. 12B, step 1214 of receiving the registration request message sent by the UE in FIG. 12A and FIG. 12B, step 1310 of receiving the RR message sent by the UE in FIG. 13, step 1410 of receiving the RR message sent by the UE in FIG. 22, step 1412 of receiving the first service operation response sent by the first AMF in FIG. 22, and step 1415 of receiving NAS security mode command complete message sent by the UE in FIG. 22.

The processing unit 320 performs a step implemented or processed internally by the initial AMF in the method embodiments, for example, performs step 114 of primary authentication in FIG. 4A and FIG. 4B, step 117 of determining to perform AMF redirection in FIG. 4A and FIG. 4B, step 101 of determining the first key information in FIG. 4A and FIG. 4B, step 214 of primary authentication in FIG. 6A and FIG. 6B, step 222 of determining to perform AMF redirection in FIG. 6A and FIG. 6B, step 314 of primary authentication in FIG. 7A and FIG. 7B, step 310 of determining whether to initiate the NAS security mode control procedure in FIG. 7A and FIG. 7B, step 315 of determining to perform AMF redirection in FIG. 7A and FIG. 7B, step 414 of primary authentication in FIG. 8A and FIG. 8B, step 422 of determining to perform AMF redirection in FIG. 8A and FIG. 8B, step 950 of determining whether to perform AMF redirection in FIG. 9, step 1070 of determining whether to perform AMF redirection in FIG. 10, step 1170 of determining whether to perform AMF redirection in FIG. 11A and FIG. 11B, step 1270 of determining whether to perform AMF redirection in FIG. 12A and FIG. 12B, step 1215 of determining whether to perform AMF redirection in FIG. 12A and FIG. 12B, step 1350 of performing AMF redirection in FIG. 13, step 1360 of performing key derivation in FIG. 13, and step 1416 of determining to perform AMF redirection in FIG. 22.

The sending unit 330 performs a sending step performed by the initial AMF in the method embodiments, for example, performs step 112 of sending the first service operation to the first AMF in FIG. 4A and FIG. 4B, step 112 of sending the NAS security mode command message to the UE in FIG. 4A and FIG. 4B, step 110 of sending the third service operation to the first AMF in FIG. 4A and FIG. 4B, step 121 of sending the redirection message to the RAN in FIG. 4A and FIG. 4B, step 212 of sending the first service operation to the first AMF in FIG. 6A and FIG. 6B, step 210 of sending the NAS security mode command message to the UE in FIG. 6A and FIG. 6B, step 223 of sending the third service operation to the first AMF in FIG. 6A and FIG. 6B, step 225 of sending the redirection message to the RAN in FIG. 6A and FIG. 6B, step 312 of sending the first service operation to the first AMF in FIG. 7A and FIG. 7B, step 316 of sending the third service operation to the first AMF in FIG. 7A and FIG. 7B, step 318 of sending the redirection message to the RAN in FIG. 7A and FIG. 7B, step 412 of sending the first service operation to the first AMF in FIG. 8A and FIG. 8B, step 410 of sending the NAS security mode command message to the UE in FIG. 8A and FIG. 8B, step 423 of sending the third service operation to the first AMF in FIG. 8A and FIG. 8B, step 425 of sending the redirection message to the RAN in FIG. 8A and FIG. 8B, step 920 of sending the first service operation to the first AMF in 9, step 960 of sending the third service operation to the first AMF in FIG. 9, step 970 of sending the redirection message to the RAN in FIG. 9, step 1020 of sending the first service operation to the first AMF in FIG. 10, step 1080 of sending a message for updating the NAS security context of the UE to the first AMF in FIG. 10, step 1011 of sending a redirection message to the RAN in FIG. 10, step 1120 of sending the first service operation to the first AMF in FIG. 11A and FIG. 11B, step 1180 of sending the third service operation to the first AMF in step FIG. 11A and FIG. 11B, step 1190 of sending the first request message to the RAN in FIG. 11A and FIG. 11B, step 1194 of sending the first message to the RAN in FIG. 11A and FIG. 11B, step 1197 of sending the second message to the RAN in FIG. 11A and FIG. 11B, step 1111 of sending the second 5G-GUTI to the UE in FIG. 11A and FIG. 11B, step 1220 of sending the first service operation to the first AMF in FIG. 12A and FIG. 12B, step 1280 of sending the third service operation to the first AMF in FIG. 12A and FIG. 12B, step 1290 of sending the third message to the RAN in FIG. 12A and FIG. 12B, step 1293 of sending the fourth message to the RAN in FIG. 12A and FIG. 12B, step 1296 of sending the fifth message to the RAN in FIG. 12A and FIG. 12B, step 1211 of sending the third 5G-GUTI to the UE in FIG. 12A and FIG. 12B, step 1216 of sending the redirection message to the UE in step FIG. 12A and FIG. 12B, step 1330 of sending the NAS security mode command message to the UE in FIG. 13, step 1370 of sending the fourth service operation to the second AMF in FIG. 13, step 1411 of sending the first service operation to the first AMF in FIG. 22, step 1417 of sending a registration request message to the second AMF in FIG. 22, step 1418 of sending the redirection message to the RAN in FIG. 22, step 14191 of sending the twenty-first indication information to the RAN in FIG. 22, and step 1480 of sending the twentieth indication information to the UE in FIG. 22.

The receiving unit 310 and the sending unit 330 may form a transceiver unit that has both receiving and sending functions. The processing unit 320 may be a processor. The sending unit 330 may be a receiver, the receiving unit 310 may be a transmitter, and the receiver and the transmitter may be integrated to form a transceiver.

Figure 17:
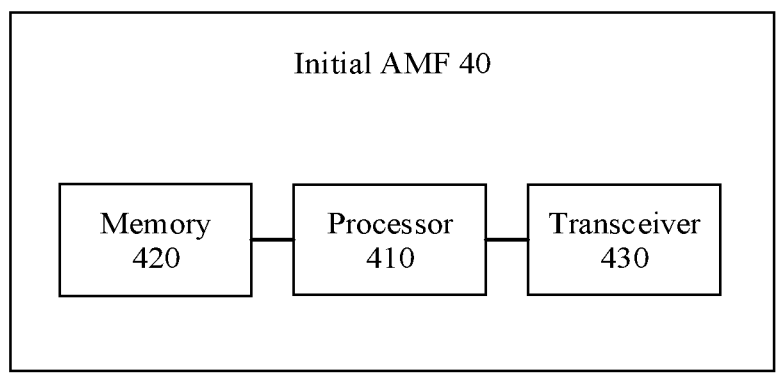
FIG. 17 is a schematic diagram of a structure of an initial AMF 40 applicable to an embodiment of this application.

As shown in FIG. 17, an embodiment of this application further provides an initial AMF 40. The initial AMF 40 includes a processor 410, a memory 420, and a transceiver 430. The memory 420 stores instructions or a program, and the processor 430 is configured to execute the instructions or the program stored in the memory 420. When the instructions or the program stored in the memory 420 are or is executed, the transceiver 430 is configured to perform operations performed by the receiving unit 310 and the sending unit 330 in the apparatus 30 shown in FIG. 16.

Figure 18:
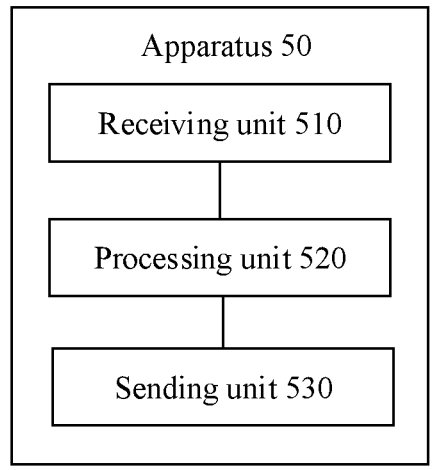
FIG. 18 is a schematic diagram of an apparatus 50 for mobility registration according to an embodiment of this application.

FIG. 18 is a schematic diagram of an apparatus 50 for mobility registration according to this application. As shown in FIG. 18, the apparatus 50 includes a receiving unit 510, a processing unit 520, and a sending unit 530.

The receiving unit 510 is configured to receive a first service operation sent by an initial AMF.

The processing unit 520 is configured to determine whether AMF redirection occurs.

The sending unit 530 is configured to send a second NAS security mode command message to UE.

The apparatus 50 completely corresponds to the first AMF in the method embodiments. The apparatus 50 may be the first AMF in the method embodiments, or a chip or a function module in the first AMF in the method embodiments. The corresponding units of the apparatus 50 are configured to perform corresponding steps performed by the first AMF in the method embodiments shown in FIG. 4A to FIG. 13, and FIG. 22.

The receiving unit 510 of the apparatus 50 performs a receiving step performed by the first AMF in the method embodiments, for example, step 112 of receiving the first service operation sent by the initial AMF in FIG. 4A and FIG. 4B, step 110 of receiving the third service operation sent by the initial AMF in FIG. 4A and FIG. 4B, step 123 of receiving the second service operation sent by the second AMF in FIG. 4A and FIG. 4B, step 212 of receiving the first service operation sent by the initial AMF in FIG. 6A and FIG. 6B, step 223 of receiving the third service operation sent by the initial AMF in FIG. 6A and FIG. 6B, step 227 of receiving the second service operation sent by the second AMF in FIG. 6A and FIG. 6B, step 312 of receiving the first service operation sent by the initial AMF in FIG. 7A and FIG. 7B, step 316 of receiving the third service operation sent by the initial AMF in FIG. 7A and FIG. 7B, step 320 of receiving the second service operation sent by the second AMF in FIG. 7A and FIG. 7B, step 412 of receiving the first service operation sent by the initial AMF in FIG. 8A and FIG. 8B, step 423 of receiving the third service operation sent by the initial AMF in FIG. 8A and FIG. 8B, step 427 of receiving the second service operation sent by the second AMF in FIG. 8A and FIG. 8B, step 920 of receiving the first service operation sent by the initial AMF in FIG. 9, step 960 of receiving the third service operation sent by the initial AMF in FIG. 9, step 1020 of receiving the first service operation sent by the initial AMF in FIG. 10, step 1080 of receiving a message for updating the NAS security context of the UE sent by the initial AMF in FIG. 10, step 1120 of receiving the first service operation sent by the initial AMF in FIG. 11A and FIG. 11B, step 1180 of receiving the third service operation sent by the initial AMF in FIG. 11A and FIG. 11B, step 1220 of receiving the first service operation sent by the initial AMF in FIG. 12A and FIG. 12B, step 1280 of receiving the third service operation sent by the initial AMF in FIG. 12A and FIG. 12B, step 1411 of receiving the first service operation sent by the initial AMF in FIG. 22, and step 1420 of receiving the first service operation sent by the second AMF in FIG. 22.

The processing unit 520 performs a step implemented or processed internally by the first AMF in the method embodiments, for example, performs step 114 of determining the key in FIG. 4A and FIG. 4B, step 120 of restoring the key information in FIG. 4A and FIG. 4B, step 214 of determining the key in FIG. 6A and FIG. 6B, step 224 of restoring the context of the UE in FIG. 6A and FIG. 6B, step 230 of determining whether the redirection occurs in FIG. 6A and FIG. 6B, step 314 of determining the key in FIG. 7A and FIG. 7B, step 317 of restoring the context of the UE in FIG. 7A and FIG. 7B, step 414 of determining the key in FIG. 8A and FIG. 8B, step 424 of restoring the context of the UE in FIG. 8A and FIG. 8B, step 930 of determining to return the first key and the first key identifier in FIG. 9, and step 1090 of updating the locally stored NAS security context of the UE in FIG. 10.

The sending unit 530 performs a sending step performed by the first AMF in the method embodiments, for example, performs step 113 of sending the first operation service response to the initial AMF in FIG. 4A and FIG. 4B, step 130 of sending the second operation service response to the second AMF in FIG. 4A and FIG. 4B, step 213 of sending the first operation service response to the initial AMF in FIG. 6A and FIG. 6B, step 240 of sending the second operation service response to the second AMF in FIG. 6A and FIG. 6B, step 313 of sending the first operation service response to the initial AMF in FIG. 7A and FIG. 7B, step 321 of sending the second operation service response to the second AMF in FIG. 7A and FIG. 7B, step 413 of sending the first operation service response to the initial AMF in FIG. 8A and FIG. 8B, step 430 of sending the second operation service response to the second AMF in FIG. 8A and FIG. 8B, step 940 of sending the first operation service response to the initial AMF in FIG. 9, step 1030 of sending the first operation service response to the initial AMF in FIG. 10, step 1130 of sending the first operation service response to the initial AMF in FIG. 11A and FIG. 11B, step 1230 of sending the first operation service response to the initial AMF in FIG. 12A and FIG. 12B, step 1412 of sending the first operation service response to the initial AMF in FIG. 22, and step 1421 of sending the first operation service response to the second AMF in FIG. 22.

The receiving unit 510 and the sending unit 530 may form a transceiver unit that has both receiving and sending functions. The processing unit 520 may be a processor. The sending unit 530 may be a receiver, the receiving unit 510 may be a transmitter, and the receiver and the transmitter may be integrated to form a transceiver.

Figure 19:
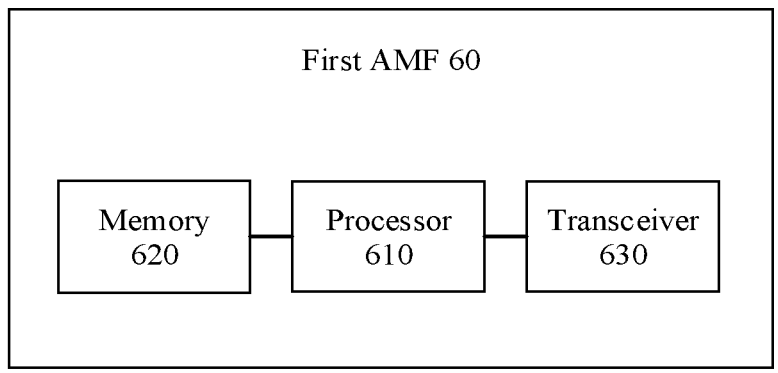
FIG. 19 is a schematic diagram of a structure of a first AMF 60 applicable to an embodiment of this application.

As shown in FIG. 19, an embodiment of this application further provides a first AMF 60. The first AMF 60 includes a processor 610, a memory 620, and a transceiver 630. The memory 620 stores instructions or a program, and the processor 630 is configured to execute the instructions or the program stored in the memory 620. When the instructions or the program stored in the memory 620 are or is executed, the transceiver 630 is configured to perform operations performed by the receiving unit 510 and the sending unit 530 in the apparatus 50 shown in FIG. 18.

Figure 20:
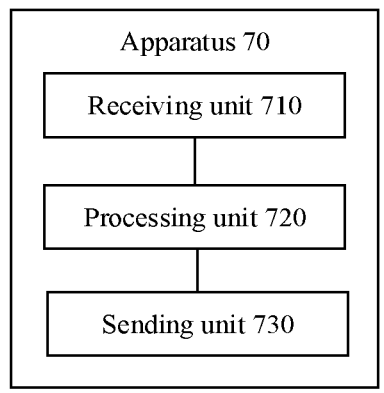
FIG. 20 is a schematic diagram of an apparatus 70 for mobility registration according to an embodiment of this application.

FIG. 20 is a schematic diagram of an apparatus 70 for mobility registration according to this application. As shown in FIG. 20, the apparatus 70 includes a receiving unit 710, a processing unit 720, and a sending unit 730.

The receiving unit 710 is configured to receive a second service operation response sent by a first AMF.

The processing unit 720 is configured to determine to-be-used key information of UE.

The sending unit 730 is configured to send a second service operation to the first AMF.

The apparatus 70 completely corresponds to the second AMF in the method embodiments. The apparatus 70 may be the second AMF in the method embodiments, or a chip or a function module in the second AMF in the method embodiments. The corresponding units of the apparatus 70 are configured to perform corresponding steps performed by the second AMF in the method embodiments shown in FIG. 4A to FIG. 13, and FIG. 22.

The receiving unit 710 of the apparatus 70 performs a receiving step performed by the second AMF in the method embodiments, for example, performs step 130 of receiving the second service operation response sent by the first AMF in FIG. 4A and FIG. 4B, step 122 of receiving the initial UE message sent by the RAN in FIG. 4A and FIG. 4B, step 161 of receiving the NAS security mode command complete message sent by the UE in FIG. 4A and FIG. 4B, step 240 of receiving the second service operation response sent by the first AMF in FIG. 6A and FIG. 6B, step 226 of receiving the initial UE message sent by the RAN in FIG. 6A and FIG. 6B, step 251 of receiving the NAS security mode command complete message sent by the UE in FIG. 6A and FIG. 6B, step 321 of receiving the second service operation response sent by the first AMF in FIG. 7A and FIG. 7B, step 319 of receiving the initial UE message sent by the RAN in FIG. 7A and FIG. 7B, step 325 of receiving the NAS security mode command complete message sent by the UE in FIG. 7A and FIG. 7B, step 440 of receiving the second service operation response sent by the first AMF in FIG. 8A and FIG. 8B, step 426 of receiving the initial UE message sent by the RAN in FIG. 8A and FIG. 8B, step 433 of receiving the NAS security mode command complete message sent by the UE in FIG. 8A and FIG. 8B, step 980 of receiving the initial UE message sent by the RAN in FIG. 9, step 1012 of receiving the initial UE message sent by the RAN in FIG. 10, step 1114 of receiving the registration request message sent by the UE in FIG. 11A and FIG. 11B, step 1191 of receiving the first request message sent by the RAN in FIG. 11A and FIG. 11B, step 1195 of receiving the first message sent by the RAN in FIG. 11A and FIG. 11B, step 1198 of receiving the second message sent by the RAN in FIG. 11A and FIG. 11B, step 1217 of receiving the registration request message sent by the UE in FIG. 12A and FIG. 12B, step 1291 of receiving the third message sent by the RAN in FIG. 12A and FIG. 12B, step 1294 of receiving the fourth message sent by the RAN in FIG. 12A and FIG. 12B, step 1297 of receiving the fifth message sent by the RAN in FIG. 12A and FIG. 12B, step 1370 of receiving the fourth service operation sent by the first AMF in FIG. 13, step 1417 of receiving the registration request message sent by the initial AMF in FIG. 22, step 1419 of receiving the initial UE message sent by the RAN in FIG. 22, step 14192 of receiving the twenty-first indication information sent by the RAN in FIG. 22, and step 1421 of receiving the first service operation response sent by the first AMF in FIG. 22.

The processing unit 720 performs a step implemented or processed internally by the first AMF in the method embodiments, for example, performs step 140 of determining the to-be-used key information of the UE in FIG. 4A and FIG. 4B, step 161 of performing the registration procedure in FIG. 4A and FIG. 4B, step 241 of determining the to-be-used key information of the UE in FIG. 6A and FIG. 6B, step 252 of performing the registration procedure in FIG. 6A and FIG. 6B, step 322 of determining the to-be-used key information of the UE in FIG. 7A and FIG. 7B, step 326 of performing the registration procedure in FIG. 7A and FIG. 7B, step 429 of determining the to-be-used key information of the UE in FIG. 8A and FIG. 8B, step 434 of performing the registration procedure in FIG. 8A and FIG. 8B, step 1196 of storing the first 5G-GUTI in FIG. 11A and FIG. 11B, step 1292 of storing the second 5G-GUTI in FIG. 11A and FIG. 11B, and step 1295 of storing the first 5G-GUTI in FIG. 11A and FIG. 11B.

The sending unit 730 performs a sending step performed by the second AMF in the method embodiments, for example, performs step 123 of sending the second service operation to the first AMF in FIG. 4A and FIG. 4B, step 150 of sending the NAS message to the UE in FIG. 4A and FIG. 4B, step 227 of sending the second service operation to the first AMF in FIG. 6A and FIG. 6B, step 242 of sending the NAS security mode command to the UE in FIG. 6A and FIG. 6B, step 253 of sending the registration accept message to the UE in FIG. 6A and FIG. 6B, step 320 of sending the second service operation to the first AMF in FIG. 7A and FIG. 7B, step 323 of sending the NAS security mode command message to the UE in FIG. 7A and FIG. 7B, step 428 of sending the second service operation to the first AMF in FIG. 8A and FIG. 8B, step 431 of sending the NAS security mode command message to the UE in FIG. 8A and FIG. 8B, step 435 of sending the registration accept message to the UE in FIG. 8A and FIG. 8B, step 1192 of sending the second 5G-GUTI to the (R)AN in FIG. 8A and FIG. 8B, step 1422 of sending the NAS message to the UE in FIG. 22, and step 1420 of sending the first service operation response to the first AMF in FIG. 22.

The receiving unit 710 and the sending unit 730 may form a transceiver unit that has both receiving and sending functions. The processing unit 720 may be a processor. The sending unit 730 may be a receiver, the receiving unit 710 may be a transmitter, and the receiver and the transmitter may be integrated to form a transceiver.

Figure 21:
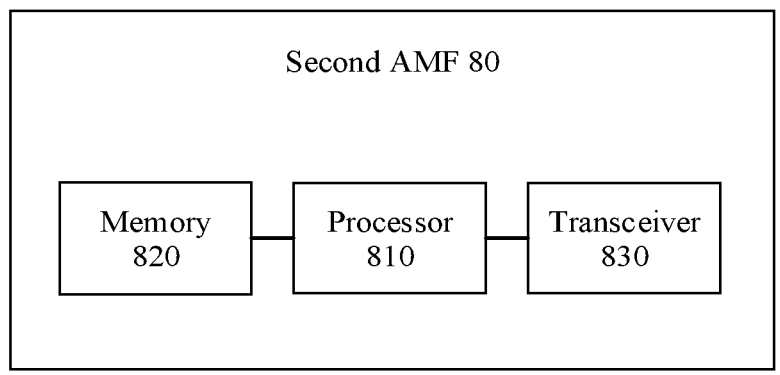
FIG. 21 is a schematic diagram of a structure of a second AMF 80 applicable to an embodiment of this application.

As shown in FIG. 21, an embodiment of this application further provides a second AMF 80. The second AMF 80 includes a processor 810, a memory 820, and a transceiver 830. The memory 820 stores instructions or a program, and the processor 830 is configured to execute the instructions or the program stored in the memory 820. When the instructions or the program stored in the memory 820 are or is executed, the transceiver 830 is configured to perform operations performed by the receiving unit 710 and the sending unit 730 in the apparatus 70 shown in FIG. 20.

The network device and the user equipment in the foregoing apparatus embodiments correspond to the network device or the user equipment in the method embodiments. A corresponding module or unit performs a corresponding step. For example, a communication unit (a transceiver) performs a receiving step or a sending step in the method embodiments, and another step other than the sending step and the receiving step may be performed by a processing unit (a processor). For a function of a specific unit, refer to a corresponding method embodiment. There may be one or more processors.

An embodiment of this application further provides a communication system, including the initial AMF, the first AMF, the second AMF, and one or more user equipments described above.

This application further provides a computer-readable storage medium. The computer-readable storage medium stores instructions. When the instructions are run on a computer, the computer is enabled to perform the steps performed by the initial AMF in the methods shown in FIG. 4A to FIG. 13, and FIG. 22.

This application further provides a computer-readable storage medium. The computer-readable storage medium stores instructions. When the instructions are run on a computer, the computer is enabled to perform the steps performed by the first AMF in the methods shown in FIG. 4A to FIG. 13, and FIG. 22.

This application further provides a computer-readable storage medium. The computer-readable storage medium stores instructions. When the instructions are run on a computer, the computer is enabled to perform the steps performed by the second AMF in the methods shown in FIG. 4A to FIG. 13, and FIG. 22.

This application further provides a computer-readable storage medium. The computer-readable storage medium stores instructions. When the instructions are run on a computer, the computer is enabled to perform the steps performed by the user equipment in the methods shown in FIG. 4A to FIG. 13, and FIG. 22.

This application further provides a computer program product including instructions. When the computer program product runs on a computer, the computer is enabled to perform the steps performed by the initial AMF in the methods shown in FIG. 4A to FIG. 13, and FIG. 22.

This application further provides a computer program product including instructions. When the computer program product runs on a computer, the computer is enabled to perform the steps performed by the first AMF in the methods shown in FIG. 4A to FIG. 13, and FIG. 22.

This application further provides a computer program product including instructions. When the computer program product runs on a computer, the computer is enabled to perform the steps performed by the second AMF in the methods shown in FIG. 4A to FIG. 13, and FIG. 22.

This application further provides a computer program product including instructions. When the computer program product runs on a computer, the computer is enabled to perform the steps performed by the user equipment in the methods shown in FIG. 4A to FIG. 13, and FIG. 22.

This application further provides a chip, including a processor. The processor is configured to read a computer program stored in a memory and run the computer program, to perform a corresponding operation and/or procedure performed by user equipment in the method for mobility registration provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface.

This application further provides a chip, including a processor. The processor is configured to invoke a computer program stored in a memory and run the computer program, to perform a corresponding operation and/or procedure performed by an initial AMF in the method for mobility registration provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface. This application further provides a chip, including a processor. The processor is configured to invoke a computer program stored in a memory and run the computer program, to perform a corresponding operation and/or procedure performed by a first AMF in the method for mobility registration provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface. This application further provides a chip, including a processor. The processor is configured to invoke a computer program stored in a memory and run the computer program, to perform a corresponding operation and/or procedure performed by a second AMF in the method for mobility registration provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that needs to be processed, and the processor obtains the data and/or information from the communication interface, and processes the data and/or information. The communication interface may be an input/output interface. A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed system, apparatus, and method may be implemented in another manner. For example, the apparatus embodiments described above are only examples. For example, division into the units is only logical function division, and may be other division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a Universal Serial Bus (USB) flash drive, a removable hard disk, ROM, a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for mobility registration implemented by a user equipment (UE), wherein the method comprises:
    receiving, from an initial access and mobility management function (AMF), a first non-access stratum (NAS) security mode command (SMC) message;
    storing, based on the first NAS SMC message, an NAS security context between the UE and a first AMF that is a last accessed AMF by the UE;
    receiving, from a second AMF, a second NAS SMC message carrying indication information, wherein the indication information instructs the UE to use the NAS security context, and wherein the second AMF serves the UE during AMF redirection; and
    setting, based on the indication information, the NAS security context as a current NAS security context.

2. The method of claim 1, wherein the first NAS SMC message comprises an indication, and wherein the method further comprises further storing the NAS security context based on the indication.

3. The method of claim 1, wherein the indication information comprises an NAS message notifying the UE that the AMF redirection has occurred in a network side.

4. The method of claim 3, wherein the NAS message is a configuration update command message.

5. The method of claim 3, wherein the NAS message is a security mode command message.

6. The method of claim 3, wherein the NAS message is an authentication request message.

7. The method of claim 3, wherein the NAS message is a downlink NAS transport message.

8. The method of claim 3, wherein the NAS message is a $5^{th}$ generation (5G) system mobility management (5GMM) status message.

9. The method of claim 3, wherein the NAS message is a registration reject message.

10. The method of claim 1, further comprising activating, based on the indication information, the NAS security context.

11. The method of claim 1, further comprising generating, using the initial AMF and an NAS security mode control procedure, a new NAS security context.

12. The method of claim 11, further comprising setting up a flag bit to the NAS security context.

13. The method of claim 11, further comprising deleting, based on the indication information, the new NAS security context.

14. The method of claim 1, further comprising resuming using, based on the indication information, the NAS security context.

15. The method of claim 2, wherein the indication is for requesting a complete initial NAS message that is a complete registration request message, wherein the method further comprise sending an NAS SMC complete message to the initial AMD based on the indication, and wherein the complete registration request message carries information that is cleartext and not encrypted.

16. A user equipment (UE) comprising:
a non-transitory memory configured to store instructions;
a processor coupled to the non-transitory memory and configured to execute the instructions to cause the UE to:
receive, from an initial access and mobility management function (AMF), a first non-access stratum (NAS) security mode command (SMC) message;
store, based on the first NAS SMC message, an NAS security context between the UE and a first AMF that is a last accessed AMF by the UE;
receive, from a second AMF, a second NAS SMC message carrying indication information, wherein the indication information instructs the UE to use the NAS security context, and wherein the second AMF serves the UE during AMF redirection; and
set the NAS security context based on the indication information.

17. The UE of claim 16, wherein the processor is configured to execute the instructions to cause the UE to, based on the indication information, use the NAS security context, activate the NAS security context, use the NAS security context as a current NAS security context, delete a new NAS security context, or resume using the NAS security context.

18. The UE of claim 16, wherein the processor is configured to execute the instructions to cause the UE to, when the UE includes the NAS security context and generates a new NAS security context, set one or more flag bits to distinguish the NAS security context and the new NAS security context.

19. The UE of claim 16, wherein the processor is configured to execute the instructions to cause the UE to process the NAS SMC message after storing the NAS security context.

20. A computer program product comprising computer-executable instructions that are stored on a non-transitory computer-readable storage medium and that when executed by a processor cause an electronic device to:
receive, from an initial access and mobility management function (AMF), a first non-access stratum (NAS) security mode command (SMC) message;
store, based on the first NAS SMC message, an NAS security context between the electronic device and a first AMF that is a last accessed AMF by the electronic device;
receive, from a second AMF, a second NAS SMC message carrying indication information, wherein the indication information instructs the electronic device to use the NAS security context, and wherein the second AMF serves the electronic device during AMF redirection; and
set the NAS security context based on the indication information.

* * * * *